(12) United States Patent
Del Real

(10) Patent No.: US 8,353,012 B2
(45) Date of Patent: Jan. 8, 2013

(54) INTERNET-BASED GROUP WEBSITE TECHNOLOGY FOR CONTENT MANAGEMENT AND EXCHANGE (SYSTEM AND METHODS)

(76) Inventor: Alejandro Emilio Del Real, Delray Beach, FL (US)

( * ) Notice: Subject to any disclaimer, the term of this patent is extended or adjusted under 35 U.S.C. 154(b) by 918 days.

(21) Appl. No.: 12/366,479

(22) Filed: Feb. 5, 2009

(65) Prior Publication Data

US 2010/0162365 A1  Jun. 24, 2010

Related U.S. Application Data

(60) Provisional application No. 61/031,440, filed on Feb. 26, 2008.

(51) Int. Cl.
*G06F 7/04* (2006.01)
(52) U.S. Cl. .............................. 726/4; 705/326; 709/206
(58) Field of Classification Search ...... 726/4; 709/206; 705/326
See application file for complete search history.

(56) References Cited

U.S. PATENT DOCUMENTS

2006/0026213 A1* 2/2006 Yaskin et al. ................. 707/200
2006/0168233 A1* 7/2006 Alcorn et al. ................. 709/226

* cited by examiner

*Primary Examiner* — Kaveh Abrishamkar

(57) ABSTRACT

System and Methods for implementing a Internet-Based Group Cloud Management System (GCMS) comprised by several Cloud Management System sites (CMS sites), where providing institutions, means for: A) The Creation of the Educational Group comprised by: A1) Community CMS sites for Campuses and/or Groups of Users, A2) Personal CMS Sites for each Faculty, Staff, Student and Alumnus, A3) Project CMS sites for each Project Team. B) Communication within the Educational Group: B1) Among CMS Sites, B2) to e-mail and text-messaging devices. The CMS sites are reachable by their own domain names or sub-domain from the GCMS, and by any search engine. Each CMS site is multi-user and includes its own security system, user-defined and predefined pages for among others, Professional Profile, Web Apps, Virtual Desktop/Apps and Web/Cloud Services. Each CMS site is connected to the GCMS, allowing the Exchange of Information among CMS sites within the GCMS and among GCMS sites.

4 Claims, 34 Drawing Sheets

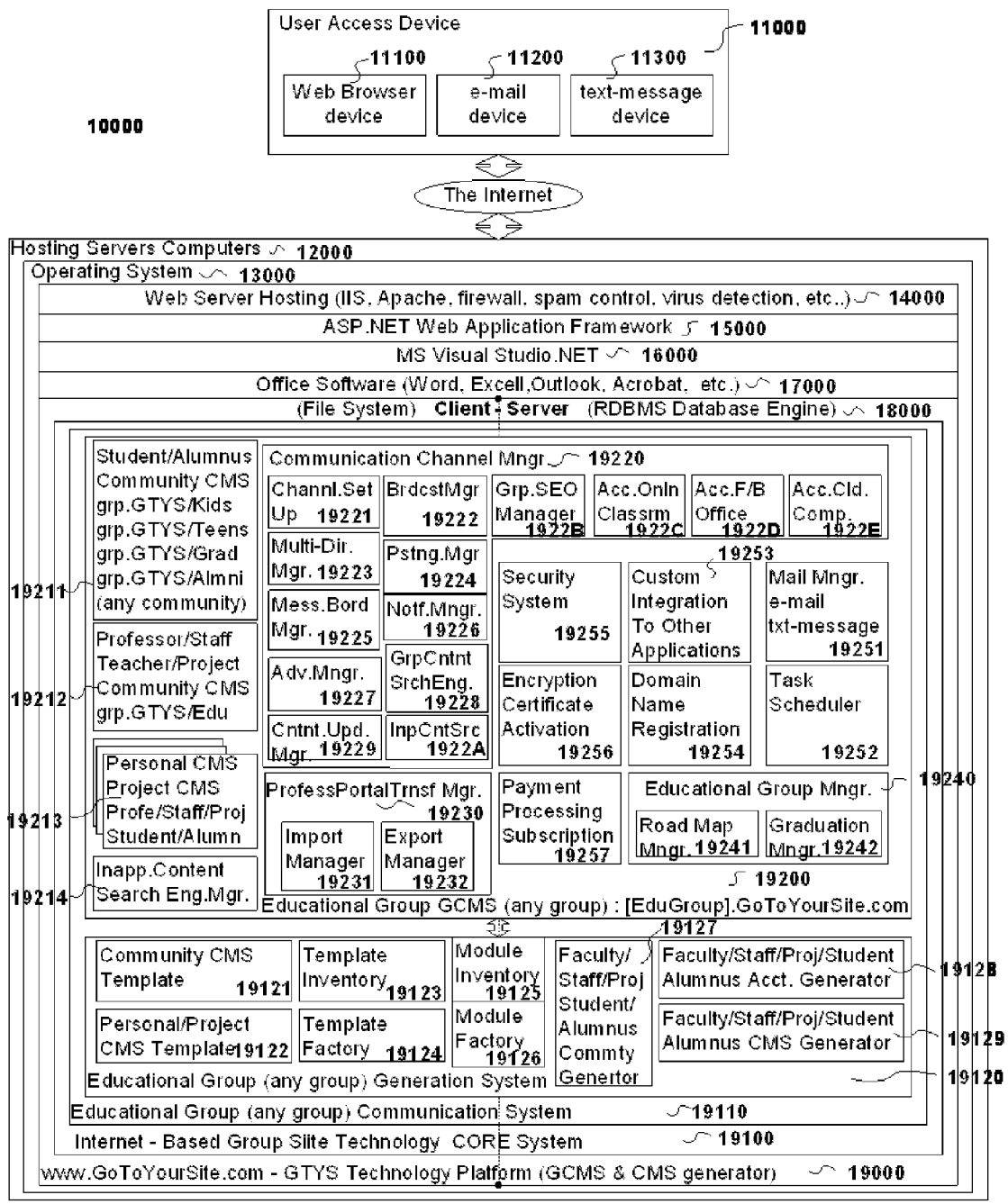

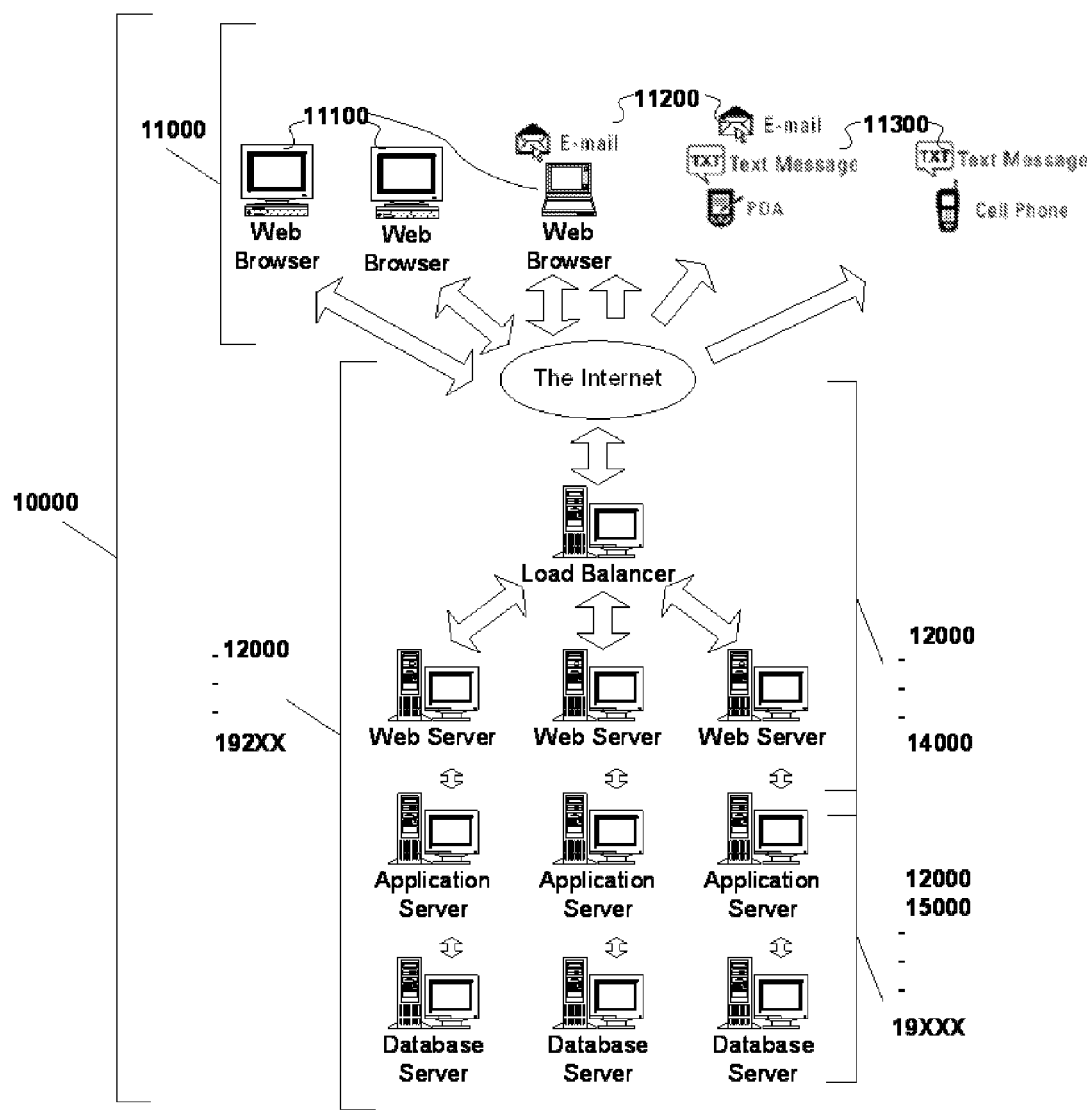
Figure 2: Internet-Based Group Cloud Management System
(System Architecture Hardware Overview)

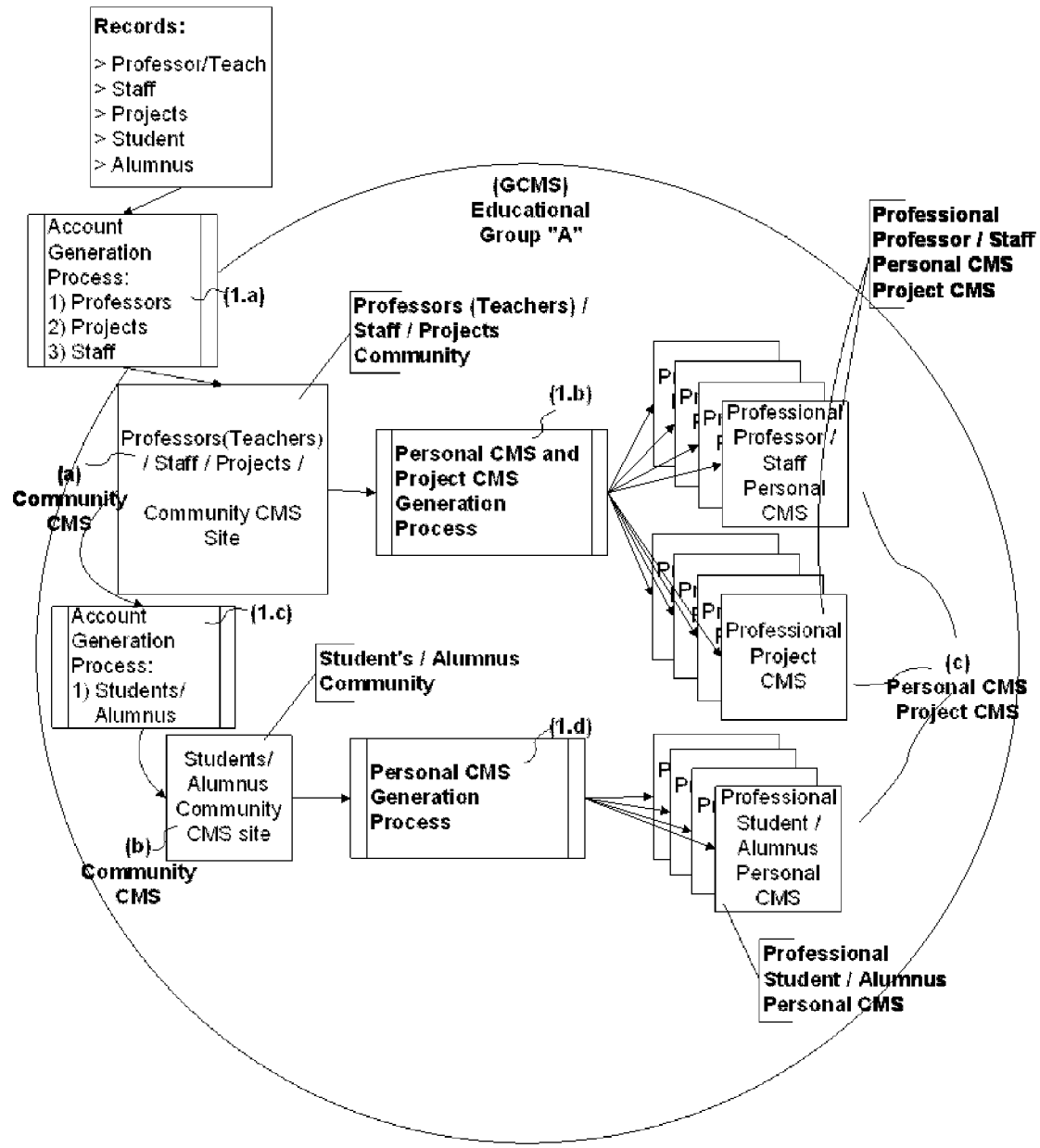
Figure 3 - Educational Group Generation - Drawing of Sites & Processes

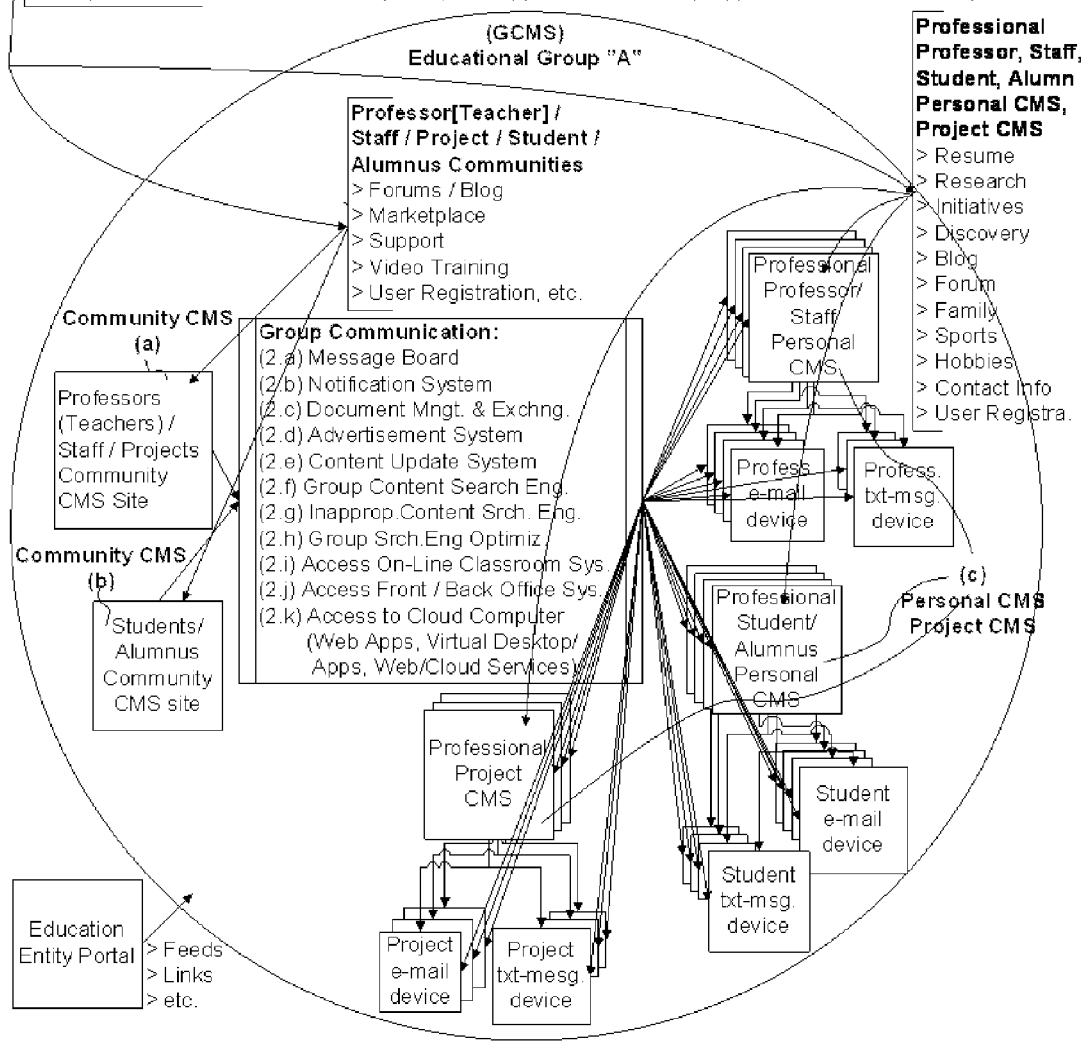

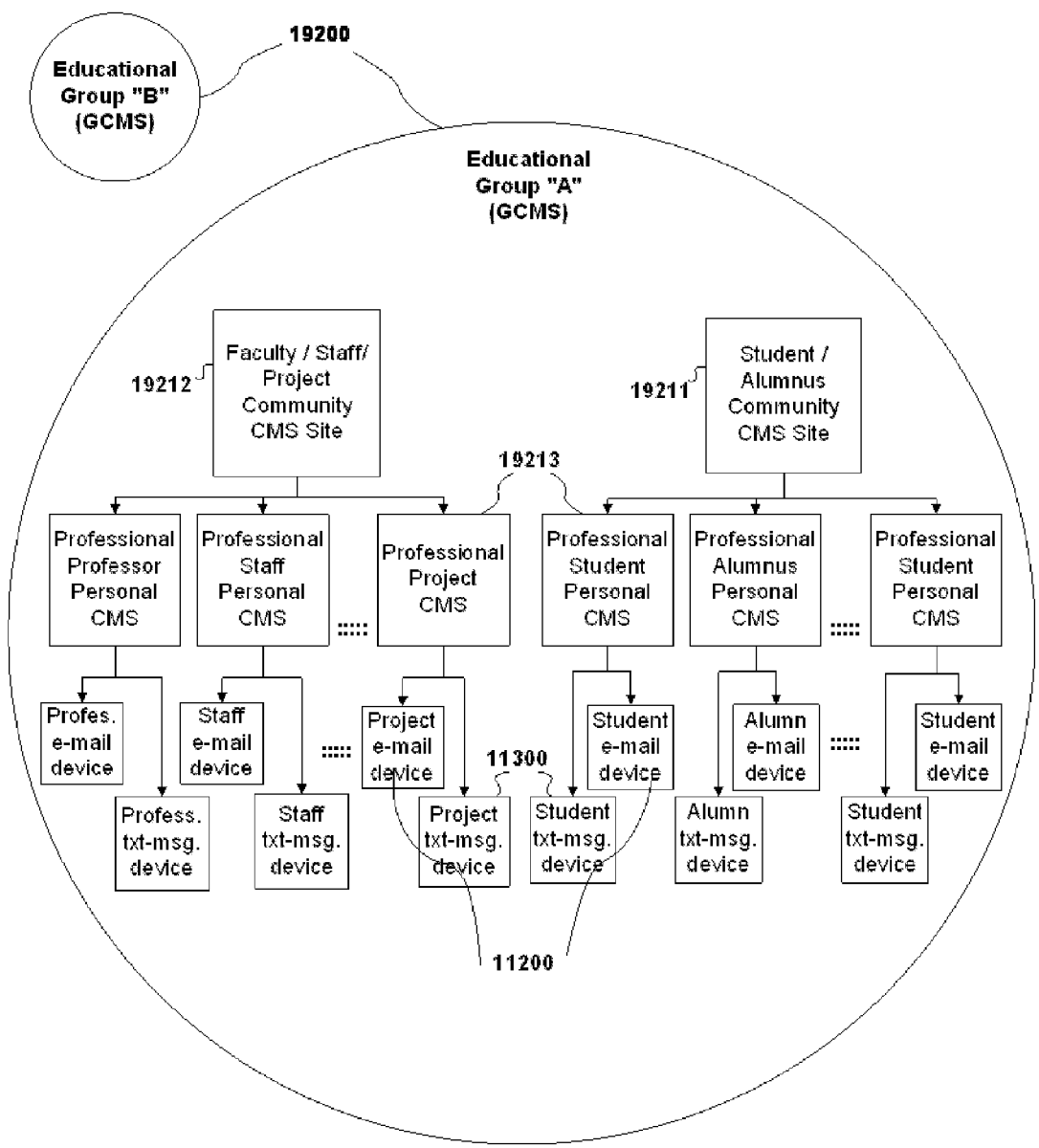
Figure 5: Educational Group - Entity Relationship

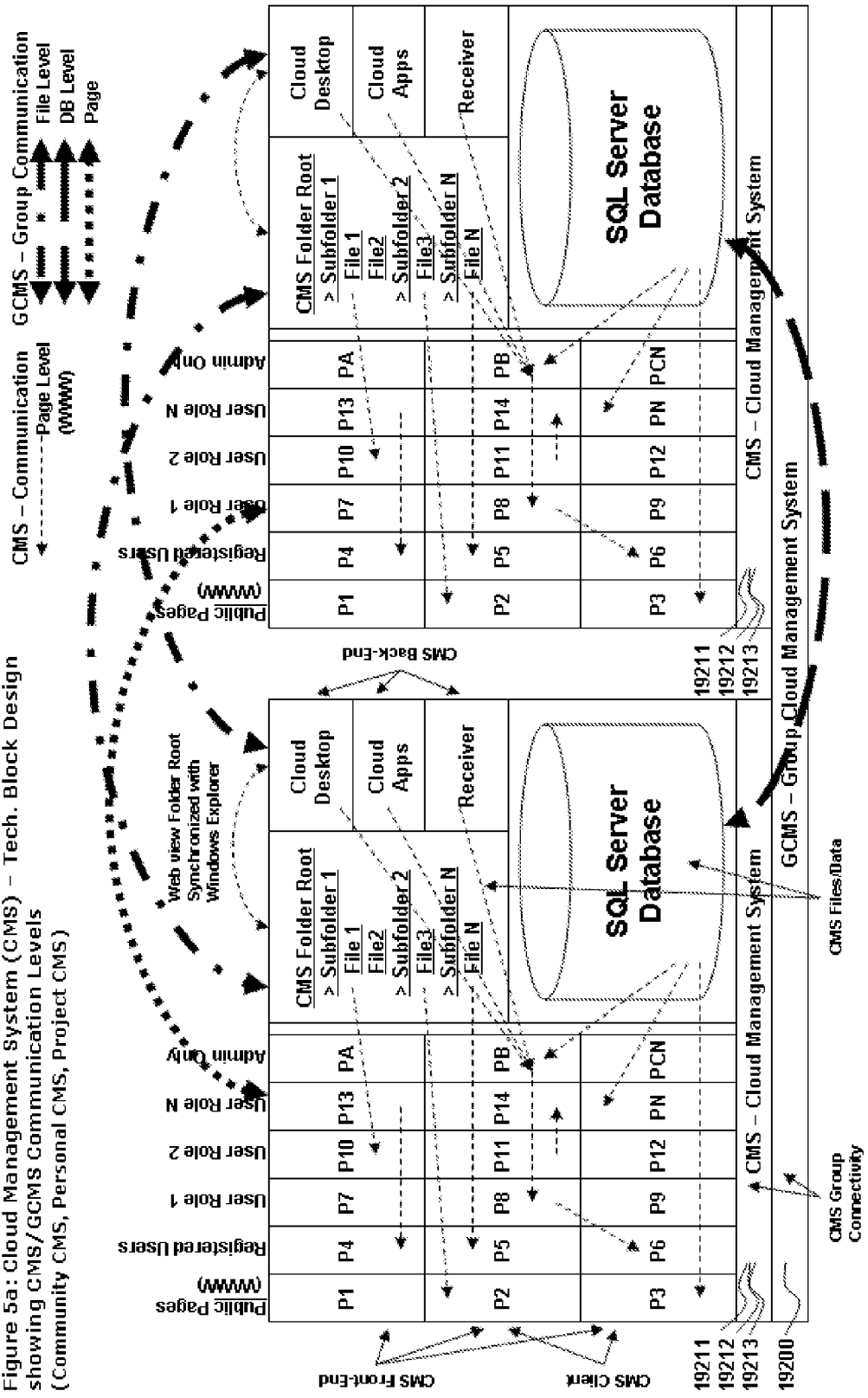
Figure 5a: Cloud Management System (CMS) – Tech. Block Design showing CMS/GCMS Communication Levels (Community CMS, Personal CMS, Project CMS)

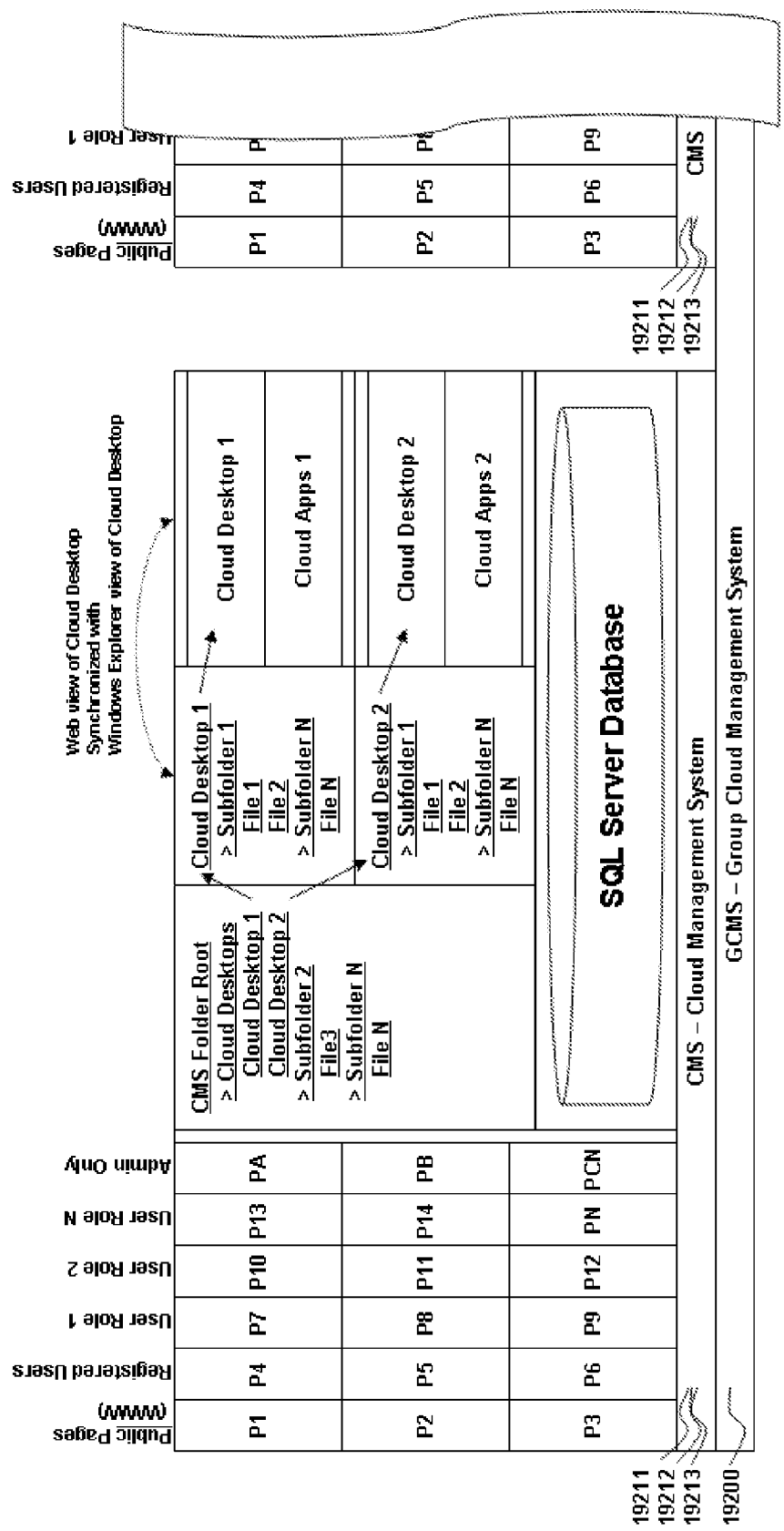
Figure 5b: Cloud Management System (CMS) – Tech. Block Design, with multiple Cloud Desktops
(Community CMS, Personal CMS, Project CMS)

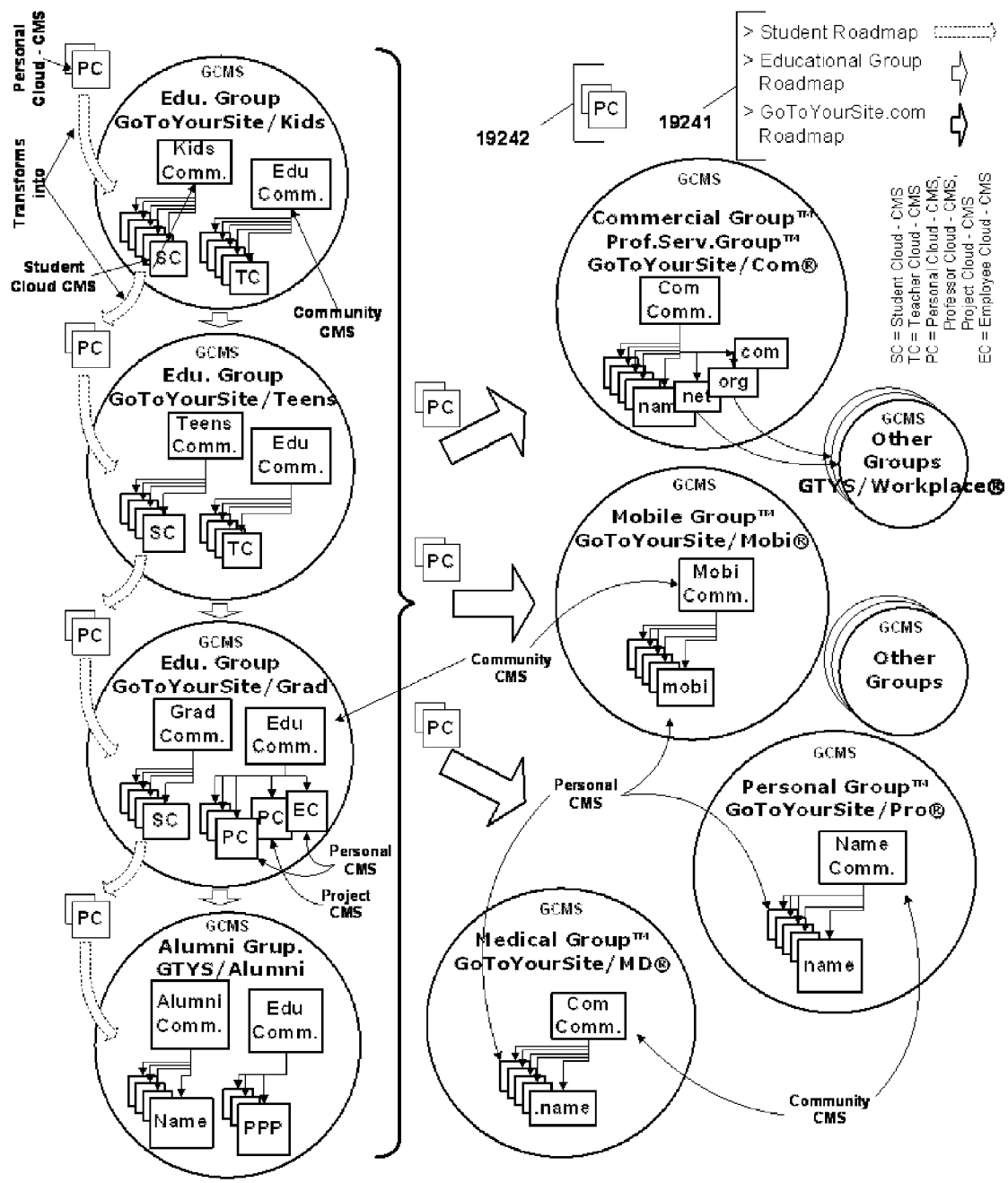
Figure 6: Educational Group - Road Map and Graduation Manager

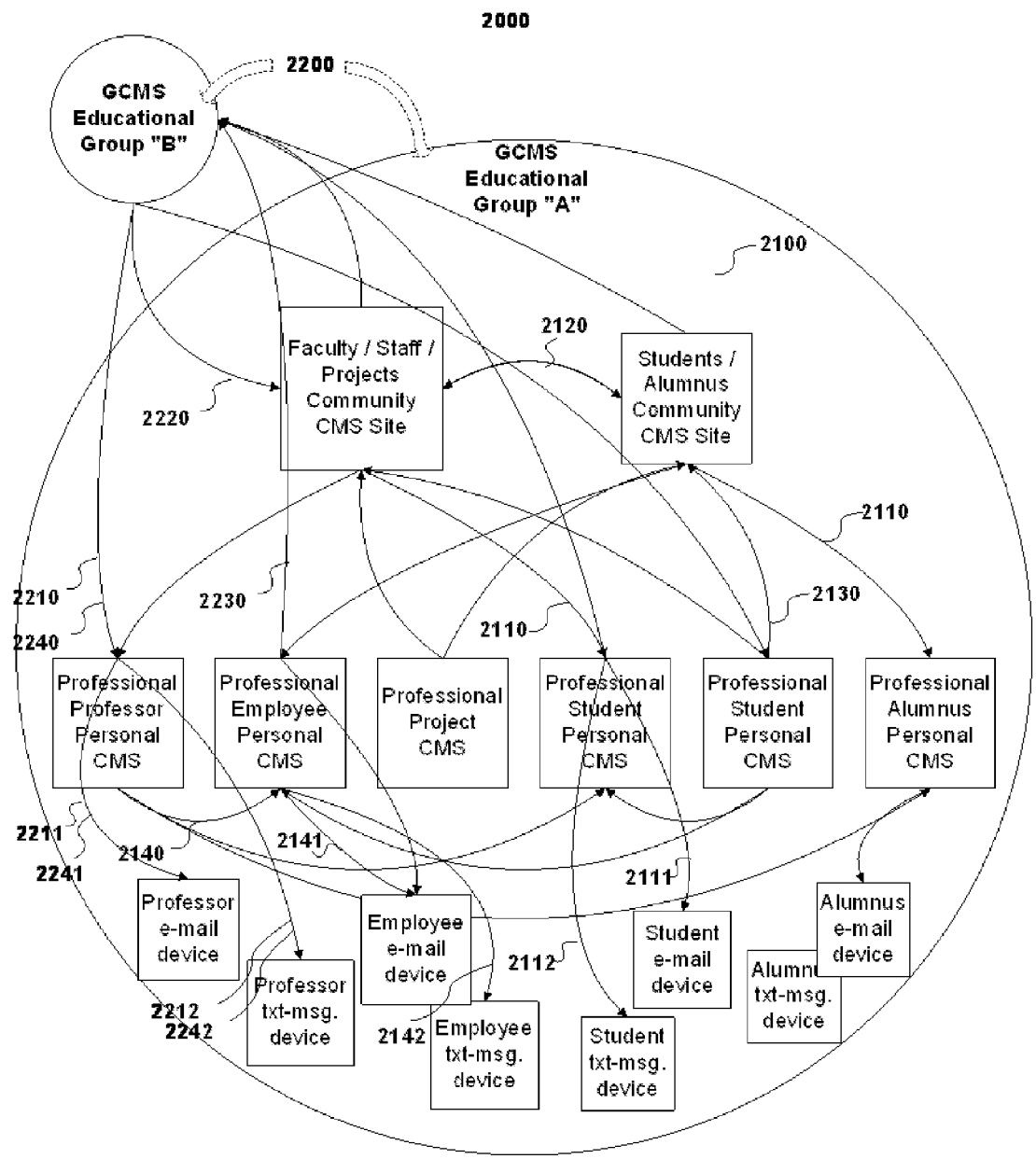

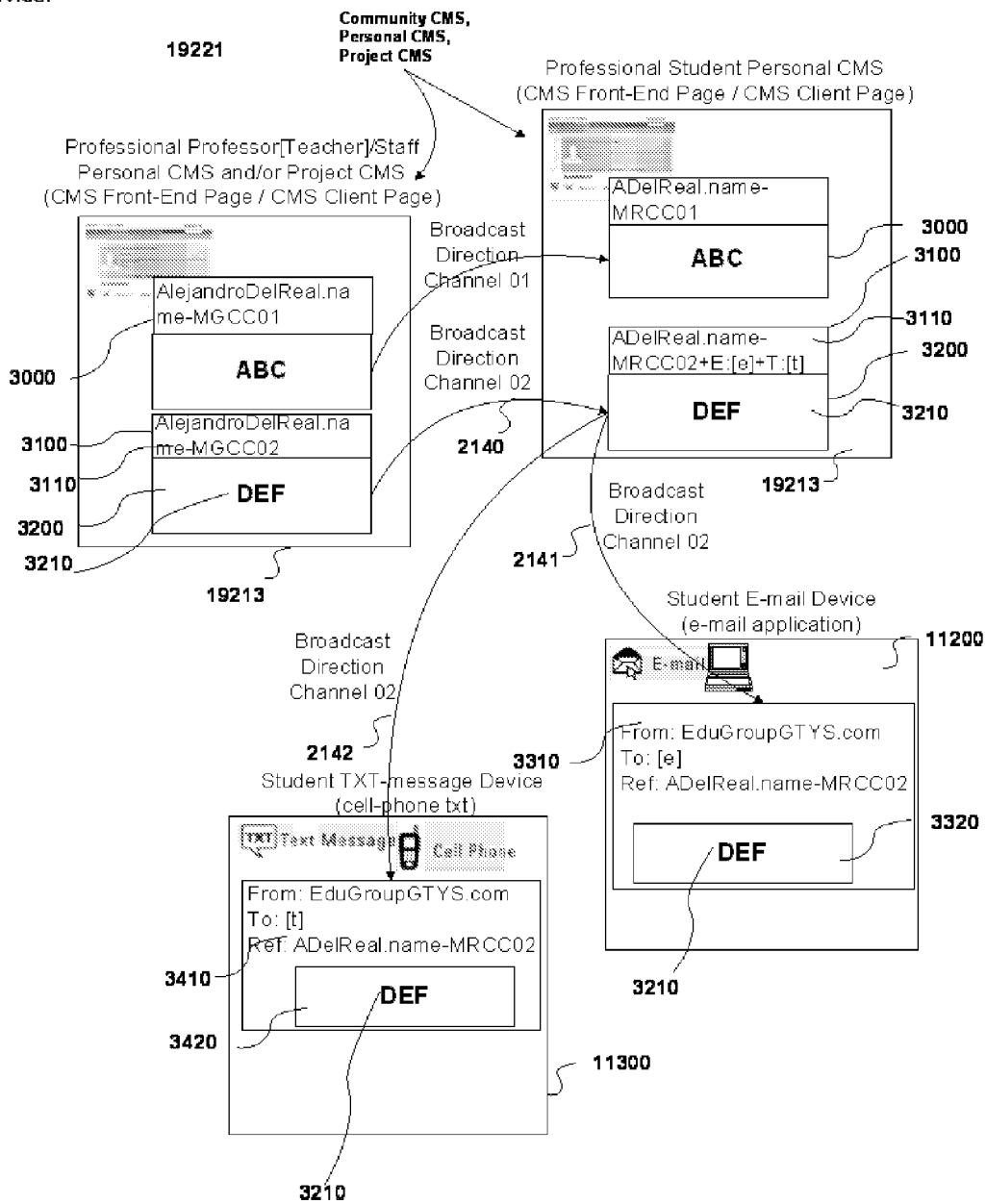

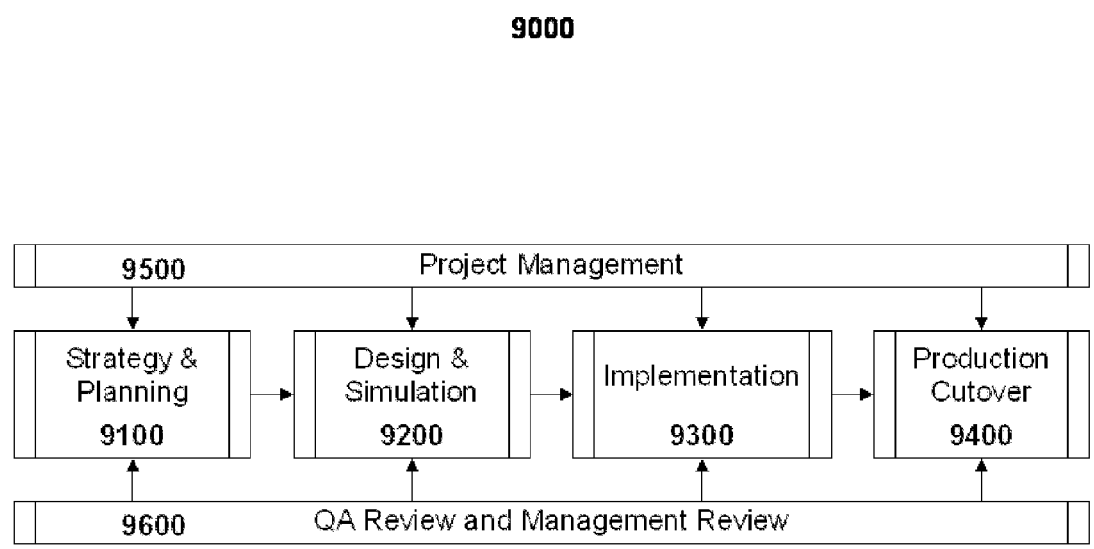
Figure 9: Method-e Systems Implementation Methodology
(For the deployment of the Educational Group (GCMS) and eCommerce Ecosystem)

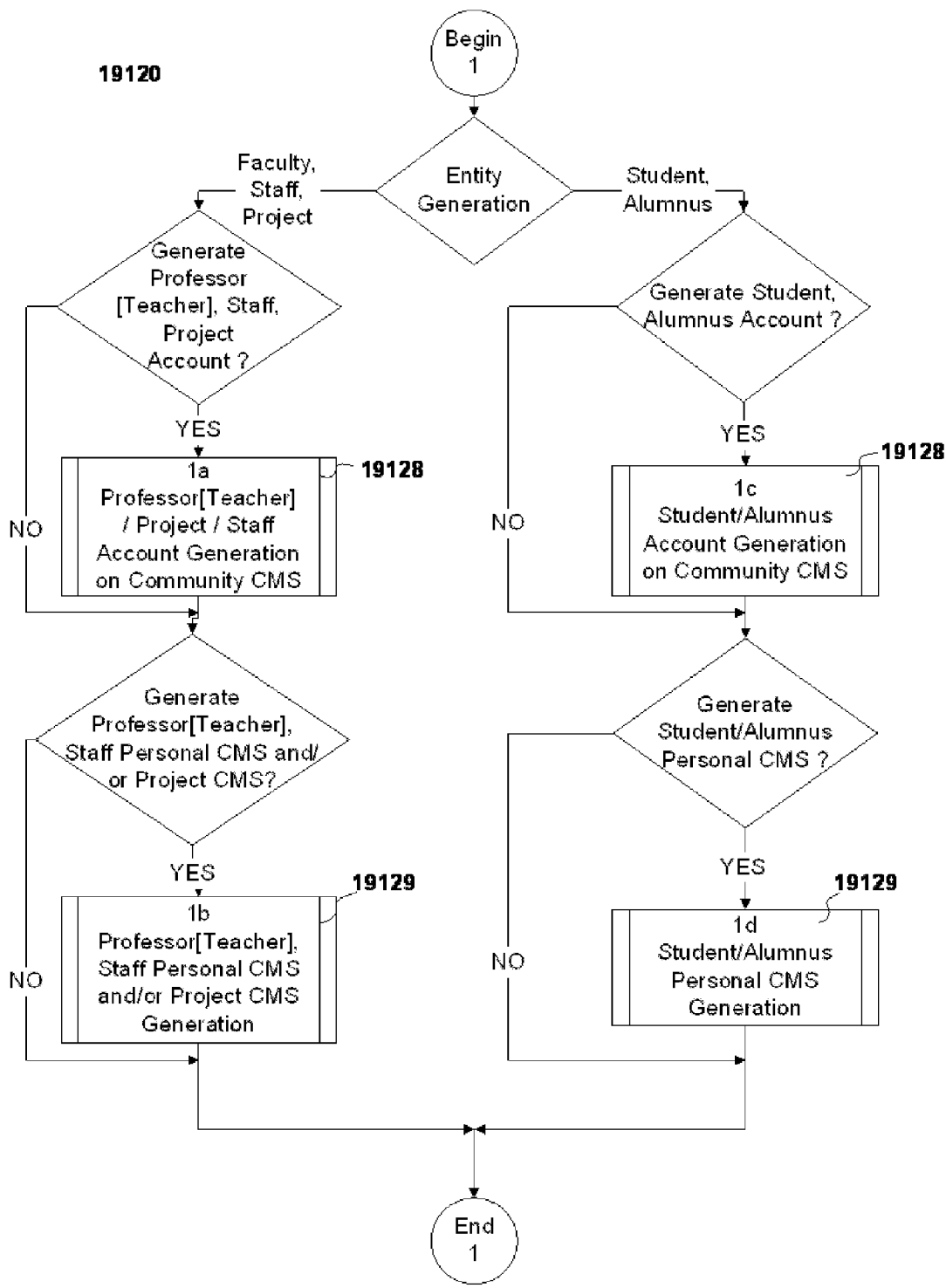
Figure 10: Flow Chart 1 – Educational Group (GCMS) Generation
(Accounts on Community CMS and generation of Personal CMS and Project CMS)

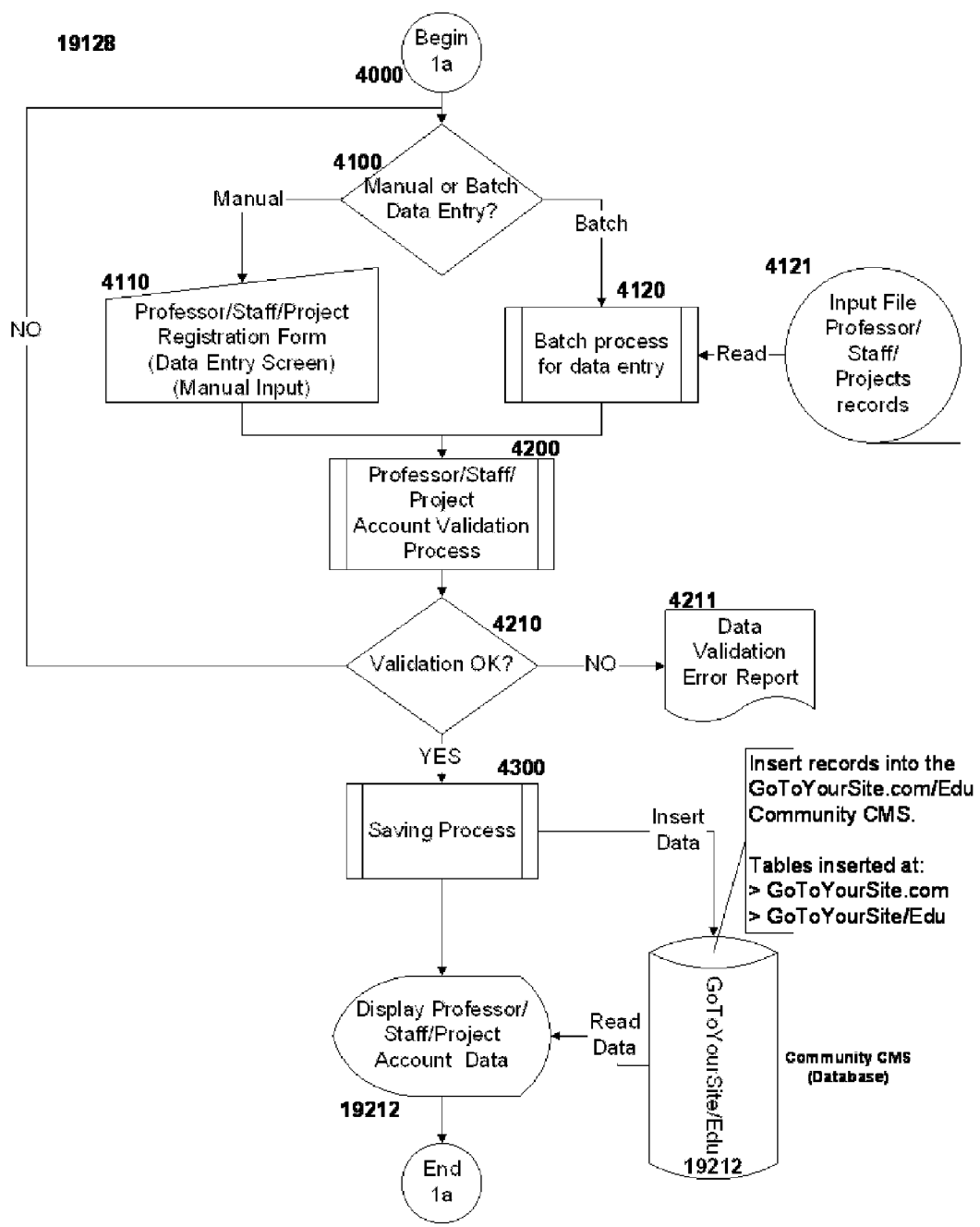
Figure 11: Flow Chart 1a – Professor/Staff/Project Account Generation
(Account Generation on Community CMS)

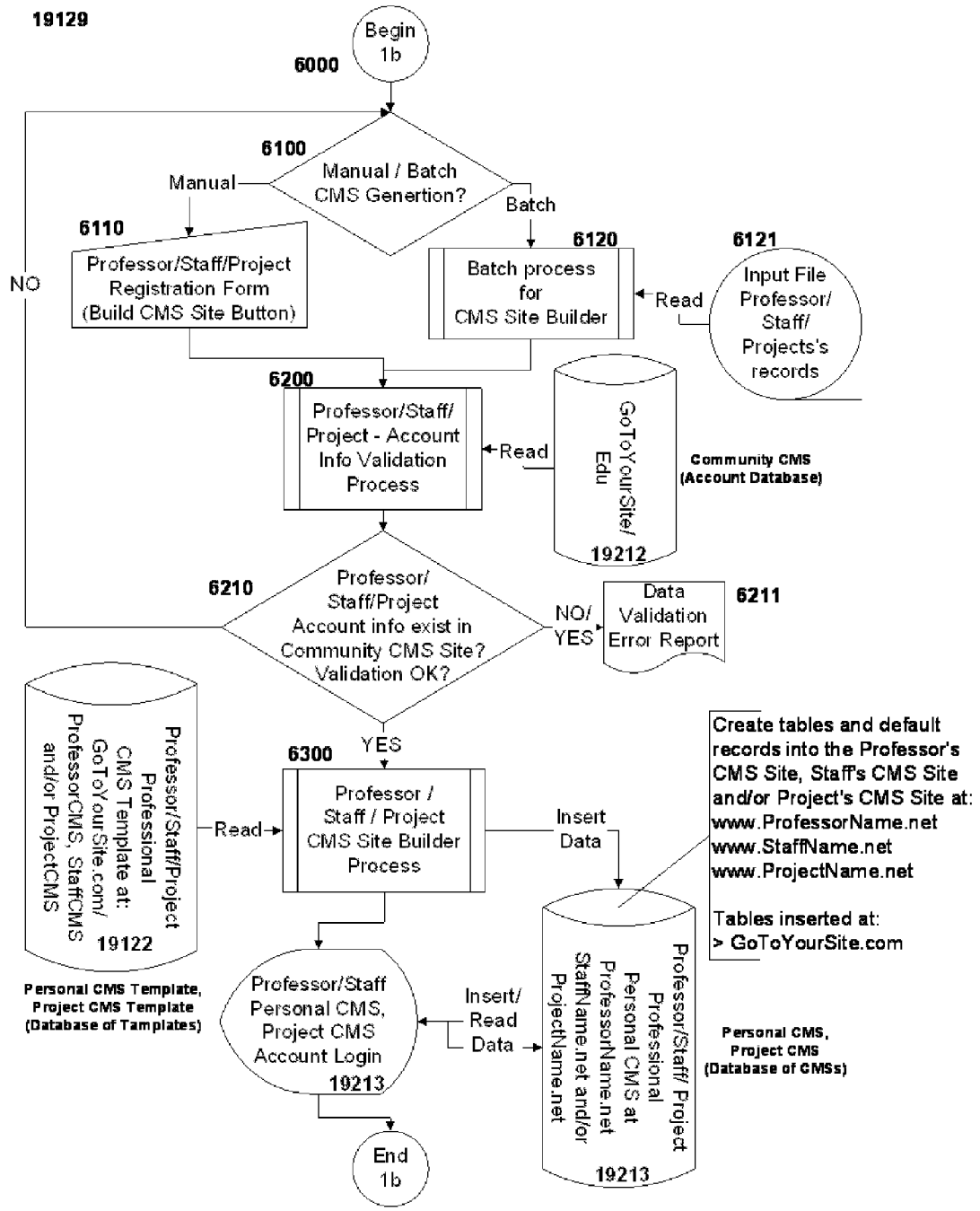

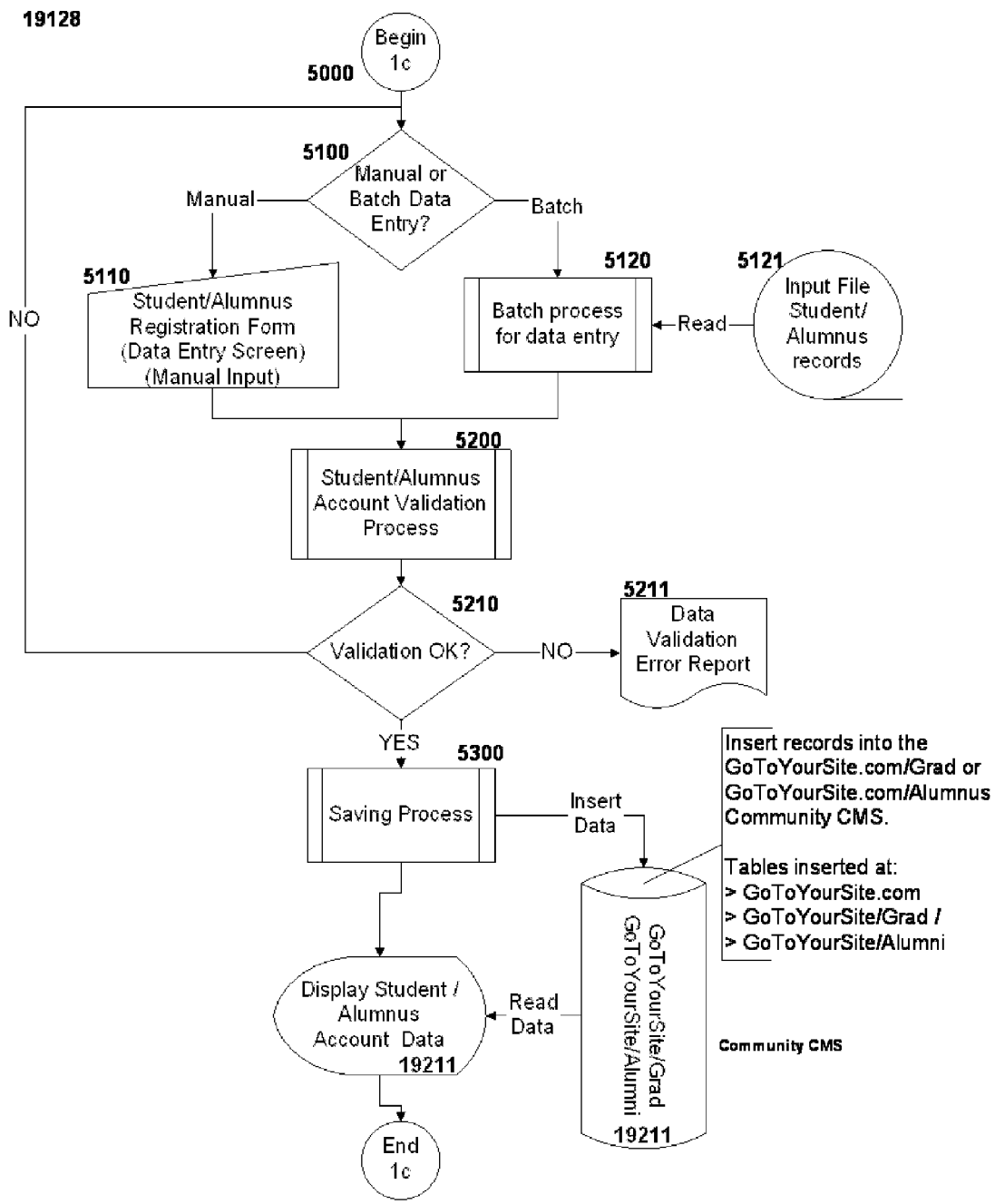

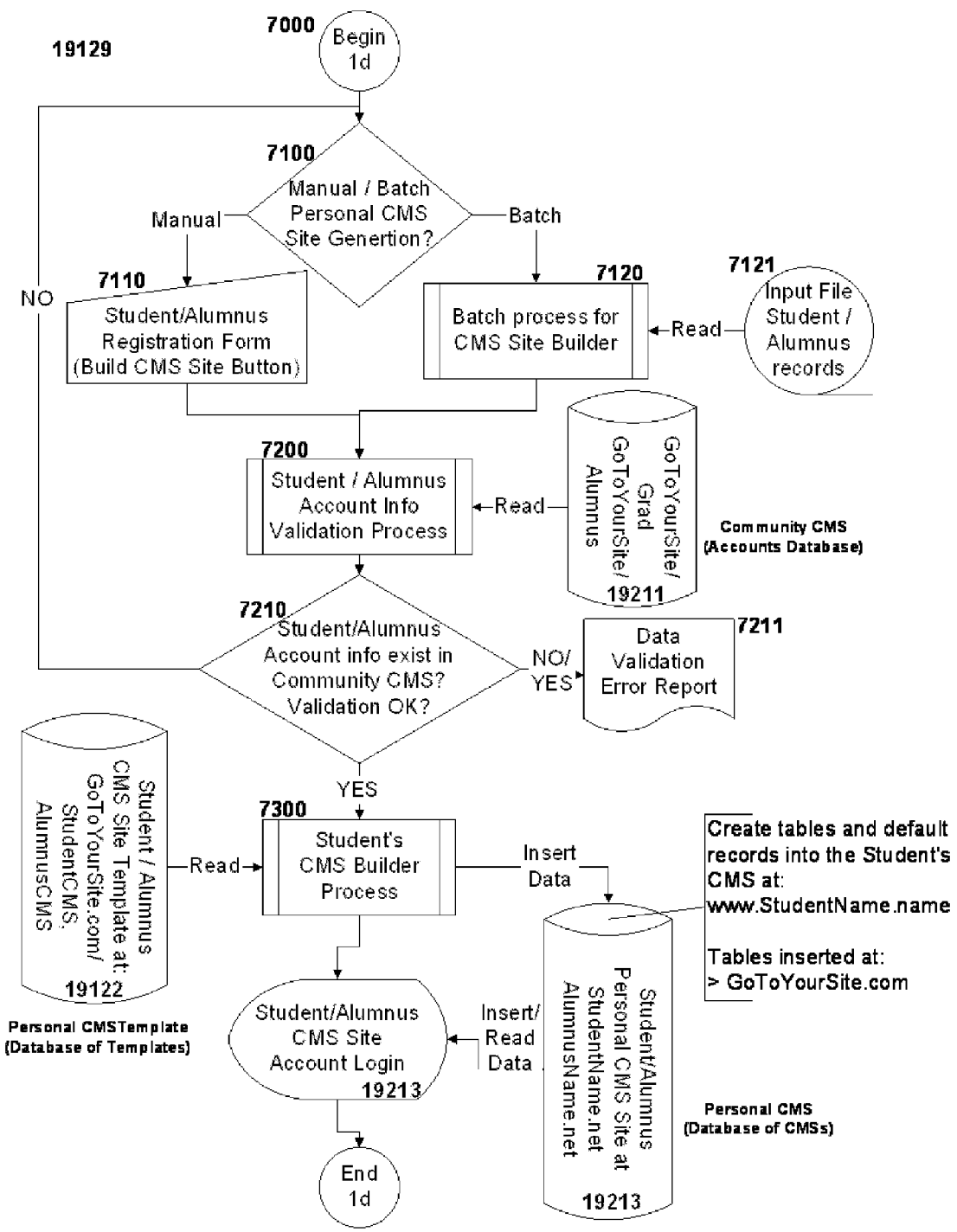
Figure 14: Flow Chart 1d – Student / Alumnus CMS Generation
(Generation of Personal CMS)

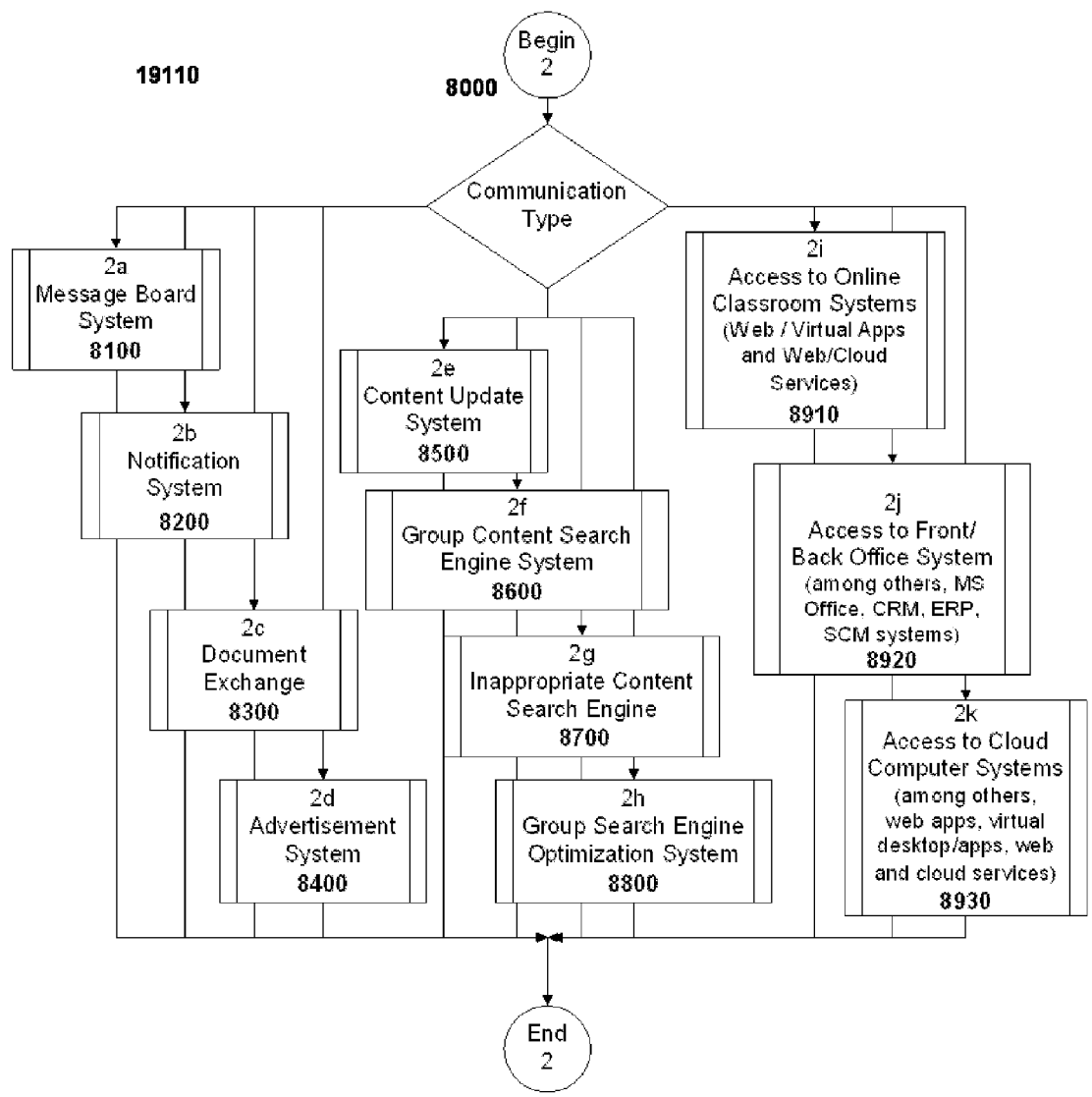

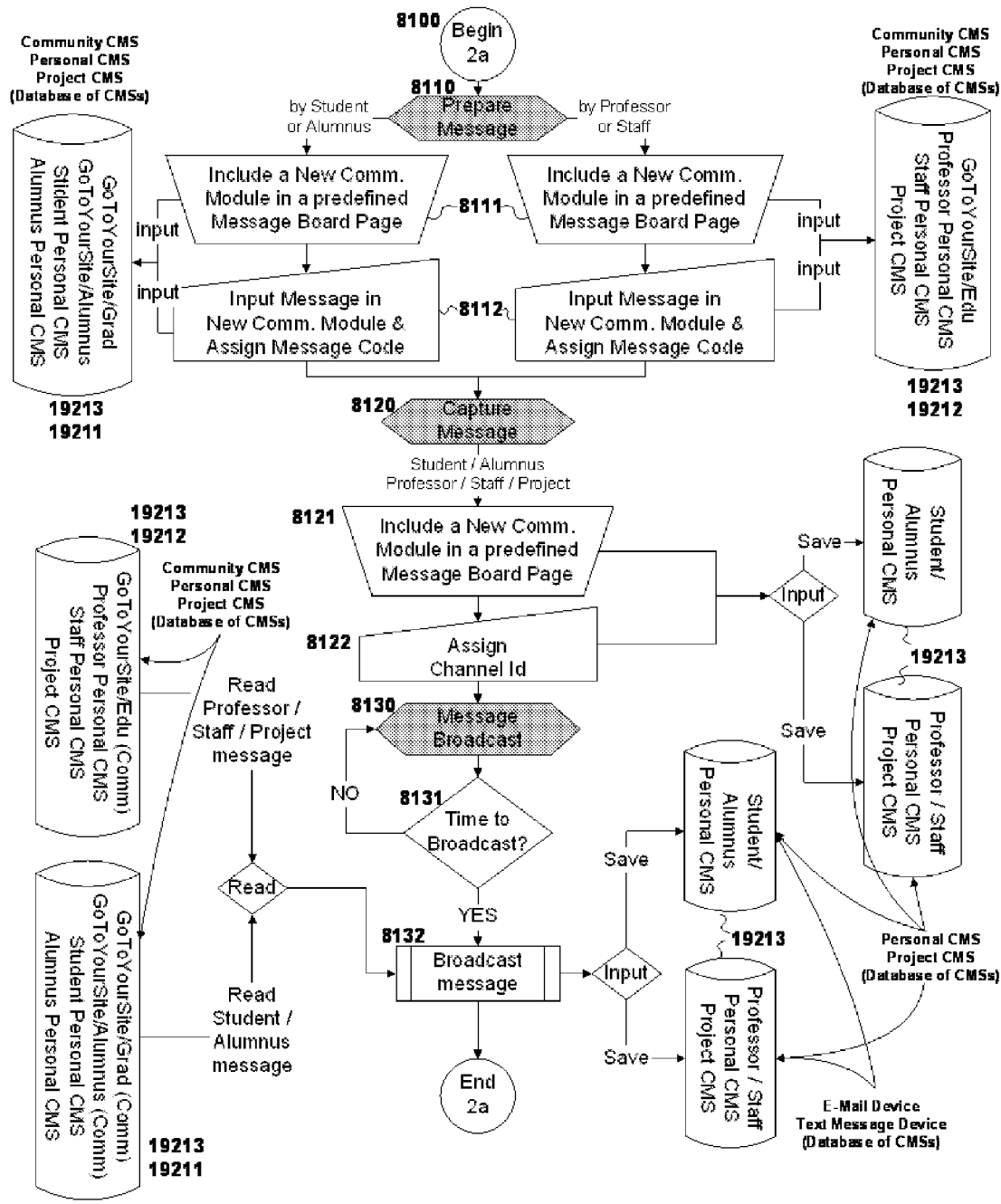

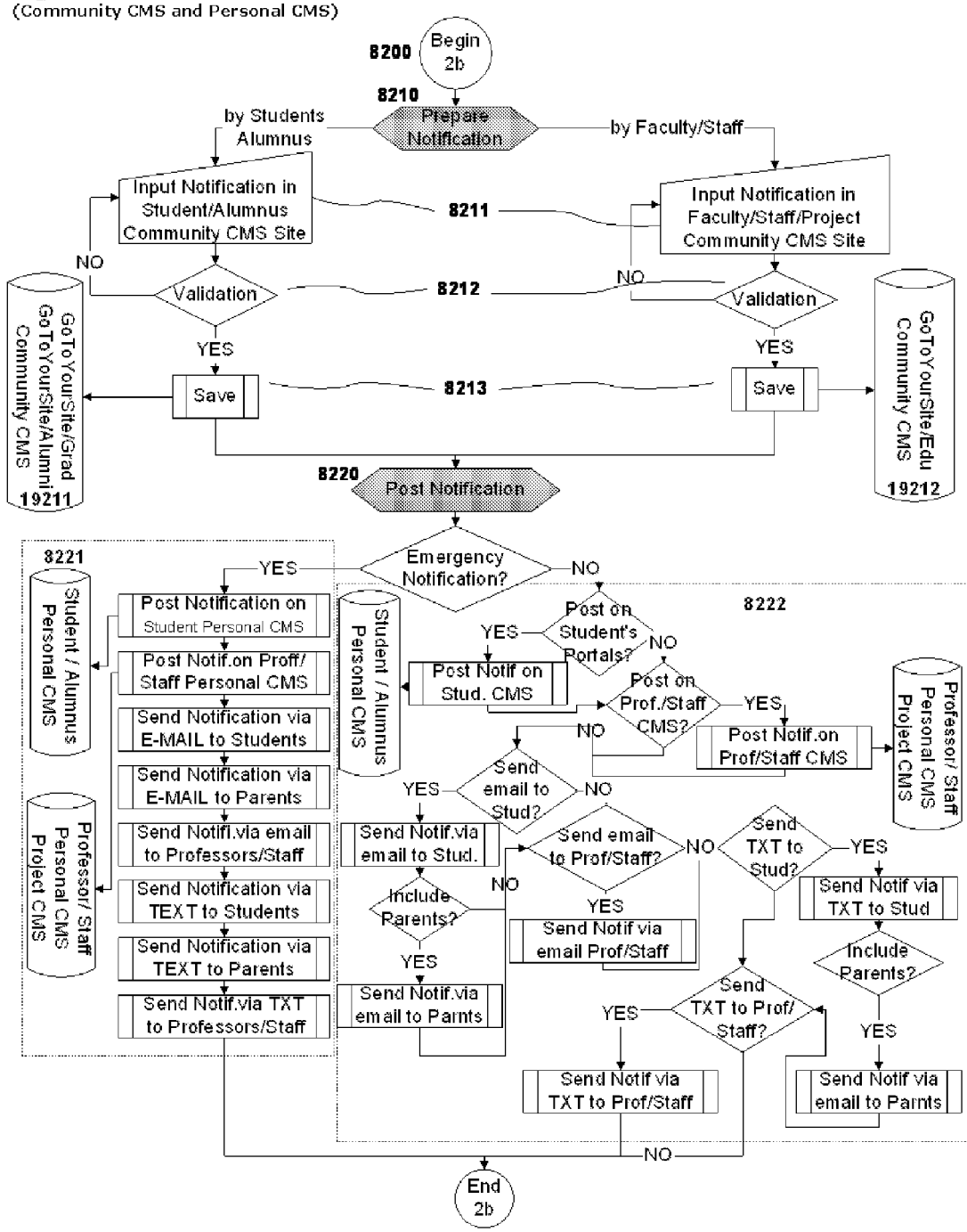

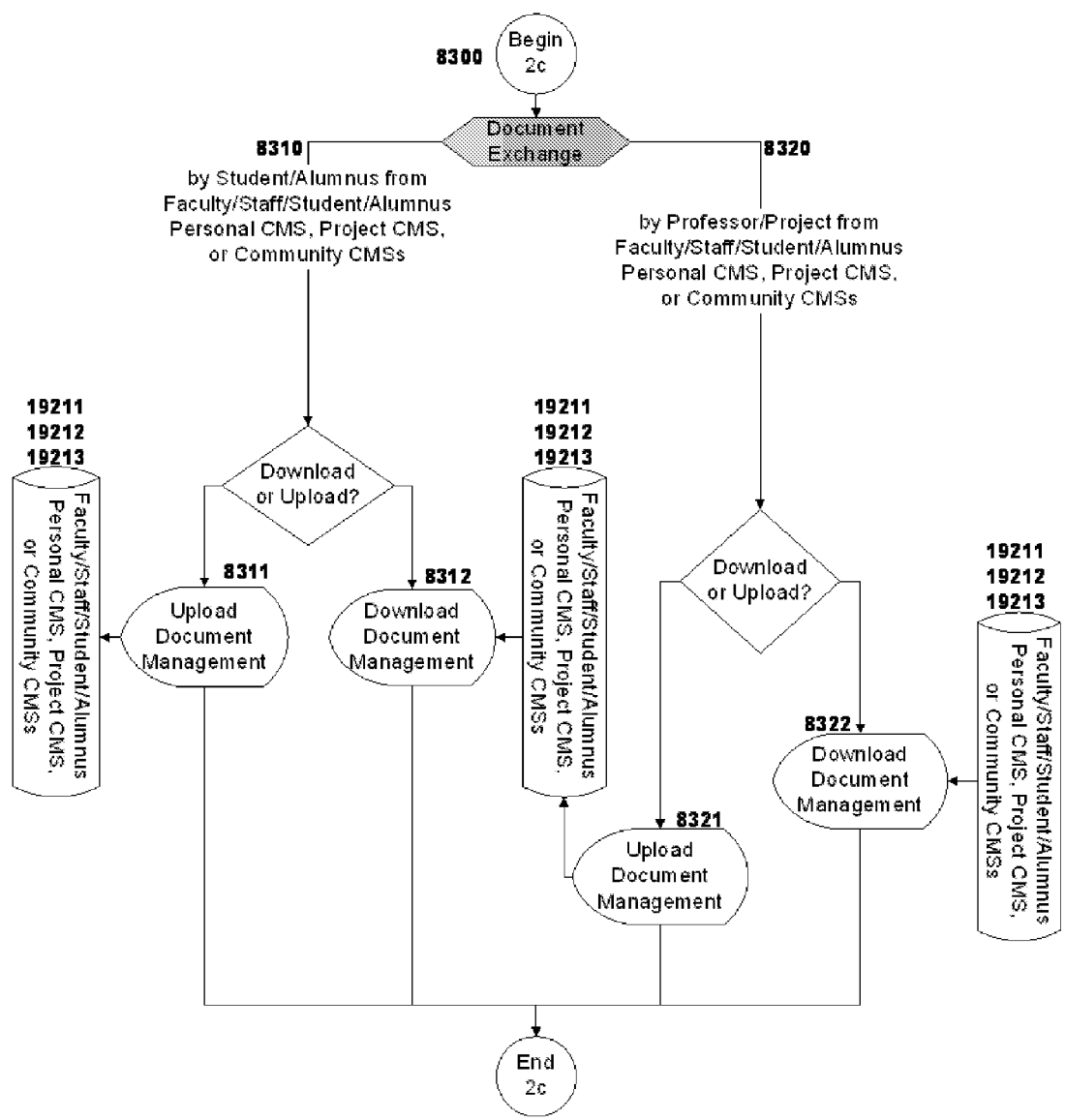
Figure 18: Flow Chart 2c - Document Exchange System
(Community CMS, Personal CMS, Project CMS)

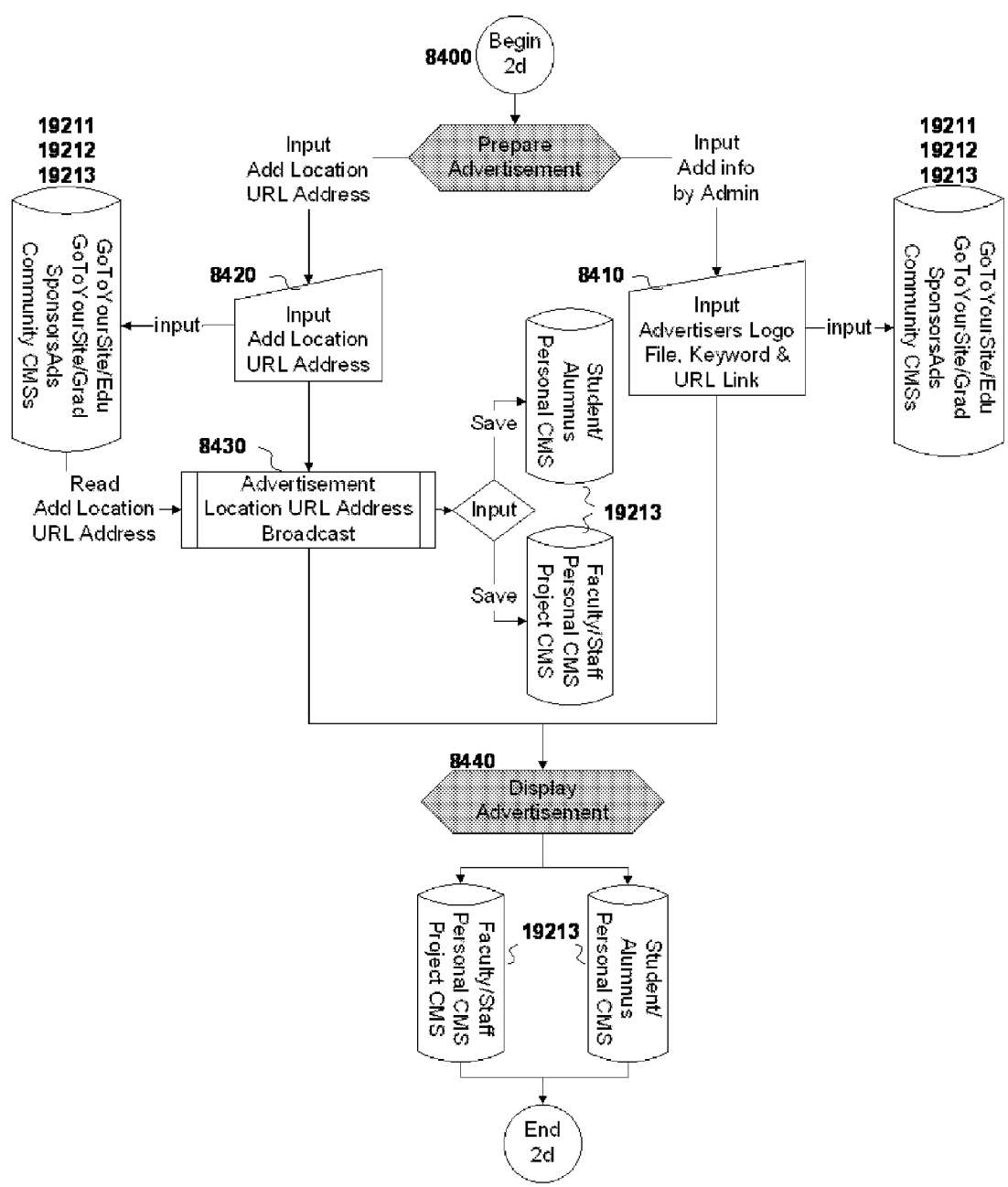

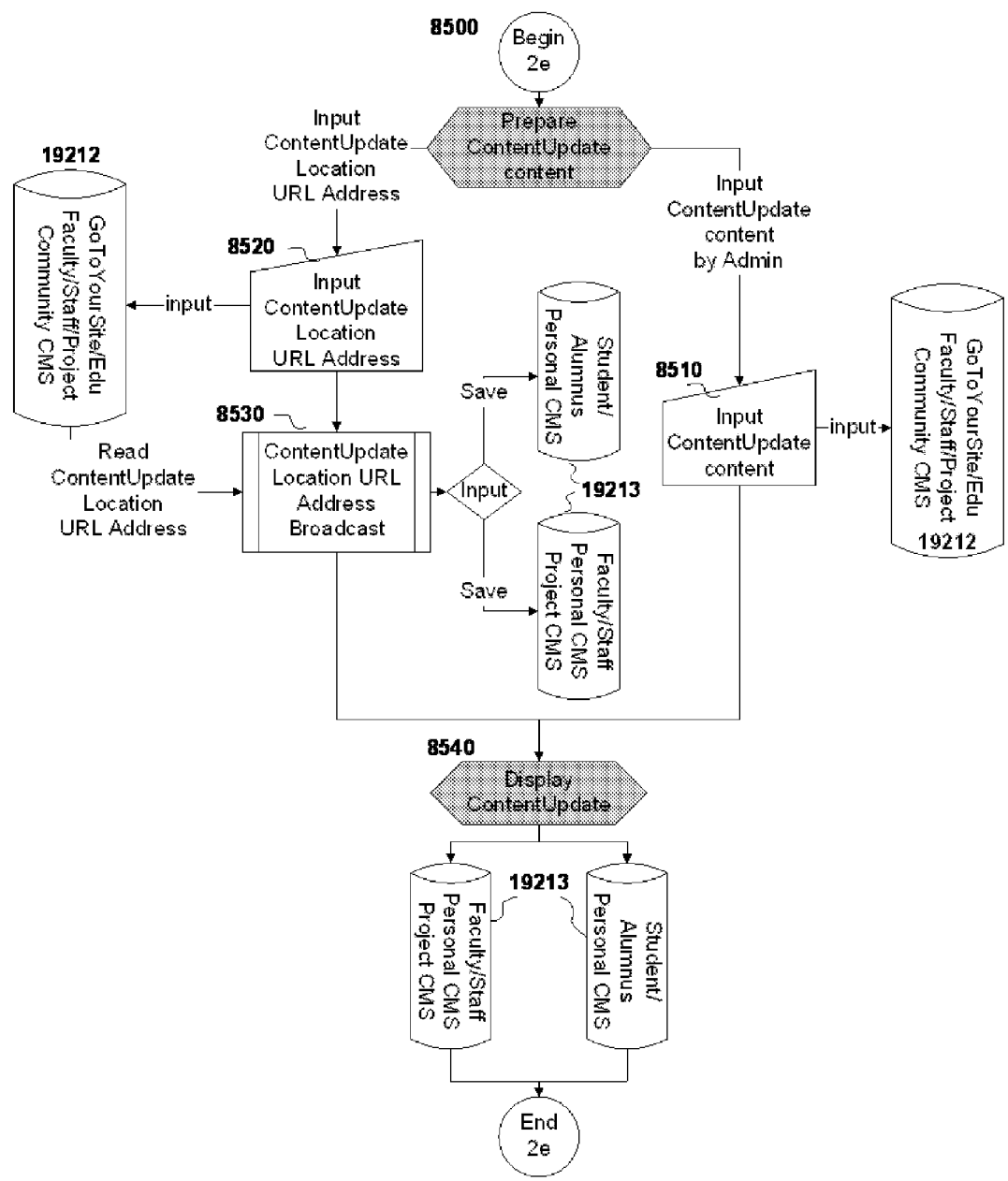

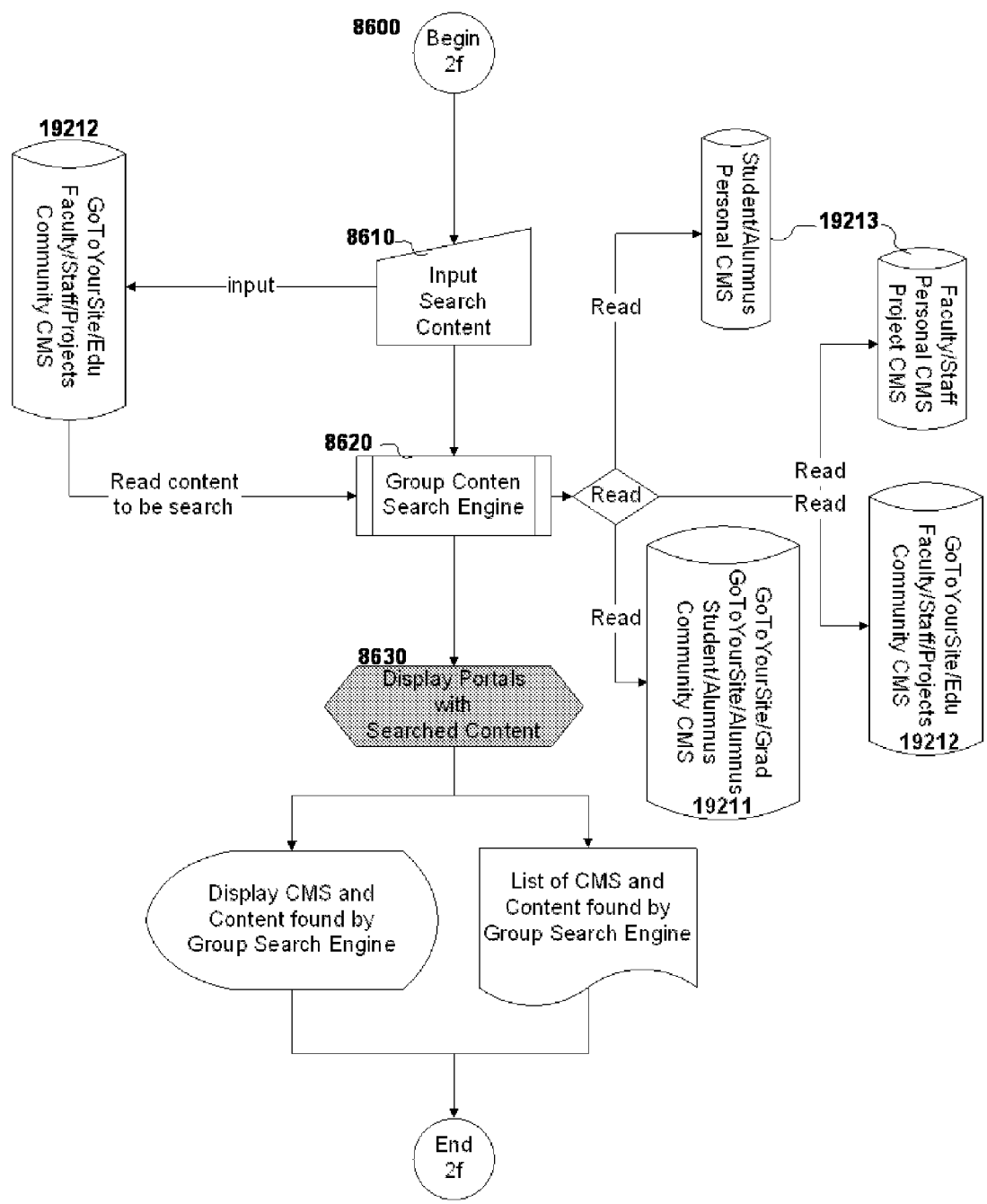
Figure 21: Flow Chart 2f - Group Content Search Engine Process
(Community CMS, Personal CMS, Project CMS)

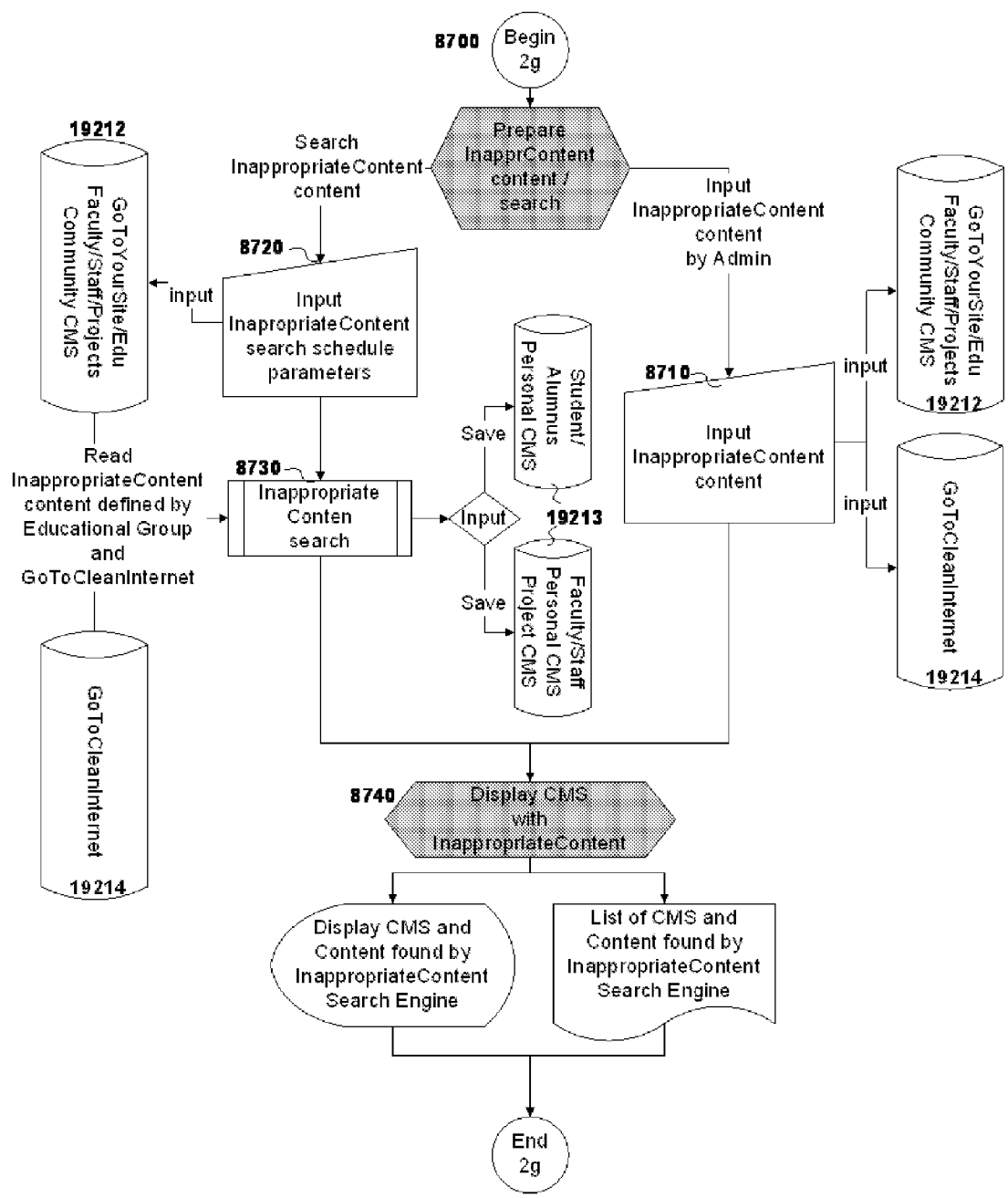

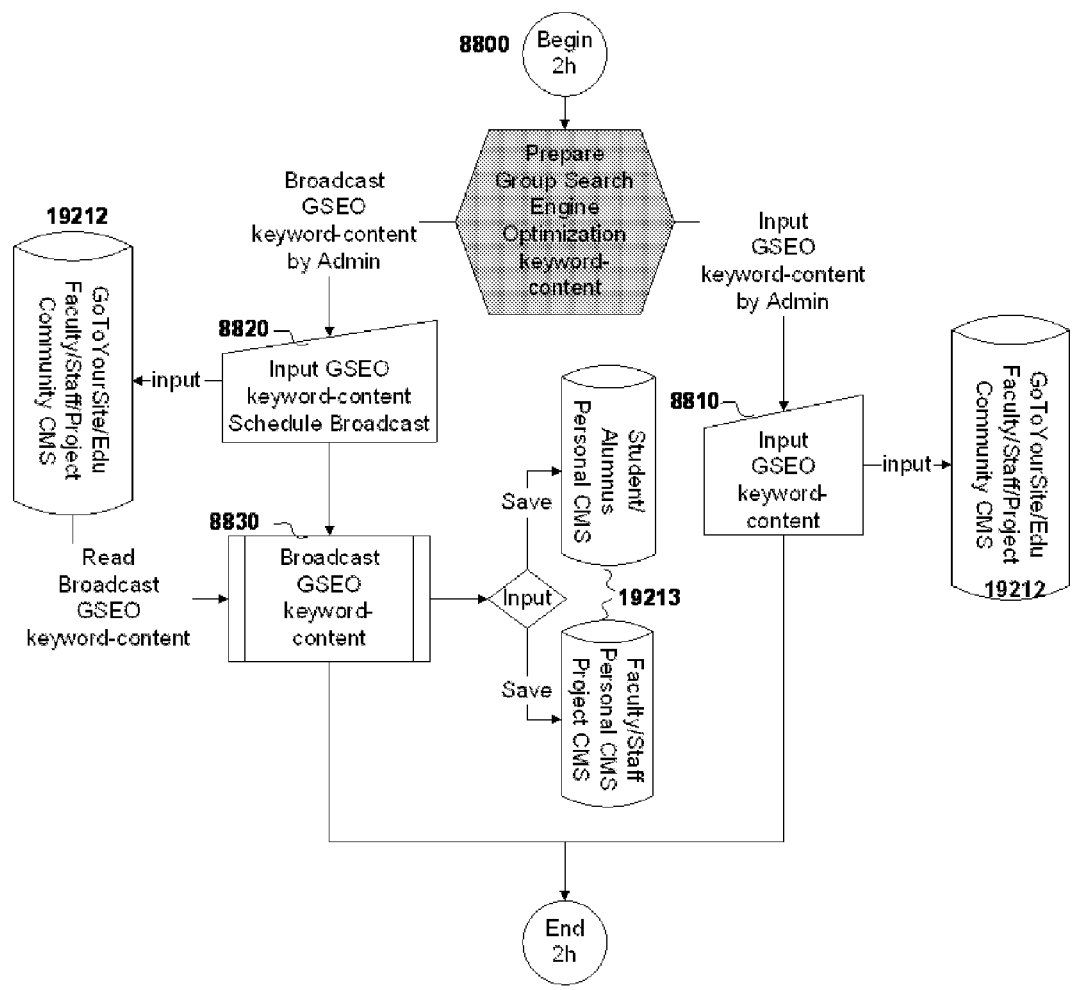
Figure 23: Flow Chart 2h - Group Search Engine Optimization Process
(Community CMS, Personal CMS, Project CMS)

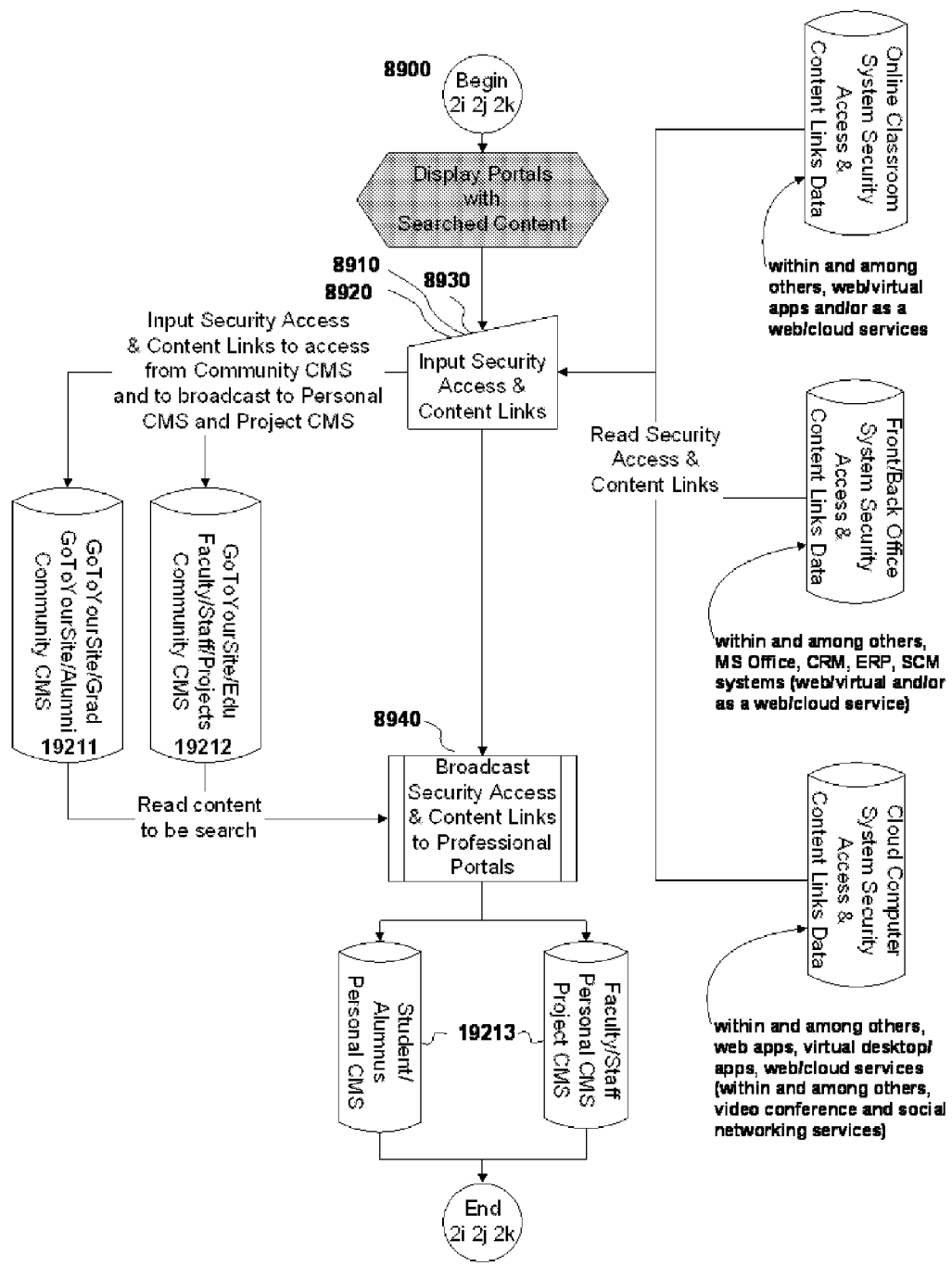

Figure 25: Sudent's Personal CMS Un-loged
(Personal CMS for Faculty, Staff, Students and Alumnus, and Project CMS, will vary on the Educational Institution's requirements for Skin/Container Template and Content Template, decided during the implementation project)
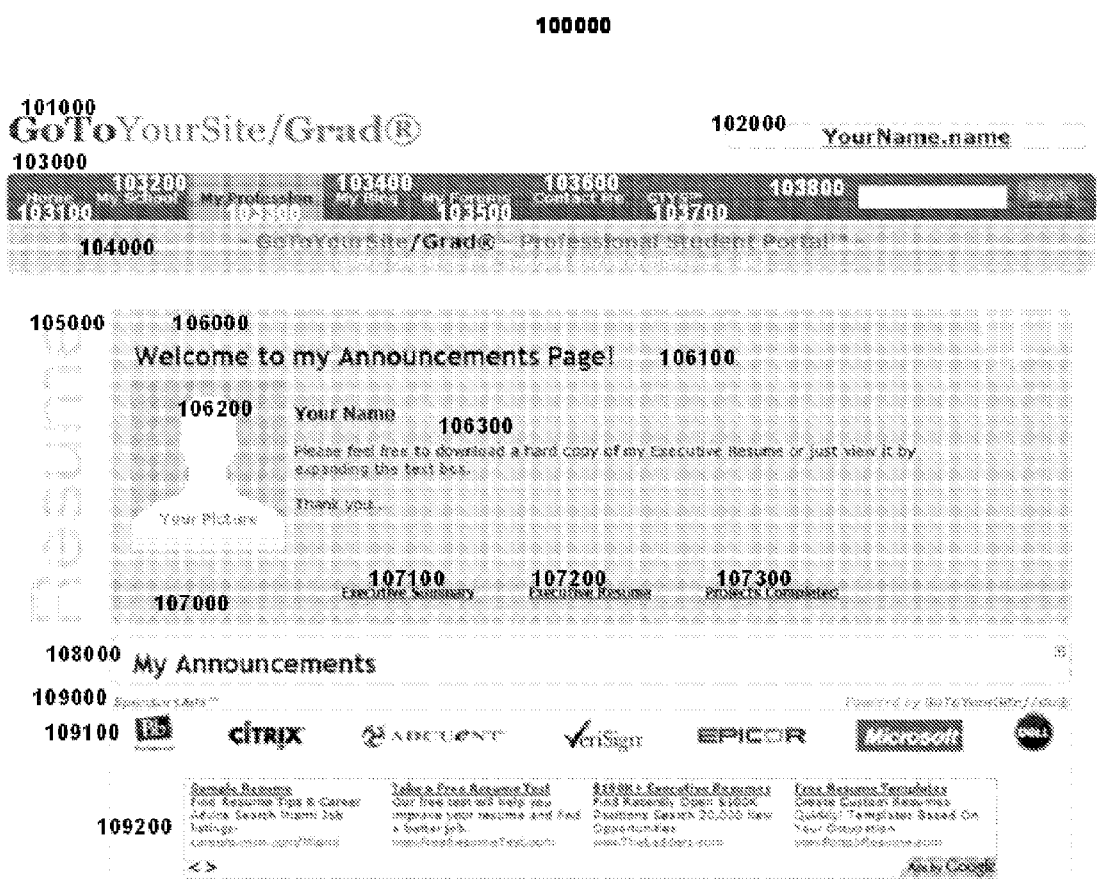

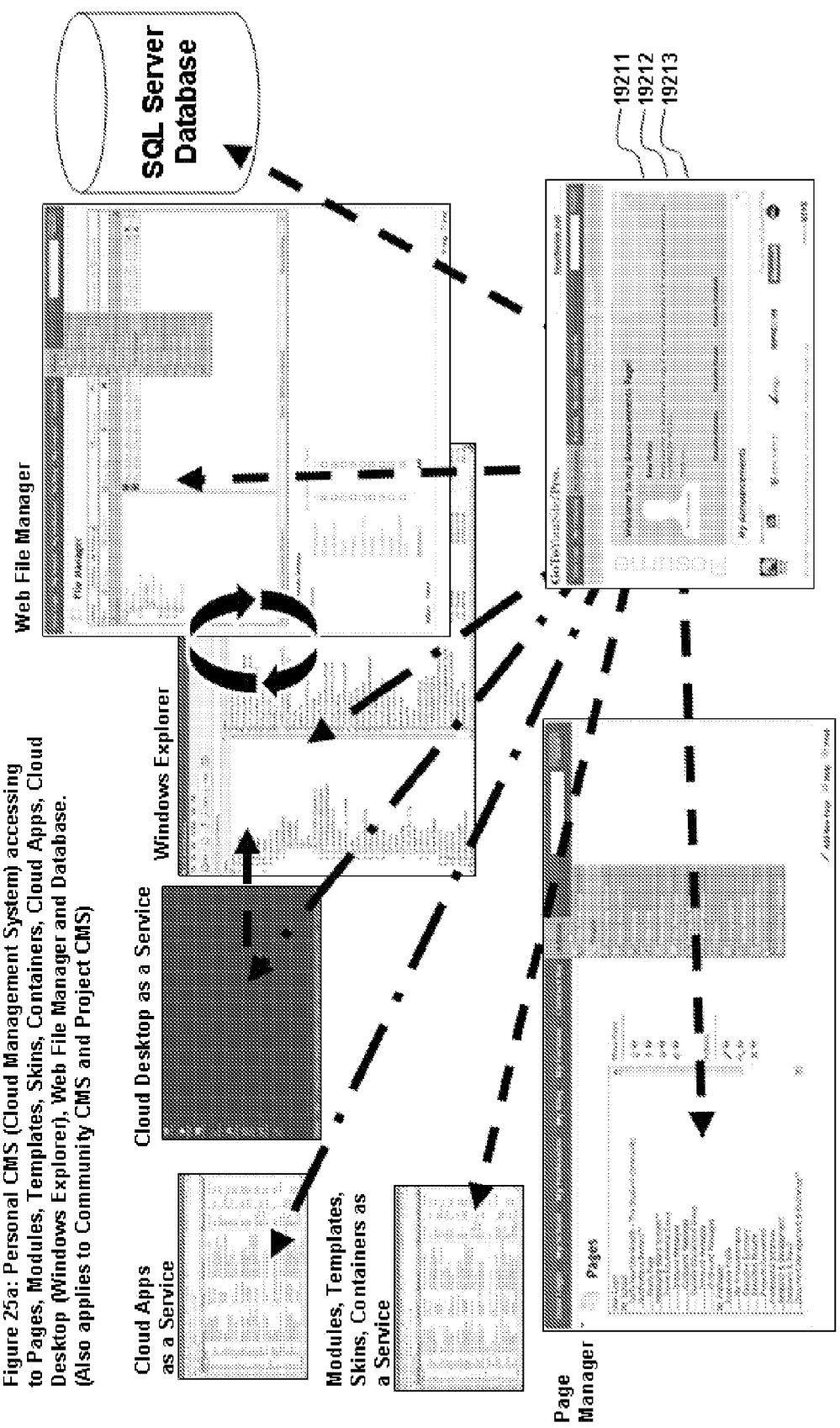
Figure 25a: Personal CMS (Cloud Management System) accessing to Pages, Modules, Templates, Skins, Containers, Cloud Apps, Cloud Desktop (Windows Explorer), Web File Manager and Database. (Also applies to Community CMS and Project CMS)

Figure 26: Sudent's Personal CMS LoginView
(same for Community CMS, Project CMS and Personal CMS for Faculty, Staff, Alumnus and Projects)
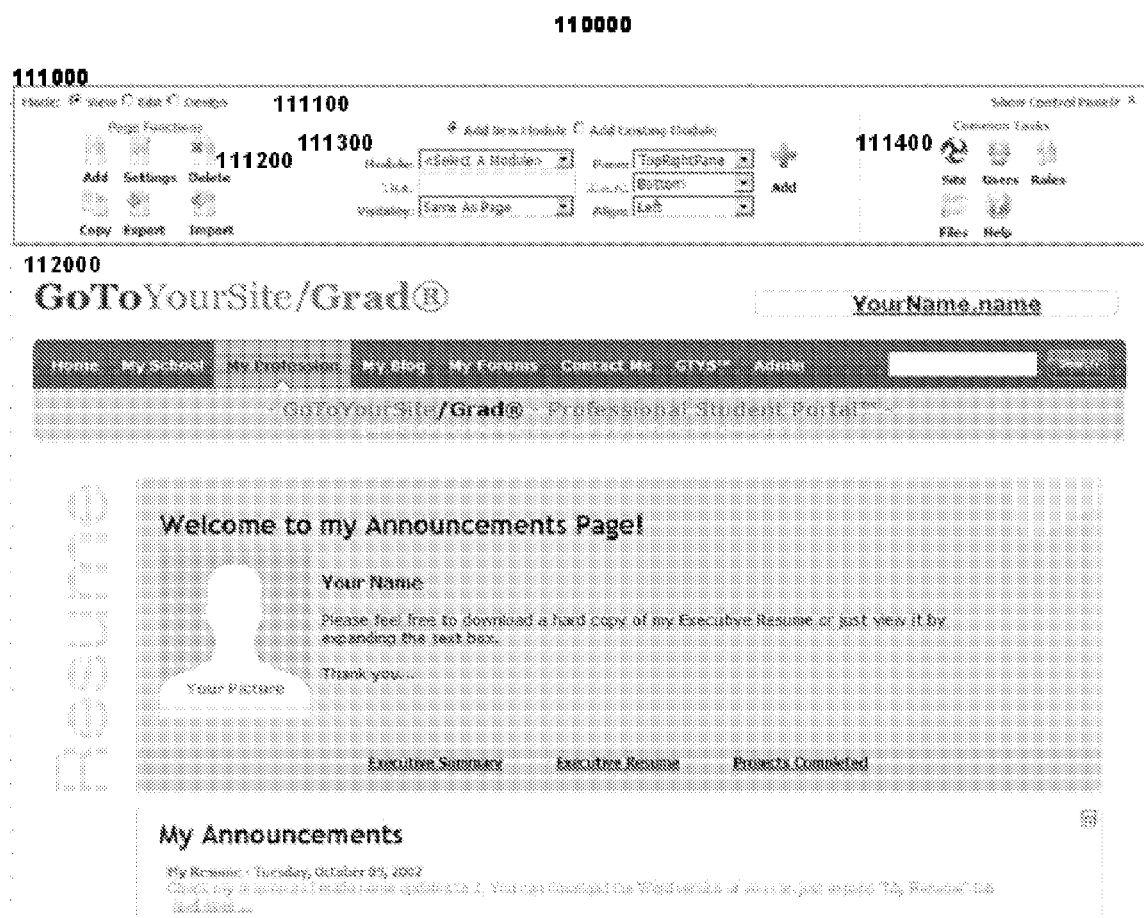

Figure 27: Student's Personal CMS LoginEditAdmin
(same for Community CMS, Project CMS and Personal CMS for Faculty, Staff, Alumnus and Projects)
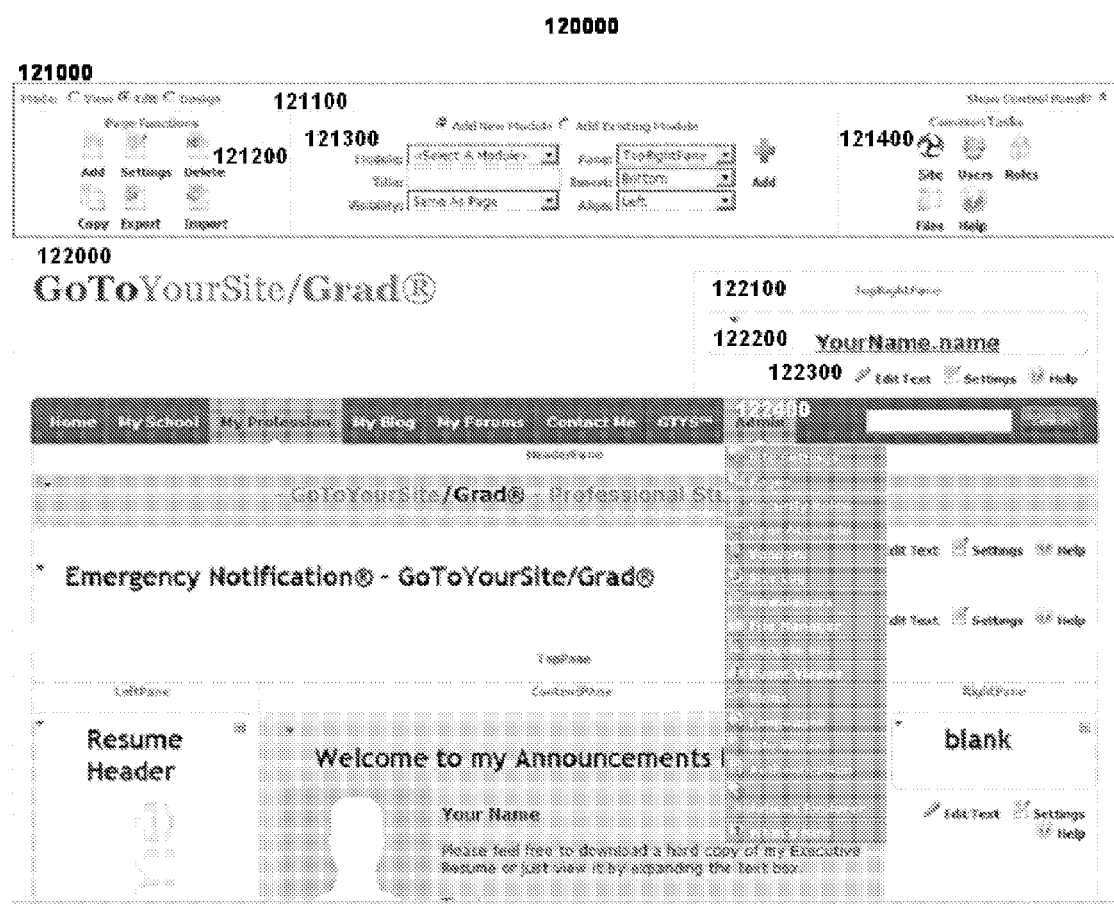

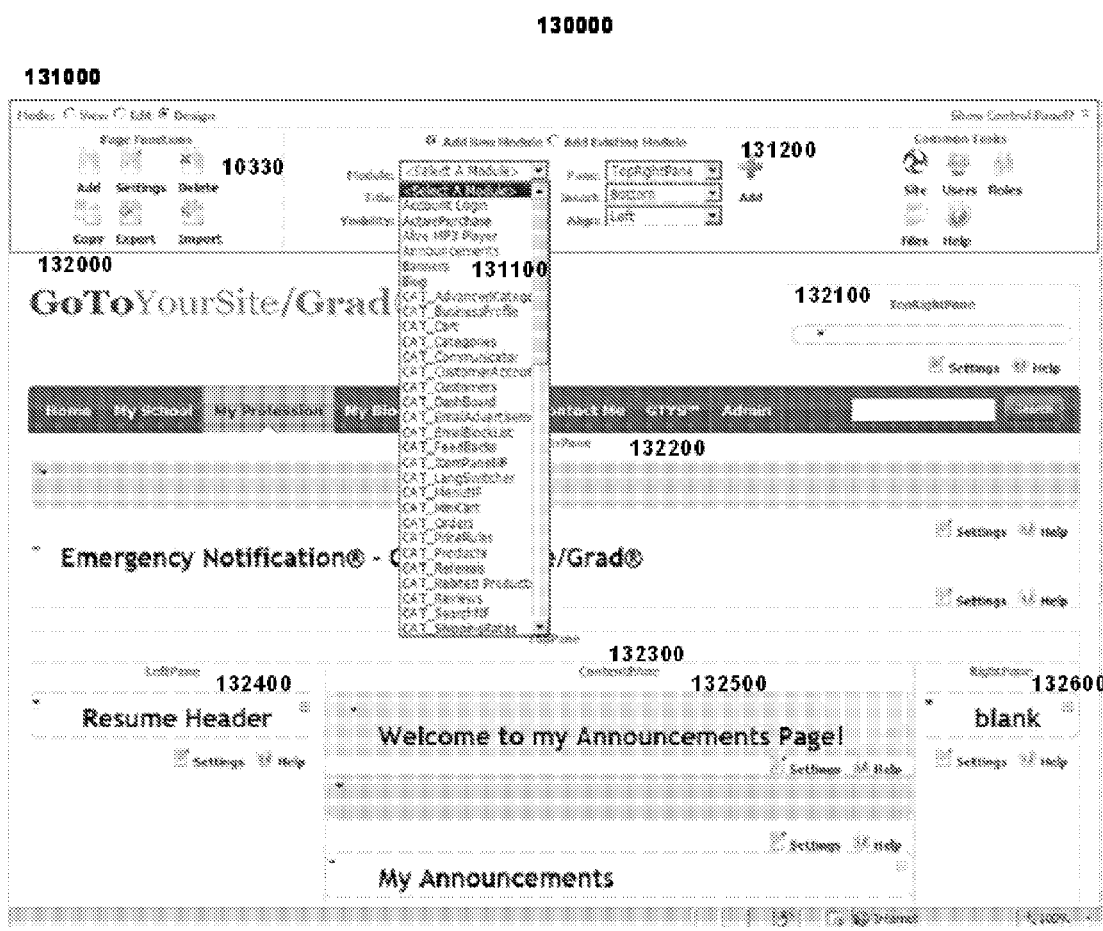
Figure 28: Student's Personal CMS LoginDesign
(same for Community CMS, Project CMS and Personal CMS for Faculty, Staff, Alumnus and Projects)

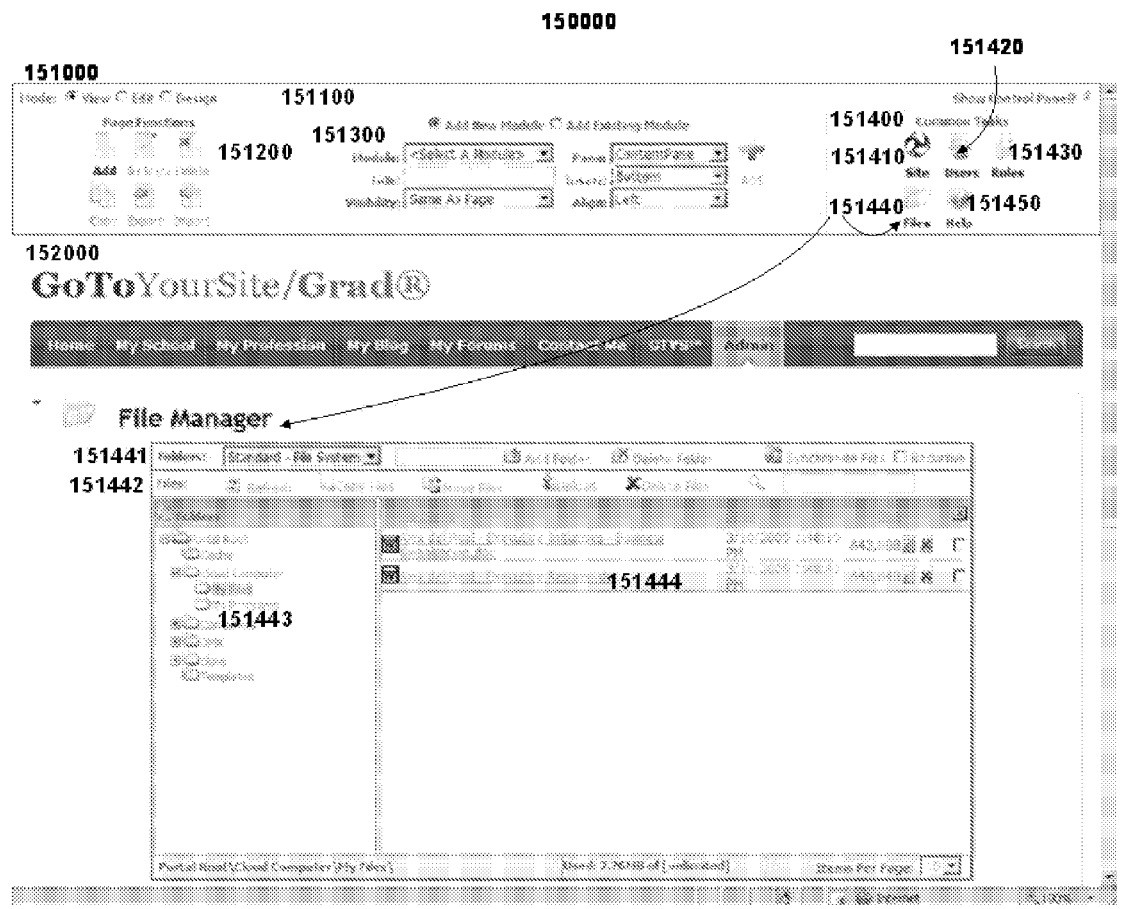
Figure 29: Student's Personal CMS - File Manager
(same for Community CMS, Project CMS and Personal CMS for Faculty, Staff, Alumnus and Projects)

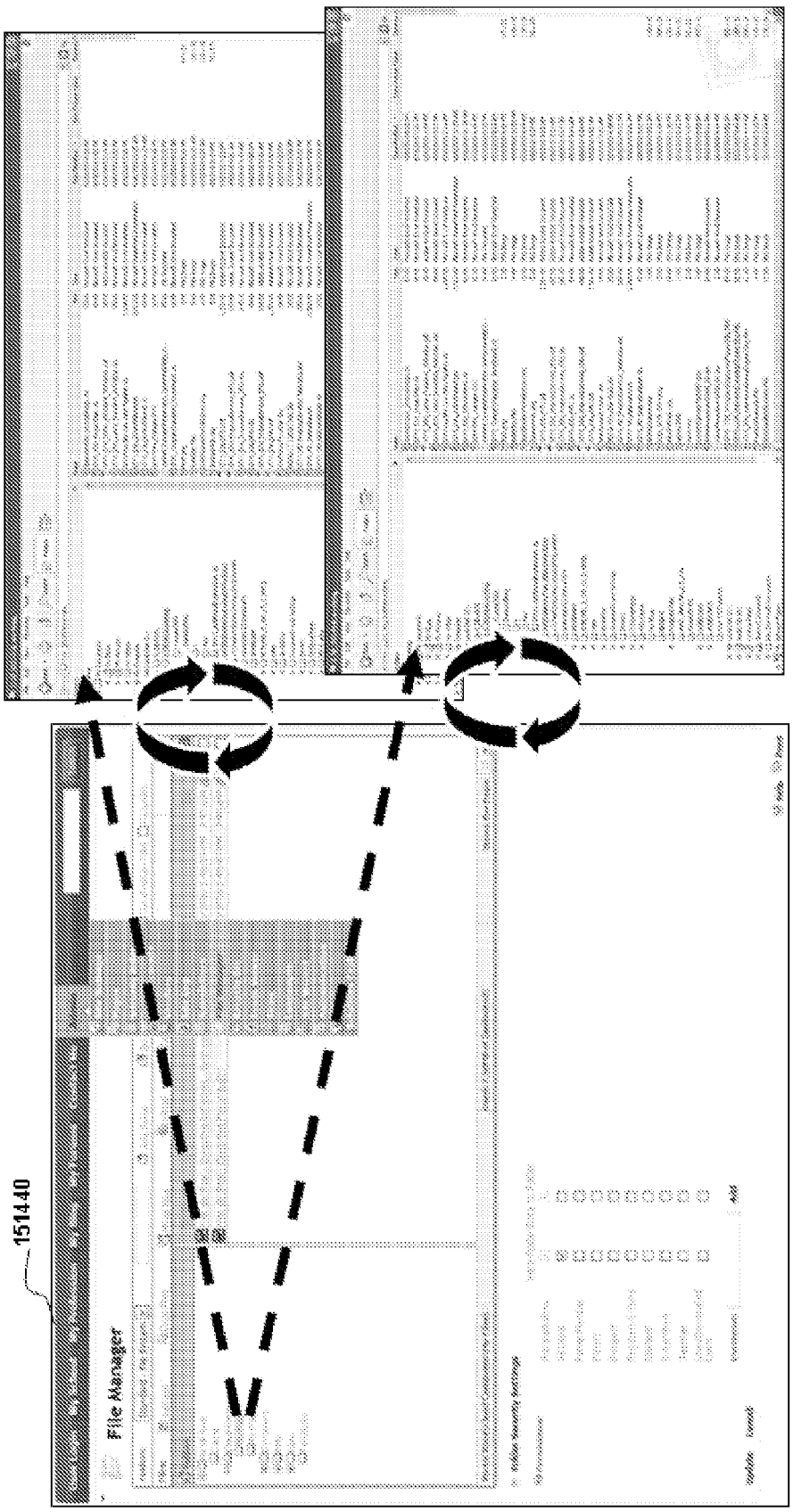
Figure 29a: Personal CMS's Web File Manager Synchronized with Two Cloud Desktops Windows Explorers (same for Community CMS, Project CMS and Personal CMS for Faculty, Staff, Alumnus and Projects)

Figure 30: Community CMS LoginViewHost
(Controlling the Educational Group [GCMS], comprised by the Personal CMS sites from Faculty, Staff, Students, Alumnus and Project CMS sites)
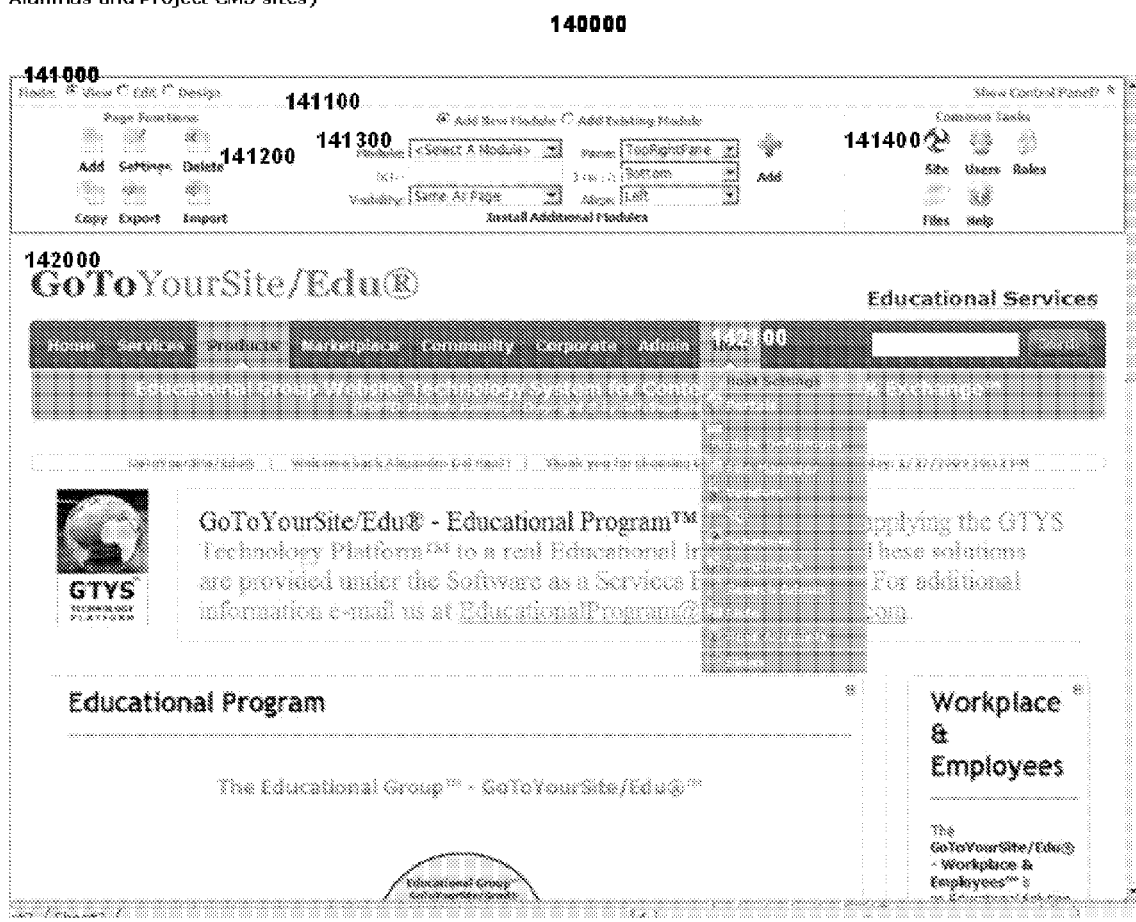

INTERNET-BASED GROUP WEBSITE TECHNOLOGY FOR CONTENT MANAGEMENT AND EXCHANGE (SYSTEM AND METHODS)

CROSS REFERENCE TO RELATED APPLICATIONS

The present application claims priority of U.S. provisional application Ser. No. 61/031,440 which was field on Feb. 26, 2008.

STATEMENT REGARDING FEDERALLY SPONSORED RESEARCH OR DEVELOPMENT

Not Applicable

THE NAME OF THE PARTIES TO A JOINT RESEARCH AGREEMENT

Not Applicable

FIELD OF THE INVENTION

The present invention relates generally to systems and methods for the management and exchange of content and data files between individuals organized in a group context with the desire of shearing such content and data files to anyone interested by having it totally or partially exposed to the internet and World Wide Web. More specifically, the present invention relates to systems and methods in which an Educational Group (or any other croup, included but not limited to Mufti Company Group, Multi Departmental Group, Workplace Group and a Single Individual Group [comprised by at least two users of the system representing the same individual]) manage and exchange professional content (or any other content) and data files and communication included but not limited to personal resume, research, initiatives, discoveries, project documents, materials (included but not limited to modules in the form of Web Apps, Virtual Desktop, Virtual Apps and Web/Cloud Services, Folder/Subfolder/Files, Photos, Music and Videos, contact information about Friends/Family/Colleagues and others, Books, Movies, TV and Radio Shows, Newsstands, Integration and Access to other Clouds and Integration and Access to Social Networks), instructions, events information, activities information, blogs information, discussion forums information within the Educational Group (mainly divided into entities: Faculty [professors or teachers], students, projects, staff and alumnus), outside the Educational Group (with individuals or other groups) and among Educational Groups (or other groups); by using an electronic network such as the Internet and World Wide Web (or Intranets, LANs WANs or other networks or some combination thereof) and a group site technology development environment. The present invention also relates to the provision of an infrastructure that allows for on-line registration and subscription payments for Personal Clouds (preconfigured Personal Cloud Management Systems or Personal CMS) to include in the Educational Group (Group Cloud Management System or GCMS) as well as sponsors advertisement to be displayed in each Personal Cloud (Personal CMS) within the Educational Group (GCMS).

BACKGROUND OF THE INVENTION

Users (e.g.: Students, Professors) have been forced by Educational Institutions to upload their professional resume or other related professional contact into the Educational Institution website or into an ePortfolio system hosted by the Educational Institution. On the other hand, Educational Institutions offer Computer Labs, where users (e.g.: Students) can go to and use the several software applications offered by the Educational Institution. Some users (e.g.: Students, Professors) have their own computer (e.g.: PC, laptop, tablet, etc.) with some software, but are forced to go and use the computers at the Computer Labs in the Educational Institution when they need to use a specific software application that they don't have in their personal computers.

With the evolution of the internet and software technology, including virtualization, collaboration and cloud computing, this old rigid paradigm described in paragraph 3, can now change into a flexible and more economic solution for everyone, the Educational Institution and the User. And the User is not just limited to Students and Professors, now the Users include Students, Professors, Staff, R&D Projects (Project Teams) and Alumnus.

The New, Flexible and More Economic Solution should allow the Educational Institution to deliver all necessary software to the user in one place, a software device that can be accessed by the user (e.g. Student) at anytime from anywhere and on any hardware device. And the software device should be operated by the user making it personal and independent from the Educational Institution, so the user can customize and store his/her files and have privacy and not have to worry about what would happen when departing from the Educational Institution (e.g.: a student graduating).

In addition, the Educational Institution should apply the same standards for any user, whether is a Student, a Professor, a Staff, a Alumnus or a Team in a R&D Project. So the Educational Institution should be able to connect these software devices into groups and assign security based on these groups. Furthermore, these software devices should be able to communicate, and share content which could include software applications.

The prior art to this invention is what is called a Content and Portal system, which becomes obsolete with the systems and methods described in the present invention. The following is a brief description of the problems of the prior art, and how are solved by the present invention. It is recommended to read the entire description and drawings to fully understand the new art and its capabilities to solve the problems of prior arts.

Problem 1: The prior art associates the user with a user account, thus all users are accounts in the Content and Portal System (one website). There is no physical independence per user. The problem with this art is that it is rigid and the user has no option to split from the group (one website). Solution: The present invention associates the user with a user account and a CMS site (e.g.: Personal CMS site). There is a physical independence per user as there is a physical software independence per CMS site. The user has the option to split from the group by disconnecting his/her CMS site from the group (GCMS site) and continue using his/her CMS site as a Stand-Alone. This disconnection from the GCMS site is at both levels: 1) Logical disconnection of the CMS site from the group GCMS, and 2) Physical software disconnection of the CMS site from the group GCMS, providing the opportunity to export and remove the CMS site from the server hardware environment, and import the CMS site into a different server hardware environment, where the CMS site might never connect to a GCMS.

Problem 2: The prior art provides the user with a limited type of content to create and in a rigid format as all users have to follow the same format (users are accounts in one website).

And the content is limited to user content (text content and limitation on files to upload). Solution: The present invention provides the user with unlimited types of content and total flexibility, as each user is free to design their own format in their own CMS site (e.g.: Personal CMS site), without having to follow a structured format. And the content is unlimited and can be categorized as the content and data files created and stored by the user in his/her CMS site, and the content and data files selected, stored and used by the user in his/her CMS site. The content and data files that the user can create, select, use and/or store in his/her CMS site are: (a) Professional Profile under unlimited menus/pages/modules and with a personal and customizable skin/container design, (b) Personal Files (docs, photos, music, videos, etc.) under a personal folder/subfolder directory structure, (c) Personal Web Apps and Personal Content, (d) Personal Virtual Desktop/Apps and Web/Cloud Services, (e) a Personal Security System that he/she can control (user and user roles) and incorporated herein, user accounts (registered users). And the ability to fine-tune all of these (a, b, c, d and e) independently from the rest of the CMS sites in the group (GCMS). In addition the present invention allows the user to split from the group and take with him/her, all the above personal stuff described in points a, b, c, d and e, while the prior art does not allow the user to split from the group (website) as the user is just an account.

Due to the above reasons, the description and drawings of the present invention in this patent application, refers now to Cloud Management System sites (CMS sites) and Group Cloud Management System sites (GCMS sites), as a way to differentiate this new art from the prior art.

BRIEF SUMMARY OF THE INVENTION

The new, flexible and more economic solution is delivered here with the present invention: An Internet-Based Group Cloud Management System or GCMS, comprised by several Cloud Management System sites or CMS sites, connected in a group, with the capability to communicate with each other. A CMS can be preconfigured for an individual, creating a Personal Cloud or Personal CMS site, which can be given to a user (e.g.: Student, Professors, etc.) based on a subscription basis. A Personal CMS site can disconnect from the group or GCMS (e.g.: Educational Group), and can continue operating in a Stand-Alone mode, allowing the user (e.g.: Student), to have total control and ownership of the content he/she includes in the Personal CMS site, and being able to continue using it while no longer being associated to the GCMS or Educational Group (e.g.: Educational Institution). For example, a student graduating from the University and taking with him/her, the Personal CMS site. Depending on the deployment environment strategy selected by the University for the present invention (Educational Group: GCMS), the action of the Student (or any other user), of taking with him/her the Personal CMS site, could include the physical relocation of the Personal CMS site from one hosting environment (e.g.: University Datacenter) to another hosting environment (e.g.: www.GoToYourSite.com).

With this new approach, this new paradigm with the present invention, delivering a single personal software device (e.g.: Personal CMS site), hardware independent, that can actually consolidate all content (see paragraph 3) for the user in one software place, where the user can customize based on his/her preferences, and that the user can access at any time, from anywhere and from any internet-browser hardware device.

This personal software device, is identified in this system and methods patent application as the Personal Cloud Management System site, or Personal CMS site (Personal Cloud). That can be accessed through any internet-browser device, so is hardware independent for the user, and that can be accessed at any time and from anywhere, for example from the home, the educational institution, the car or any other place where the user can have a mobile internet-browser device and a temporary connection to the internet through an internet service provider.

Furthermore, this personal software device (Personal CMS site), is able to connect in a group to other software devices (e.g.: Community CMS sites, Personal CMS sites, Project CMS sites), and to communicate with other software devices. And this personal software device delivers to the user, the capability to store Modules (e.g.: software applications, which is a form of content and data files grouped under a functional purpose), Content and Data files that has been produced with the same Modules (e.g.: MS Word, Excel, Power Point, Blog, Calendar, etc.) and publish those content and data files to the world wide web and directly from the same personal software device where these contents and data files are being created and stored. The method of publishing these files is through the same software device's Front-End (Pages and Modules) with the capability to include content and links to the data files, and expose such content to the general public (world wide web) or make it private under a user registration, as the personal software device (Personal CMS site) is also multiuser and can connect to a group or GCMS.

This group of software device (e.g.: Community CMS sites, Personal CMS sites and Project CMS sites), is identified in this system and methods patent application as the Group Cloud Management System (GCMS). The GCMS is comprised by several CMS sites (Community CMS sites, Personal CMS sites, Project CMS sites) connected-in-a-Group to a Community CMS site controlling the group, and the GCMS allows for communication among the Community CMS sites, Personal CMS sites and Project CMS sites in the group or GCMS, and with other CMS sites in other GCMS groups, if these GCMS sites are connected.

The Internet-Based Group Cloud Management System (GCMS) 10000 according to FIG. 1 and FIG. 2 is comprised of the following components: 1) A Hosting Server Computers 12000: Where the Internet-Based Group Site Technology CORE System 19100 resides. The hosting servers manage the storage 18000 of the Educational Group, comprised by several CMS sites (Community CMS sites, Personal CMS sites and Project CMS sites). These servers are connected to a network such as the Internet and World Wide Web (or Intranets, LANs, WANs, or other networks, or some combination of thereof). 2) A Hosting Server Software Platform (13000 to 18000): Where the Internet-Based Group Site Technology CORE System 19100 can be interpreted by the server computers hardware 12000 and can operate to provide the desired functionality for the Educational Group 19200. The software platform can be divided into the following software categories: the Operating Systems (13000 to 17000) and the Client-Server topology platform including the Relational Database Management System 18000. 3) A User Web Browser Device 11100: Where the user can connect to the internet via a browser and access the Internet-Based Group Site Technology CORE System 19100 hosted in the server computers 12000. 4) A User e-mail device: Where the user can receive e-mails from the Internet-Based Group Site Technology CORE System 19100 hosted in the server computers 12000. 5) A User text-message device: Where the user can receive text messages from the Internet-Based Group Site Technology CORE System 19100 hosted in the server computers 12000.

The Internet-Based Group Cloud Management System 10000 allows for the creation 19120 and storage 19200 of all sites, Community CMS sites 19211 19212 (also on FIG. 12 and FIG. 14) and Personal CMS sites and Project CMS sites 19213 (also on FIG. 10), and the Management and Exchange of content and data files (which can includes files, data, modules [web/apps, virtual desktop/apps and web/cloud services]) among these CMS sites, based on a user assigned level of access to the system, controlled by the security system 19255. The system is what connects these sites (CMS sites) together when creating the Educational Group (GCMS) 19200 also described in FIG. 5. The Internet-Based Group Site Technology CORE System 19100 can be divided in the following main components: 1) The Educational Group Generation System and Method 19120 referenced also on FIG. 3 and FIG. 10/FLOW CHART 1; and 2) The Educational Group Communication System and Method 19110 referenced also on FIG. 4 and FIG. 15/FLOW CHART 2.

The Educational Group Generation System and Method 19120: This system and methods allows for the creation of record accounts for Faculty, Staff and Projects (FIG. 11/FLOW CHART 1*a*) on their Community sites (Community CMS sites) 19212 (also (a) on FIG. 3 and FIG. 4) created from a template 19121, it also creates record accounts for students and alumnus (FIG. 13/FLOW CHART 1*c*) in their Community sites (Community CMS sites) 19211 (also (b) on FIG. 3 and FIG. 4) created from a template 19121 and lastly creates all sites for Faculty, Staff, Projects, Students and Alumnus (Personal CMS sites and Project CMS sites) 19213 (also (c) on FIG. 3 and FIG. 4) based on a preconfigured Personal CMS template and Project CMS template specifically designed for each category of user (Faculty, Staff, Projects, Students and Alumnus) 19122 that could be customized based on each Educational Institution's requirements before the creation of the final sites (Personal CMS sites, Project CMS sites and Community CMS sites) ((c) on FIG. 3 and FIG. 4). The Educational Group Generation System and Method 19120 also allows for the connection and disconnection (19230 and 19240) of a Faculty, Staff, Projects, Students and/or Alumnus CMS site (Personal CMS site and Project CMS site) 19213 ((c) on FIG. 3 and FIG. 4) from or to an Educational Group GCMS) 19200 or any other group 19200 (also referred on FIG. 5), providing the possibility of having a student sites (Personal CMS sites) 19213 in the Educational Group 19200 for a period of time and then moving the student sites (Personal CMS sites) once he/she graduates, to the Alumni Group (GCMS) 19200 (also referred on FIG. 6) of the same Educational Institution.

The Educational Group Communication System and Method 19110 (also FIG. 4) comprises a Message Board System and Method 19225 (also (2.*a*) on FIG. 4), a Notification System and Method 19226 (also (2.*b*) on FIG. 4), a Document Management & Exchange System and Method (also (2.*c*) on FIG. 4) an Advertisement System and Method 19227 (also (2.*d*) on FIG. 4), a Content Update System and Method 19229 (also (2.*e*) on FIG. 4), a Group Content Search Engine System and Method 19228 (also (2.*f*) on FIG. 4), an Inappropriate Content Search Engine System and Method 1922A (also (2.*g*) on FIG. 4), a Group Search Engine Optimization System and Method 1922B (also (2.*h*) on FIG. 4), an Access System and Method to Online Classroom System (in the form of a Web App, Virtual App and Web/Cloud Services) 1922C (also (2.*i*) on FIG. 4), a Access System and Method to Front/Back Office Company Systems (MS Office, CRM Systems, ERP Systems and others) 1922D (also (2.*j*) on FIG. 4), a Access System and Method to Cloud Computer (in the form of Web Apps, Virtual Desktop, Virtual Apps and Web/Cloud Services), 1922E (also (2.*k*) on FIG. 4, FIG. 5*a*, FIG. 5*b*, FIG. 25*a* and FIG. 29*a*). The GCMS Group Communication can be summarized as:

The Message Board System and Methods ((2.*a*) on FIG. 4), can generate messages at the community sites (Community CMS sites) level ((a) and (b) on FIG. 4) to be captured by the Faculty, Staff, Projects, Students and Alumnus CMS sites (Personal CMS sites and Project CMS sites) ((c) on FIG. 4). This particular method of communication, from Community sites (Community CMS) to Professional CMS sites (Personal CMS sites and Project CMS sites), is also described on FIG. 16/FLOW CHART 2*a*. In addition, the messages can be generated in a Personal CMS site (e.g.: Professor Site), and received on multiple Personal CMS sites (e.g.: Students' Sites).

The Notification System and Method ((2.*b*) on FIG. 4) generated at the Community level (Community CMS) ((a) and (b) on FIG. 4) and received at the Faculty, Staff, Projects, Students and Alumnus CMS sites (Personal CMS sites and Project CMS sites), Faculty, Staff, Projects, Students and Alumnus e-mail device and Faculty, Staff, Projects, Students and Alumnus text-messaging device ((c) on FIG. 4). This particular method of notification is also described on FIG. 17/FLOW CHART 2*b*.

The Document Management & Exchange System and Method ((2.*c*) on FIG. 4 and FIG. 18/FLOW CHART 2*c*) provides the capabilities for Upload and Download to and from each Community sites (Community CMS sites) 19211 19212 as well as the Professional Sites for Faculty, Staff, Projects, Students and Alumnus (Personal CMS sites and Project CMS sites) 19213.

The Advertisement System and Method 19227 ((2.*d*) on FIG. 4 and FIG. 19/FLOW CHART 2*d*) provides the capabilities for an Educational Group (GCMS), to display sponsors logos (including link to URL address) and to push keyword content, from each Community sites (Community CMS sites) 19211 19212 to the Professional Sites for Faculty, Staff, Projects, Students and Alumnus (Personal CMS sites and Project CMS sites) 19213.

The Content Update System and Method 19229 ((2.*e*) on FIG. 4 and FIG. 20/FLOW CHART 2*e*) provides the capabilities for an Educational Group (GCMS), to push content (where in content is defined as at least one of a Text, a Video, a Audio, a Image, a File, a Data and a Module in the form of at least a Web App, a Virtual Desktop, a Virtual App, and a Web/Cloud Services) related to any topic, from each Community sites (Community CMS sites) 19211 19212 to the Professional Sites for Faculty, Staff, Projects, Students and Alumnus (Personal CMS sites and Project CMS sites) 19213.

The Group Content Search Engine System and Method 19228 ((2.*f*) on FIG. 4 and FIG. 21/FLOW CHART 2*f*) provides the capabilities to search for content within the Educational Group (GCMS), comprised by Community sites (Community CMS) 19211 19212 and Professional Sites (Personal CMS sites and Project CMS sites) 19213.

The Inappropriate Content Search Engine System and Method 1922A ((2.*g*) on FIG. 4 and FIG. 22/FLOW CHART 2*g*) provides the capabilities to search for inappropriate content within the Educational Group (GCMS), comprised by Community sites (Community CMS) 19211 19212 and Professional Sites (Personal CMS and Project CMS) 19213.

The Group Search Engine Optimization System and Method 1922B ((2.*h*) on FIG. 4 and FIG. 23/FLOW CHART 2*h*) provides the capabilities to optimize the search of content within the Educational Group (GCMS), comprised by Community sites (Community CMS) 19211 19212 and Professional Sites (Personal CMS and Project CMS) 19213, by Search Engines like Microsoft Live, MSN, Google, Yahoo.

The Access System and Method to On-line Classroom Systems 1922C ((2.*i*) on FIG. 4 and FIG. 24/FLOW CHART 2*i* 2*j* 2*k*) provides the capabilities for the Educational Group (GCMS), to access classroom content (based on user access security) from On-line Classroom Management Systems like Blackboard and then to be pushed to the respective Professional Sites (Personal CMS and Project CMS) 19213.

The Access System and Method to Front/Back Office Systems 1922D ((2.*j*) on FIG. 4 and FIG. 24/FLOW CHART 2*i* 2*j* 2*k*, FIG. 5*a*, FIG. 5*b*, FIG. 25*a* and FIG. 29*a*) provides the capabilities for the Educational Group (GCMS), to access Front/Back Office Systems (based on user access security) from systems like Epicor, SAP, Oracle, Microsoft as well as other services like Online Meetings, Webinars, Videoconferencing like (GoToMeeting, Webex) and then to push that user access to the respective Professional Sites (Personal CMS and Project CMS) 19213.

The Access System and Method to Cloud Computing Systems 1922E ((2.*k*) on FIG. 4 and FIG. 24/FLOW CHART 2*i* 2*j* 2*k*, FIG. 5*a*, FIG. 5*b*, FIG. 25*a* and FIG. 29*a*) provides the capabilities for the Educational Group (GCMS), comprised by Community sites (Community CMS sites) 19211 19212 and Professional Sites (Personal CMS and Project CMS) 19213, with Cloud Computing features including File Management and Directory Creation, usage of Cloud Office Applications (Web Apps, Virtual Desktop, Virtual Apps and Web/Cloud services) as well as the access to remote computers (at Home, Work or at the Educational Institution's Lab or other places).

The GCMS Group Communication is supported by a system and method of Communication Channels established within the GCMS site and across GCMS sites. The Communication Channel Manager 19220 supports all methods of communication, by comprising a Message Board Manager 19225, a Notification Manager 19226, a Advertisement Manager 19227, a Content Update Manager 19229, a Group Content Search Engine 19228, a Inappropriate Content Search Engine 1922A, a Group Search Engine Optimization Manager 1922B, a Access Online Classroom Manager 1922C, a Access Front/Back Office System Manager 1922D, a Access Cloud Computer Manager 1922E, a mufti-directional manager 19223, a channel set up 19221 (also described on FIG. 8), a Posting Manager 19224 and a Broadcast Manager 19222.

BRIEF DESCRIPTION OF THE SEVERAL VIEWS OF THE DRAWINGS

The foregoing aspects and many of the attendant advantages of this invention will become more readily appreciated as the same become better understood by reference to the following detailed description, when taken in conjunction with the accompanying drawing and figures, wherein:

FIG. 1 is a software architectural block diagram of a preferred embodiment of an Internet-Based Educational Group Cloud Management System according to the present invention.

FIG. 2 is a hardware architectural diagram of a preferred embodiment of an Internet-Based Educational Group Cloud Management System according to the present invention.

FIG. 3 is a diagram showing the representation of a GCMS, and within, a CMS entity and process diagram representing the generation of two sub-groups within the Educational Group (GCMS) according to the present invention, wherein the sub-groups are separated and controlled by two Community CMS sites: (a) for faculty/staff/projects generating and controlling one group (GCMS) of Personal CMS sites and Project CMS sites, and the other (b) for students/alumnus generating and controlling a second group (GCMS) of Personal CMS sites.

FIG. 4 is a diagram showing the representation of a GCMS, and within, a CMS and Device (e-mail and text messaging) entity, process and feature description diagram representing the educational group communication capabilities according to the present invention. The features are listed in four groups (common features, specific features for Community CMS sites, specific features for Personal CMS sites and Project CMS sites, and group communication features among CMS sites).

FIG. 5 is a diagram showing multiple GCMS in the system, and the representation of a GCMS, with a hierarchical CMS and Device Entity relationship diagram representing the Educational Group (GCMS) entity components according to the present invention.

FIG. 5*a* is a technical block diagram representing the different components comprising a CMS and showing the CMS/GCMS Communication Levels between pages, files, database, and showing the technical block components (pages, directory/files, cloud desktop, cloud apps, and database in each CMS. Additionally the figure shows how two CMS sites can collaborate when in a GCMS.

FIG. 5*b* is a technical block diagram representing the different components comprising a CMS and showing multiple cloud desktops and cloud apps synchronizing the web file manager with the cloud desktop's windows explorer.

FIG. 6 is an entity diagram of GCMS sites and CMS sites, describing the educational group (GCMS) interacting with other groups (alumni group [GCMS], medical group [GCMS], commercial group [GCMS], professional services group [GCMS], workplace & employees group [CMS]) and how a personal cloud (Personal CMS) or project cloud (Project CMS) can migrate from group (GCMS) to group (GCMS), and how can continue to operate as a stand-alone wile not connected to any group, according to the present invention.

FIG. 7 is an entity diagram of GCMS sites and within, CMS sites, describing the communication direction between entity sites: Community CMS, Personal CMS and Project CMS sites within a GCMS and across GCMS sites, according to the present invention.

FIG. 8 is an entity diagram of CMS site pages and devices (e-mail and text messaging) describing the communication channel set up method for the broadcaster CMS site and receiver CMS site (Community CMS, Personal CMS and Project CMS sites) according to the present invention.

FIG. 9 is a process flowchart of the Systems Implementation Method representing an orderly sequence of steps to follow in the implementation of an Educational Group (GCMS) according to the present invention.

FIG. 10 is a flowchart of decisions and processes (Flow Chart 1) representing a high level orderly sequence of steps in the generation of the educational group (GCMS) according to the present invention. Flow Chart 1 invokes Flow Chart is (FIG. 11), Flow Chart 1*b* (FIG. 12), Flow Chart is (FIG. 13) and Flow Chart 1*d* (FIG. 14).

FIG. 11 is a flowchart of decisions and processes (Flow Chart 1*a*) representing an orderly sequence of steps in the generation of the Professor [Teacher], Employee and/or Project account in the Professor [Teacher]/Staff/Project Community (Community CMS), according to the present invention.

FIG. 12 is a flowchart of decisions and processes (Flow Chart 1b) representing an orderly sequence of steps in the generation of the Professional Site for a Professor [Teacher], Employees and/or Project (Personal CMS sites and Project CMS sites) generation, according to the present invention.

FIG. 13 is a flowchart of decisions and processes (Flow Chart 1c) representing an orderly sequence of steps in the generation of the Student's and Alumnus' account in the Students/Alumnus community (Community CMS), according to the present invention.

FIG. 14 is a flowchart of decisions and processes (Flow Chart 1d) representing an orderly sequence of steps in the generation of the Professional Site for a Student and or Alumnus (Personal CMS sites), according to the present invention.

FIG. 15 is a flowchart of decisions and processes (Flow Chart 2) representing an orderly sequence of steps in the selection and execution of educational group (GCMS) communication types, according to the present invention. Flow Chart 2 invokes Flow Chart 2a (FIG. 16), Flow Chart 2b (FIG. 17), Flow Chart 2c (FIG. 18), Flow Chart 2d (FIG. 19), Flow Chart 2e (FIG. 20), Flow Chart 2f (FIG. 21), Flow Chart 2g (FIG. 22), Flow Chart 2h (FIG. 23), Flow Chart 2i (FIG. 24), Flow Chart 2j (FIG. 24) and Flow Chart 2k (FIG. 24).

FIG. 16 is a flowchart of decisions and processes (Flow Chart 2a) representing an orderly sequence of steps in message board communication system across CMS sites within the educational group (GCMS) and/or across educational groups (across GCMS sites), according to the present invention.

FIG. 17 is a flowchart of decisions and processes (Flow Chart 2b) representing an orderly sequence of steps in the notification communication system across CMS sites within the educational group (GCMS) and/or across educational groups (across GCMS sites), according to the present invention.

FIG. 18 is a flowchart of decisions and processes (Flow Chart 2c) representing an orderly sequence of steps in the document exchange communication system across CMS sites within the educational group (GCMS) and/or across educational groups (across GCMS sites), according to the present invention.

FIG. 19 is a flowchart of decisions and processes (Flow Chart 2d) representing an orderly sequence of steps in the advertisement communication system across CMS sites within the educational group (GCMS) and/or across educational groups (across GCMS sites), according to the present invention.

FIG. 20 is a flowchart of decisions and processes (Flow Chart 2e) representing an orderly sequence of steps in the content update communication system across CMS sites within the educational group (GCMS) and/or across educational groups (across GCMS sites), according to the present invention.

FIG. 21 is a flowchart of decisions and processes (Flow Chart 2f) representing an orderly sequence of steps in the group content search communication system across CMS sites within the educational group (GCMS) and/or across educational groups (across GCMS sites), according to the present invention.

FIG. 22 is a flowchart of decisions and processes (Flow Chart 2g) representing an orderly sequence of steps in the inappropriate content search communication system across CMS sites within the educational group (GCMS) and/or across educational groups (across GCMS sites), according to the present invention.

FIG. 23 is a flowchart of decisions and processes (Flow Chart 2h) representing an orderly sequence of steps in the group search engine optimization communication system across CMS sites within the educational group (GCMS) and/or across educational groups (across GCMS sites), according to the present invention.

FIG. 24 is a flowchart of decisions and processes (Flow Chart 2i, 2j, 2k) representing an orderly sequence of steps in the access to third party system communication system across CMS sites within the educational group (GCMS) and/or across educational groups (across GCMS sites), according to the present invention.

FIG. 25 is an exemplary screen shot showing an un-logged professional site for a student (Personal CMS) (same for Professor [Teacher], Employee, Alumnus and Project) generated from the educational group (GCMS) generation process.

FIG. 25a is an exemplary screen shot of a professional site for a student (Personal CMS) (same for Professor [Teacher], Employee, Alumnus and Project) generated from the educational group (GCMS) generation process, showing the access to its Pages, Modules, Skins, Templates, Cloud Apps, Cloud Desktops (windows explorer), File Manager and Database.

FIG. 26 is an exemplary screen shot of a professional site for a student (Personal CMS) (same for Professor [Teacher], Employee, Alumnus and Project) generated from the educational group (GCMS) generation process, showing the professional site logged in with a View Mode and displaying the Control Panel (111000) on top of the site (112000) and subsequently the Control Panel divided in the Mode Section (111100), Page Function Section (111200), Module Management Section (111300) and Common Tasks Section (111400).

FIG. 27 is an exemplary screen shot of a professional site for a student (Personal CMS) (same for Professor [Teacher], Employee, Alumnus and Project) generated from the educational group (GCMS) generation process, showing the professional site logged in with an Edit Mode and displaying the Admin Menu Options (122400) and the Student Name Domain Name (122200) content appearing on a Text Module (122300) located on the Top Right Pane (122100) of the Page (122000).

FIG. 28 is an exemplary screen shot of a professional site for a student (Personal CMS) (same for Professor [Teacher], Employee, Alumnus and Project) generated from the educational group (GCMS) generation process, showing the professional site logged in with a Design Mode and displaying the Modules Available (131100) that could be Added (131200) into a selected Pane (132100, 132200, 132300, 132400, 132500, 132600).

FIG. 29 is an exemplary screen shot of a professional site for a student (Personal CMS) (same for Professor [Teacher], Employee, Alumnus and Project) generated from the educational group (GCMS) generation process, showing the professional site logged in with a View Mode and displaying the File Manager Module (151440) that subsequently is divided in the Folders Functions (151441) and the Files Functions (151442) allowing the user to create Directories and Subdirectories and Store Files within the Folder Structure.

FIG. 29a is an exemplary screen shot displaying the File Manager Module (151440) in a Personal CMS site, that is synchronized with two Cloud Desktop's Windows Explorers, as part of the Cloud Computing Features provided in each Cloud Management System (CMS) site used to power the Professional Sites for Professor, Project, Student, Employee and Alumnus (Community CMS sites, Personal CMS sites and Project CMS sites). Although a CMS site can include unlimited Cloud Desktops for the CMS site user subscriber/operator, in this example, the CMS site includes two Cloud Desktops, and the figure shows how the File Manager is synchronized to the directory roots of these two Cloud Desktops' Windows Explorers.

FIG. 30 is an exemplary screen shot of the Professors [Teachers]/Staff/Projects Community site (Community CMS) (same for Student's and Alumnus' community) generated from the educational group (GCMS) generation process, showing the Admin User logged in with a View Mode and displaying the Host Menu Options (142100).

DETAIL DESCRIPTION OF THE INVENTION

Referring to FIG. 1, the present invention comprises a system and method for the management and exchange of content and data files among Cloud Management System (CMS) sites, operated by individuals (user subscribers), and connected in a group or Group Cloud Management System (GCMS) than can be deployed as an Educational Group representing an Educational Institution. An Educational Institution interacts with one or more user subscribers (e.g.: Students, Professors, Staff, R&D Projects Teams, Alumnus, Guests) by using the system and methods of the present invention to, without limitation, transmit content and data files from the Educational Group's Community Cloud Management System site (Campus Cloud or Community CMS site) to the users' Personal Cloud Management System sites (Personal Clouds or Personal CMS sites) and Project Cloud Management System sites (Project Clouds or Project CMS sites) and among Community CMS sites, Personal CMS sites and Project CMS sites, organized in a Group Cloud Management System (GCMS) and using an electronic network such as the Internet or World Wide Web (or Intranet, LANs, WANs, or other networks or some combination thereof). Generation and access to the Community CMS site content and data files, Personal CMS site content and data files and Project CMS site content and data files is controlled by generation and access levels and control logic to ensure integrity and security in the system (GCMS/CMS). In addition, Administrators users have access to the system to perform administrative tasks as defined herein.

System Architecture:

The system architecture of a prefer embodiment of an Educational Group Cloud Management System (GCMS) 10000 according to the present invention is presented in FIG. 1. Referring now to FIG. 1, Internet-Based Group Cloud Management System (GCMS) 10000 comprises an Internet-Based system architecture that can be divided into two groups, the User Access Devices 11000 and the Hosting Server Computers 12000.

The User Access Devices 11000 further comprises a web browser device 11100, an e-mail device 11200 and a text-messaging device 11300.

The Hosting Server Computers 12000 further comprises an operating system 13000, a web server hosting 14000, an application framework system 15000, a visual studio dot net system 16000, an office applications system 17000, a client-server system platform (file system-RDBMS Database Engine) 18000, and the www.GoToYourSite.com Cloud Technology (CMS & GCMS) development and hosting platform 19000.

The www.GoToYourSite.com Cloud Technology (CMS & GCMS) development and hosting platform 19000, further comprises the internet-based group site technology core system 19100.

The internet-based group site technology core system 19100, further comprises the Educational Group (any group) communication system 19100 and the Educational Group (any group) generation system 19120.

The Educational Group (any group) generation system 19120, generates the Educational Group (any group) 19200. The Educational Group (any group) generation system 19120, further comprises a Community Site-(Community CMS) template 19121, a Professional Site (Personal CMS and Project CMS) template 19122, a template inventory 19123, a template factory 19124, a module inventory 19125, a module factory 19126, a Professor (Teacher), Employee and/or Project and Student and Alumnus community (Community CMS) generator 19127, a Professor (Teacher), Employee, Project, Student and Alumnus account generator 19128 and a Professor (Teacher), Employee, Project, Student and Alumnus site (Personal CMS and Project CMS) generator 19129.

The Educational Group 19200, further comprises a Student and Alumnus Community site (Community CMS) 19211, a Professor (Teacher), Employee and/or Project Community site (Community CMS) 19212, a group of Professional Sites (Personal CMS and Project CMS) for Professors (Teachers), Employees, Projects, Students and Alumnus 19213, an inappropriate content search engine manager 19214, a communication channel manager 19220, a Professional Site (Personal CMS and Project CMS) transfer manager 19230, an Educational Group manager 19240, a mail manager for e-mail and text-message 19251, a task scheduler 19252, a custom integration to other applications module (third-party systems: virtual desktop, virtual apps, web apps, web/cloud services and others) 19253, a domain name registration 19254, a security system 19255, an encryption certificate activation 19256 and a payment processing 19257.

The Communication Channel Manager 19220, further comprises the Channel Set Up Manager 19221, the Broadcast Manager 19222, the Multi-Directional Manager 19223, the Posting Manager 19224, the Message Board Manager 19225, the Notification Manager 19226, the Advertisement Manager 19227, the Group Content Search Engine Manager 19228, the Content Update Manager 19229, the Inappropriate Content Search Engine Manager 1922A, the Group SEO Manager 1922B, the Access Online Classroom Manager 1922C, the Access Front/Back Office Manager 1922D, the Access Cloud Computer Manager (Web Apps, Virtual Desktops, Virtual Apps and Web/Cloud Services) 1922E.

The Professional Site transfer manager 19230, further comprises the import manager 19231 and the export manager 19232 allowing to physically export or import a Personal CMS and Project CMS into or out of the GCMS.

The Educational Group Manager 19240, further comprises the Road Map Manager 19241 and the Graduation Manager 19242.

GCMS Generation Functionality

The Administrator of the system is provided with the capability to create a Group Cloud Management System or GCMS (19200 on FIG. 1) as an Educational Group representing an Educational Institution. A GCMS is comprised by several Cloud Management System sites (CMS sites) connected in a group controlled by at least one controlling CMS site, also knows as the Community CMS site. The CMS sites in the group could be comprised by at least one CMS site connected to the controlling CMS site known as the Community CMS site, creating a GCMS comprised by two CMS sites, the parent or controlling CMS site and the child CMS site. It is also understood that a GCMS with more than one child CMS site can include a configuration of different categories of CMS sites from which are organized for a specific function. These categories in this embodiment include but are not limited to Community CMS sites, Personal Cloud sites (Personal CMS sites) and Project Cloud sites (Project CMS sites).

As part of the GCMS Generation Process (19120 on FIG. 1), the Administrator can customize the preconfigured Community CMS Templates (19121 on FIG. 1) for the generation of the CMS sites that will act as the Community CMS sites for the Educational Institution (e.g.: Professor's Community, Student's Community, Project's Community, etc.) and that can be divided as the Educational Group and the Alumni Group. It is understood that user accounts for Students, Professors, Staff, Alumnus and R&D Projects can be created in the same CMS site, one Community CMS site in the GCMS (19211 on FIG. 1) with a Community CMS Template allocated from the generation process, or users accounts could be created in more than one CMS site and be divided as needed in multiple Community CMS sites in the GCMS (19211 and 19212 on FIG. 1), and these also with a Community CMS Template allocated from the generation process and specifically customized to address specific and different needs of Professors, Students, Staff, R&D Projects and Alumnus. It is also understood that there could be more than one group of Professors, Staff, Students, R&D Projects and Alumnus and organized in more than one Community CMS site for Professors, more than one Community CMS site for Staff, more than one Community CMS site for R&D Projects, more than one Community CMS site for Students and more than one Community CMS sites for Alumnus. Even other type of users outside the Educational Institution and that can be grouped in a Community CMS site for Guests.

Additionally, as part of the GCMS Generation Process (19120 on FIG. 1), the Administrator can customize the preconfigured Personal CMS and Project CMS Templates (19122 on FIG. 1) to be used in the generation of Personal CMS and Project CMS sites. It is understood that the GCMS can include more than one type of Personal CMS sites and Project CMS sites created from different Personal CMS and Project CMS Templates.

The Community CMS Templates, Personal CMS Templates and Project CMS Templates once created by the Administrator of the system, are then available for selection in the generation process of a new CMS site. A Community CMS Template, Personal CMS Template and Project CMS Template includes already the pre-defined content and data files for the CMS site to be generated.

The pre-defined content and data files of the Community CMS Template, Personal CMS Template and Project CMS Template, include among others, content and data files specifically related to the Look and Feel of the CMS site, which is associated with the Front-End of the CMS site, also know as Skins and Containers and stored as Skin and Containers Templates in the Template Inventory (19123 on FIG. 1). The Skins and Containers Templates are created by the Administrator of the system with tools from the Template Factory (19124 on FIG. 1) and then stored and available for use as part of the Template Inventory (19123 on FIG. 1).

The pre-defined content and data files of the Community CMS Templates, Personal CMS Templates and Project CMS Templates, include among others, content and data files specifically related to Modules to be used by the user and available in the CMS site, which these Modules are associated with at least one of a Web App, Virtual Desktop, Virtual App, Web/Cloud Services and other form of programming application and that are stored as Modules in the Module Inventory (19125 on FIG. 1). The Modules are created by the Administrator of the system with tools from the Module Factory (19126 on FIG. 1) and then stored and available for use as part of the Module Inventory (19125 on FIG. 1).

Finally, the pre-defined content and data files of the Community CMS Template, Personal CMS Template and Project CMS Template, include content and data files related to the function of the CMS site as a Community CMS site or as a Personal CMS site or as a Projects CMS site. Such content and data files available for the user through the pre-defined Modules already included in the CMS site and with a Look and Feel from a pre-defined and selected Skin/Container Template.

As part of the GCMS Generation Function (19120 on FIG. 1), the Administrator of the system will generate at least one Community CMS site with the Community Generator (19127 on FIG. 1). The Community Generator uses a Community CMS Template (19121 on FIG. 1) to generate the Community CMS site (19211, 19212 on FIG. 1), similar to the cookie cutter concept. Once the Community CMS site is created, the Administrator has the capability to customize the Community CMS site design, part of this customization it is included but not limited to adjusting User Roles (e.g.: Professor Types, Student Types) and User Attributes (e.g.: Name, Address, etc.) in the Users Profile Module of the Community CMS site.

Once the Community CMS site (19211, 19212 on FIG. 1) is created and customized for the specific function (e.g.: Students Community), the Administrator of the system can upload all users in a batch mode through the User Account Generator (19128 on FIG. 1; also (1.*a*) and (1.*c*) on FIG. 3), or allow the users to manually register themselves for an account on the Community CMS site (19211, 19212 on FIG. 1), using the User Registration Form Module (FIG. 4, see it listed in Additional Features for Community CMS, Personal CMS and Project CMS) already adapted for the needs of the User Community CMS site as User Registration/Payment Processing (FIG. 4, see it listed in Professor/Student/Staff/Projects/Alumnus Communities). The users' Personal CMS sites and Project CMS sites Generation (19129 on FIG. 1; also (1.*b*) and (1.*d*) on FIG. 3) can be performed by the Administrator of the system through a batch process when uploading all users accounts in the users' Community CMS site or by the same user (e.g.: Professor, Student, etc.) when registering themselves for a user account on the Community CMS site. The User Registration/Payment Processing (FIG. 4, see it listed in Professor/Student/Staff/Projects/Alumnus Communities) for the users' Community CMS, executes the function to build the Personal CMS site and Projects CMS site (19213 on FIG. 1) for the user.

GCMS Generation Process

The Educational Group Generation 19120 process (FIG. 3 and FIG. 10-FLOW CHART 1), is the process followed to create the Educational Group (GCMS) (19200 on FIG. 1). In this process, Faculty (Professors/Teachers), Staff, Projects Teams, Students and Alumnus will be registered in the system as accounts in the Faculty, Staff and Project Teams ((a) on FIG. 3, 19212 on FIG. 1) and Students and Alumnus ((b) on FIG. 3, 19211 on FIG. 1) Community sites (Community CMS sites) and will also receive a Professional Site ((c) on FIG. 3) Personal CMS site or Project CMS site (19213 on FIG. 1), and all of these (Community CMS sites, Personal CMS sites and Project CMS sites) with a preconfigured design from their respective templates (19121 and 19122 on FIG. 1).

The Educational Group (GCMS) generation process is comprised by 4 sub-processes: 1) The Faculty, Staff and Project Teams Account Generation Process 19128 on FIG. 1 and FIG. 11 (FLOW CHART 1*a*, 4000) or (1.*a*) on FIG. 3; 2) The Faculty, Staff and Project Teams Professional Site Creation (Personal CMS sites and Project CMS sites) 19129 on FIG. 1 and FIG. 12 (FLOW CHART 1*b*, 6000) or (1.*b*) on FIG. 3; 3) The Student and Alumnus Account Generation Process 19128 on FIG. 1 and FIG. 13 (FLOW CHART 1*c*, 5000) or (1.*c*) on FIG. 3; 4) The Student and Alumnus Professional Site (Personal CMS sites) Creation 19129 on FIG. 1 and FIG. 14 (FLOW CHART 1*d*, 7000) or (1.*d*) on FIG. 3.

The Faculty, Staff and Project Team Account Generation Process (FIG. 11/FLOW CHART 1*a*, 4000) is the process followed to generate a Faculty, Staff and Project record on the Faculty, Staff and Project Community sites (Community CMS) (19212 on FIG. 1 and (a) on FIG. 3 and FIG. 4). This process 19128 can be executed manually 4110, by entering the information of one Professor (Teacher), Staff and/or Project at a time; or can run on a batch mode 4120, by reading the information from an input file 4121 containing records with the information from all Faculty, Staff and Project Teams to be uploaded in the Community sites (Community CMS) (19212 on FIG. 1 and (a) on FIG. 3 and FIG. 4). Once the data is captured 4100, the process will validate 4200 the information for accuracy providing as an output a Data Validation Error Report 4211. If the validation succeeds, the process will continue to save 4300 the information in the Faculty, Staff and Project Teams Community sites (Community CMS) (19212 on FIG. 1 and (a) on FIG. 3 and FIG. 4). The Account Generation Process for Faculty, Staff and Projects Teams, is customized and fine-tuned during the implementation project of the Educational Group (GCMS) for the Educational Institution, as each Educational Institution differ from each other on the type of education offered and the business rules and processes followed. This differentiation is associated with the attributes to be captured in each user account, and depending on the business intelligence that the Education Institution wants and needs in the GCMS, these attributes can be customized and fine-tuned to be able to meet those needs. To properly deploy an Educational Group (GCMS) for an Educational Institution, it is recommended to follow the Implementation Methodology described on FIG. 9 (see also section: GCMS System Implementation Methodology).

The Faculty, Staff and Project Team Professional Sites Creation, Personal CMS sites and Project CMS sites (FIG. 12/FLOW CHART 1*b*, 6000) is the process followed to create a Professional Site for each Professor (Teacher), Staff and/or Project (19213 on FIG. 1 and (c) on FIG. 3 and FIG. 4) (Personal CMS and Project CMS). This process 19129 can be executed manually 6110, by creating the Professional Sites (Personal CMS sites and Project CMS sites) for one Faculty (Professor/Teacher), Staff and/or Project at a time; or can run on a batch mode 6120, by reading the information from an input file 6121 containing records with the information from all the Faculty (Professor/Teacher), Staff and/or project that will need a Professional Site (Personal CMS sites and Project CMS sites) (19213 on FIG. 1 and (c) on FIG. 3 and FIG. 4). The process will validate 6200 the information first, generating a Data Validation Error Report 6211. If the validation process succeeds, then the process will build 6300 the Faculty (Professor/Teacher), Staff's and/or Project's Professional Site (Personal CMS sites or Project CMS sites) 19213 based on a preconfigured site (Personal CMS sites or Project CMS sites) Template 19122 for the Faculty (Professor/Teacher), Staff and/or Project. A domain name will be created 19254 to access the Faculty's (Professor's/Teacher), Staff's or Project's site (Personal CMS sites and Project CMS sites) 19213. As a result, each Personal CMS site and/or Project CMS site will be access through a sub domain name from the domain name used to access the GCMS (Educational Group), and at least one additional domain name that could be created as the user's first name and last name (or user defined name). The Personal CMS sites and Project CMS sites generation process is customized and fine-tuned during the implementation project of the Educational Group (GCMS) for the Educational Institution, as each Educational Institution differ from each other on the type of education offered and the business rules and processes followed, including the preconfigured content and data files in each template to be used for the generation of the Personal CMS sites and Project CMS sites, and including the Theme on each Look and Feel Templates (Skins and Containers designs) that should be given to each Personal CMS sites and Project CMS sites. This differentiation is associated with the attributes to be captured in each user account, and depending on the business intelligence that the Education Institution wants and needs in the GCMS, these attributes can be customized and fine-tuned to be able to meet those needs, and depending on the user's attributes at the time of generating the Personal CMS sites or Project CMS sites, the right CMS Template and Look and Feel Template will be used by the generation process. To properly deploy an Educational Group (GCMS) for an Educational Institution, it is recommended to follow the Implementation Methodology described on FIG. 9 (see also section: GCMS System Implementation Methodology).

The Student's Account Generation Process (FIG. 13/FLOW CHART 1*c*, 5000) is the process followed to generate a Student's and/or Alumnus' record on the Student and/or Alumnus Community sites (Community CMS) (19211 on FIG. 1 and (b) on FIG. 3 and FIG. 4). This process 19128 can be executed manually 5110, by entering the information of one Student and/or Alumnus at a time; or can run on a batch mode 5120, by reading the information from an input file 5121 containing records with the information from all the Students and/or Alumnus to be uploaded in the Community sites (Community CMS) 19211 on FIG. 1. Once the data is captured, the process will validate 5200 the information for accuracy providing as an output a Data Validation Error Report 5211. If the validation succeeds, the process will continue to save 5300 the information in the Student's and/or Alumnus Community sites (Community CMS) (19211 on FIG. 1 and (b) on FIG. 3 and FIG. 4).

The Account Generation Process for Students and/or Alumnus is customized and fine-tuned during the implementation project of the Educational Group (GCMS) for the Educational Institution, as each Educational Institution differ from each other on the type of education offered and the business rules and processes followed. This differentiation is associated with the attributes to be captured in each user account, and depending on the business intelligence that the Education Institution wants and needs in the GCMS, these attributes can be customized and fine-tuned to be able to meet those needs. To properly deploy an Educational Group (GCMS) for an Educational Institution, it is recommended to follow the Implementation Methodology described on FIG. 9 (see also section: GCMS System Implementation Methodology).

The Student's and/or Alumnus Professional Site (Personal CMS sites) Creation (FIG. 14/FLOW CHART 1*d*, 7000) is the process followed to create a Student's and/or Alumnus' Professional Site (Personal CMS) (19213 on FIG. 1 and (c) on FIG. 3 and FIG. 4). This process 19129 can be executed manually 7110, by creating the Professional Site (Personal CMS) for one Student and/or Alumnus at a time; or can run on a batch mode 7120, by reading the information from an input file 7121 containing records with the information from all the Students and/or Alumnus that will need a Professional Site (Personal CMS sites) 19213. The process will validate 7210 the information first, generating a Data Validation Error Report 7211. If the validation process succeeds, then the process will build 7300 the Student's and/or Alumnus Professional Site (Personal CMS) based on a preconfigured site (Personal CMS) Template 19122 for the Student and/or Alumnus. A domain name will be created 19254 to access the Student's and/or Alumnus site (Personal CMS sites) (19213 on FIG. 1 and (c) on FIG. 3 and FIG. 4). As a result, each Personal CMS site will be access through a sub domain name from the domain name used to access the GCMS (Educational Group), and at least one additional domain name that could be created as the user's first name and last name (or user defined name). The Personal CMS sites generation process is customized and fine-tuned during the implementation project of the Educational Group (GCMS) for the Educational Institution, as each Educational Institution differ from each other on the type of education offered and the business rules and processes followed, including the pre-configured content and data files in each template to be used for the generation of the Personal CMS sites, and including the Theme on each Look and Feel Templates (Skins and Containers designs) that should be given to each Personal CMS site. This differentiation is associated with the attributes to be captured in each user account, and depending on the business intelligence that the Education Institution wants and needs in the GCMS, these attributes can be customized and fine-tuned to be able to meet those needs, and depending on the user's attributes at the time of generating the Personal CMS site, the right CMS Template and Look and Feel Template will be used by the generation process. To properly deploy an Educational Group (GCMS) for an Educational Institution, it is recommended to follow the Implementation Methodology described on FIG. 9 (see also section: GCMS System Implementation Methodology).

GCMS Transfer Management Function

Once a GCMS is deployed in at least one hosting server computer, each Community CMS site, Personal CMS site or Project CMS site belonging to the group GCMS, can be relocated or transferred among other hosting server computers through a Transfer Management function (19230 on FIG. 1).

The Transfer Management function will allow the Administrator user to export, with the Export Manager (19232 on FIG. 1), all content and data files from a Community CMS site, Personal CMS site or Project CMS site into a Template, that can then be moved out of the hosting server computer and into another server computer. The Template becomes like the Community CMS, Personal CMS or Project CMS Template (19121 or 19122 on FIG. 1), but includes all the additional content and data files added by the user subscriber/operator of the Personal CMS site or Project CMS site, or added by the user community of the Community CMS site.

The Transfer Management function will allow the Administrator user to import, with the Import Manager (19231 on FIG. 1), all content and data files into a new Community CMS site, Personal CMS site or Project CMS site, from a Template created from the previously exported content and data files from the Community CMS site, Personal CMS site or Project CMS site.

It is understood that the Import Manager and Export Manager functions (19231 and 19232 on FIG. 1) are also available to any type of CMS site, allowing the administrator to relocate the entire GCMS into a new hosting server environment in a gradual way, one CMS site at a time. It is also understood that the entire GCMS can be backed-up and restored using the server's operating system back-up utilities.

GCMS Group Administration Function

The Administrator user has the ability to administer the establishment of at least one group site or Group Cloud Management System site (e.g.: Educational Group) in the system. A GCMS site is comprised by at least two CMS sites, one acting as the controlling of the group (e.g.: Community CMS site) or parent site, and the other CMS site acting as the child (e.g.: Personal CMS site). It is understood that this group is established when the CMS sites (Community CMS sites, Personal CMS sites and/or Project CMS sites) are connected on a separate layer from the system hosting environment. The system hosting environment is comprised by all CMS sites (Community CMS sites, Personal CMS sites and/or Project CMS sites) being hosted in the environment, although it could be understood as the system hosting a group of CMS sites, these sites are all operating as stand-alone and independently from each other. The Group Feature explained here is defined when connecting some of the CMS sites hosted, for the purpose of controlling a particular functional behavior of the CMS sites in the group, different from the hosting behavior already as part of the system. In other words, the Group Feature explained here could be seen as sub-groups or functional groups being established within the main hosting group established by the system hosting environment.

Additionally, the group can be established among CMS sites (Community CMS sites, Personal CMS sites and/or Project CMS sites) hosted in different hosting environments (FIG. 5 and FIG. 6).

The Parent-Child relationship between two CMS sites (Community CMS sites, Personal CMS sites and/or Project CMS sites) to conform the hierarchical relationship in the group or GCMS is by establishing a connection link between the Parent and Child sites. In this particular embodiment, the relationship link is established by creating a user account in the parent CMS site (e.g.: Community CMS) with a user role that identifies the children CMS sites (Community, Personal and/or Project). In this embodiment, the user role is a Community CMS site, Personal CMS site or Project CMS site. And the user account created in the parent CMS site (Community CMS site) is directly identifying the Administrator User of the child CMS site (Community CMS site, Personal CMS site or Project CMS site); for example, in this embodiment, the Admin user of the Personal CMS site is a Student, Professor (Teacher), Staff, Alumnus or Project Manager (R&D Project).

In summary, one user "CMS subscriber/operator" account record in the Community CMS site relates directly to one Personal CMS site and the Administrator user account within. Although this has been one method of connection link between a Parent CMS site and a Child CMS site, it is understood that during the implementation project of the GCMS, the connection link method will be customized and fine-tuned depending on the requirements of the Educational Institution or entity operating the GCMS site.

The Administrator user has the ability to create multiple tiers in the group or GCMS, where there could be now grandchildren CMS sites (Community CMS sites, Personal CMS sites and/or Project CMS sites) connected to a parent CMS site (Community CMS site, Personal CMS site or Project CMS site), and these parent CMS sites (also children of a parent) now connected to the grandparent CMS site (also parent of a children), along with children CMS sites (Community CMS sites, Personal CMS sites and/or Project CMS sites) that are not parents as of yet.

It is understood that during the implementation project of the GCMS, the number of Parent/Child Tiers that could be established by connecting CMS sites, will be customized and fine-tuned depending on the requirements of the Educational Institution or entity operating the GCMS site. For example, a State University System comprised by five Universities, can have a First Tier Parent/Child relationship on a GCMS comprised by a Community CMS site controlling the GCMS, and representing the State University System Office, and comprised by Children CMS sites that can be Personal CMS sites and Project CMS sites from Staff and Project Teams working at the State University System Office, and five Community CMS site, each representing a University from the State University System. A Second Tier Parent/Child relationship can now be established at each of the Community CMS sites representing each University, as these could be Parent from a Child Community CMS site representing the Educational Group, another Child Community CMS site representing a Workplace Group and another Child Community CMS site representing an Alumni Group. A Third Tier Parent/Child can be now implemented where the Community CMS site representing the Educational Group is the Parent of Child Personal CMS sites for Professors and Students, and Project CMS sites from Project Teams, and the Community CMS site from the Workplace Group is the Parent of Child Personal CMS sites from Staff and Community CMS sites from Departments, and finally the Community CMS site representing the Alumni Group is the parent of Child Personal CMS sites representing alumnus. A Fourth Tier Parent/Child can be established now as the Community CMS site representing a Department is a Parent of Child Personal CMS sites from Staff working in the Department.

It is understood that a Multi-Tier Parent/Child relationship represents several GCMS sites operating simultaneously as sub-groups from the GCMS established by the aggregation of all the sub-GCMS sites (see FIG. 5, FIG. 6 and FIG. 7).

The Administrator user can have a CMS site (Community CMS site, Personal CMS site or Project CMS site) connected to more than one parent CMS site (Community CMS site, Personal CMS site and/or Project CMS site). In this case there will be two CMS sites (Community CMS site, Personal CMS site and/or Project CMS site) with a user account record pointing to the same child CMS site (Community CMS site, Personal CMS site or Project CMS site).

It is understood that a Children CMS site can have multiple Parent CMS sites. In this case, each Parent is a controlling CMS site of a GCMS, thus there will be a partial overlapping subgroup within the GCMS sites on the Children CMS sites that are being shared by the Parents CMS sites (see FIG. 5, FIG. 6 and FIG. 7).

The Administrator user can simply disconnect a CMS site (Community CMS site, Personal CMS site or Project CMS site) from the group by disabling or making inactive the user account in the parent CMS site that points to the child CMS site. In this case, the child CMS site continue operating as a Stand-Alone CMS site, while before, it was operating as a Connected-in-a-Group CMS site.

It is understood that the Administrator user has the flexibility by the system to have the ability to configure multiple GCMS sites within the system. And in addition, the Administrator user has the ability to Connect-in-a-Group these GCMS sites, thus creating a higher level GCMS multi-tear group site.

GCMS Integration Management Function

The Administrator user has the ability to integrate a GCMS with at least one other GCMS by defining the rules of integration with the GCMS Educational Group Manager (19240 on FIG. 1). Among these rules:

The Administrator user has the ability to administer the traveling road from a CMS site (Community CMS site, Personal CMS site and/or Project CMS site) from one GCMS site to another GCMS site, by pre-defining the road with a Road Map Manager (19241 on FIG. 1; also on FIG. 6).

The Administrator user has the ability to administer the alterations to be performed on a CMS site (Community CMS site, Personal CMS site and/or Project CMS site) when connecting or disconnecting from a controlling CMS site (e.g.: Community CMS site) as part of following a Road Map or just by changing from a Connected-in-a-Group Mode to a Stand-Alone Mode. The alterations can be pre-defined with the Graduation Manager (19242 on FIG. 1), and the alterations include: a) Look and Feel Alterations, by changing the Skin and Container Template; b) Security Alterations by denying access to group content and data files controlled by the Community CMS site (within the content and data files are at least one of a Text, a Image, a Video, a Audio, a Data, a File, and a module representing at least one of a Web App, a Virtual Desktop, a Virtual App and a Web/Cloud services); and c) Group Communication (FIG. 4) by denying communication with other CMS sites (Community CMS sites, Personal CMS sites and/or Project CMS sites) in the group or GCMS.

GCMS Group Communication Management Function

The Administrator user has the ability to administer and customize, with the Communication Channel Manager functions (19220 on FIG. 1), the communication among CMS sites organized within the group or GCMS and among GCMS sites. It is important to understand that this Communication Management Function relates to communication and sharing content and data files among at least two CMS sites connected on a separate layer from the system hosting environment (see FIG. 4, FIG. 5, FIG. 5.*a*, FIG. 5.*b*, FIG. 6, FIG. 7, FIG. 8). Additionally, the communication can be established among CMS sites hosted in different hosting environments (see FIG. 5 and FIG. 6).

Within this embodiment, there are at least eleven types of pre-defined communications within the GCMS and among CMS sites (Community CMS sites, Personal CMS sites and Project CMS sites), and among GCMS sites:

GCMS Group Communication: Messaging Board System

The Administrator user has the ability to administer and configure the Messaging Board Manager (19225 on FIG. 1). Within, the messaging board content can be classified as messaging board content and data files and the actual messaging board content delivered by the broadcaster user.

The messaging board content and data files are pre-defined in a module that can be installed in any CMS site (Community CMS site, Personal CMS site or Project CMS site). The content included in the message board can be any type of content, including content related to at least one of a Text, a Image, a Video, a Audio, a Data, a File, and a Module representing t least one of a Web App, a Virtual Desktop, a Virtual App, and a Web/Cloud Service including Video Conference or any third party service and managed by the Messaging Board system ((2.*a*) on FIG. 4).

The messaging board content produced by the user Broadcaster will be distributed from the CMS site where the Messaging Board Module is installed (Community CMS, Personal CMS, Project CMS) to the CMS sites containing a Messaging Board Module with a receiving channel id. These CMS sites can be Community CMS, Personal CMS and/or Project CMS within the GCMS, and to other CMS sites in other GCMS sites connected to the first GCMS site through the Community CMS site controlling the group.

The broadcasting of the messaging board content can be based on distributing the content and data files related to the messaging board content, or distributing content and data files referencing the content and data files related to the messaging board content.

The broadcasting of the content in the message board module to the receiving CMS site can be based on distributing the content to the receiving CMS sites based on: 1) a broadcasting scheduler, 2) the user of the broadcasting CMS site, pushing the content from the broadcaster's CMS site to the receiving CMS sites (using a Content Push technique), and 3) the user of the receiving CMS site, pulling the content from the broadcaster's CMS site to the receiving CMS site (using a Content Pull technique).

The broadcasting of the content can be done by: a) Sharing the content and data files across the Community CMS sites, Personal CMS sites and/or Project CMS sites within and/or across the groups or GCMS sites. This particular method of cross site content sharing, does not duplicate the content and data files being shared within and/or across the groups or GCMS sites; b) Transferring the content and data files from the Broadcasting CMS site to the Receiving CMS site. This particular method of cross site content sharing, does not duplicate the content and data files being transferred within and/or across the groups or GCMS sites; and c) Copying the content and data files across the Community CMS sites, Personal CMS sites and/or Project CMS sites within and/or across the groups or GCMS sites. This particular method of cross site content sharing, duplicates the content and data files within and/or across the groups or GCMS sites.

It is understood that a content and data files broadcasted with the messaging board system, could represent at least one of a Text, a Video, a Audio, a Image, a File, a Data, and a Module in the form of at least one of a Web App, a Virtual Desktop, a Virtual App, and a Web/Cloud Services and other user-defined modules. A module is a combination of content and data files that can be categorized as messaging board content, thus a module can be shared within and/or across groups or GCMS sites, and content and data files of a module, can be transferred and/or copied within and/or across groups or GCMS sites.

It is understood also, that the receiving CMS site (Community CMS sites, Personal CMS sites and/or Project CMS sites) of the content and data files being broadcasted (shared, transferred or copied), can receive it by inheriting it (sent by the Broadcaster site based on a scheduler or content push), or can receive it by pulling it from the Broadcaster site.

And depending on the messaging board content and data files being received on the receiving CMS site and the receiving configuration set on the receiving CMS, the content and data files can be redirected to the user's e-mail device and/or text messaging device based on the e-mail account and cell phone number of the user subscribe/operator of the receiving CMS site.

GCMS Group Communication: Notification System

The Administrator user has the ability to administer and configure the Notification Content Manager (19226 on FIG. 1). Within the notification content can be classified as at least Emergency Notifications and Standard Notifications, and based on this classification, the broadcasting process of the Notification will be adjusted.

The Notification process is pre-defined to include the broadcast of Notifications that will be delivered to the users on their respective CMS sites (Community CMS sites, Personal CMS sites and/or Project CMS sites) as well as e-mail devices and text messaging devices, depending on the type of notification and the notification configuration performed by the broadcaster with the Notification System ((2.*b*) on FIG. 4).

The Notification content produced by the Notification Broadcasters will be distributed in this embodiment, from the Community CMS site (Parent CMS site controlling the GCMS) to the Children CMS sites (Community CMS, Personal CMS and/or Project CMS sites) within the GCMS, and to other CMS sites in other GCMS sites connected to the first GCMS site through the Community CMS site controlling the first GCMS site. The selection of the group/subgroup to broadcast will be set during the Notification Set Up process.

The broadcasting of the notification content can be based on distributing the content and data files related to the notification content, or distributing content and data files referencing the content and data files related to the notification content.

The broadcasting of the content and data files in relation to notification content can be done by: a) Sharing the content and data files across the Community CMS sites, Personal CMS sites and/or Project CMS sites within and/or across the groups or GCMS sites. This particular method of cross site content sharing, does not duplicate the content and data files being shared within and/or across the groups or GCMS sites; b) Transferring the content and data files from the Broadcasting CMS site to the Receiving CMS site. This particular method of cross site content sharing, does not duplicate the content and data files being transferred within and/or across the groups or GCMS sites; and c) Copying the content and data files across the Community CMS sites, Personal CMS sites and/or Project CMS sites within and/or across the groups or GCMS sites. This particular method of cross site content sharing, duplicates the content and data files within and/or across the groups or GCMS sites.

It is understood that a module representing web apps, virtual desktops/apps, web/cloud services and other user-defined modules, is a combination of content and data files that can be categorized as notification content, thus a module can be shared within and/or across groups or GCMS sites, and content and data files of a module, can be transferred and/or copied within and/or across groups or GCMS sites.

It is understood also, that the receiving CMS site (Community CMS site, Personal CMS site and/or Project CMS site) of the content and data files being broadcasted (shared, transferred or copied), can receive it by inheriting it (sent by the Broadcaster site based on a scheduler or content push), or can receive it by pulling it from the Broadcaster site.

And depending on the notification content and data files being received on the receiving CMS site and the receiving configuration set on the receiving CMS, the content and data files can be redirected to the user's e-mail device and/or text messaging device based on the e-mail account and cell phone number of the user subscribe/operator of the receiving CMS site.

GCMS Group Communication: Document Management & Exchange System

The Administrator user has the ability to administer and configure the Document Management & Exchange System through the Content Update Manager (19229 on FIG. 1).

The Content Update process for the Document Management & Exchange System is pre-defined to include the broadcast of content and data files related to the Document Management & Exchange Module delivered to the users on their respective CMS sites (Community CMS sites, Personal CMS sites and Project CMS sites) from the Community CMS site where is being broadcasted ((2.*c*) on FIG. 4).

The content produced by the User Broadcasters in reference to the Document Management & Exchange System, will be distributed from the Community CMS site to the Personal CMS sites or Project CMS site (it can also include another Community CMS site) within the GCMS, and to other Personal CMS sites and Project CMS sites in other GCMS sites connected to the first GCMS site through the Community CMS site.

The broadcasting of the content can be based on distributing the content and data files related to the content (security access to content and content), or distributing content and data files referencing the content and data files related to the content.

The broadcasting of the content and data files in relation to content can be done by: a) Sharing the content and data files across the Community CMS sites, Personal CMS sites and/or Project CMS sites within and/or across the groups or GCMS sites. This particular method of cross site content sharing, does not duplicate the content and data files being shared within and/or across the groups GCMS sites; b) Transferring the content and data files from the Broadcasting CMS site to the Receiving CMS site. This particular method of cross site content sharing, does not duplicate the content and data files being transferred within and/or across the groups or GCMS sites; and c) Copying the content and data files across the Community CMS sites, Personal CMS sites and/or Project CMS sites within and/or across the groups or PMGCMS sites. This particular method of cross site content sharing, duplicates the content and data files within and/or across the groups or GCMS sites.

It is understood that a module representing the Document Management & Exchange system, is a combination of content and data files that can be categorized as content, thus the Document Management & Exchange module can be shared within and/or across groups or GCMS sites, and content and data files of a module, can be transferred and/or copied within and/or across groups or GCMS sites.

It is understood also, that the receiving site (Community CMS, Personal CMS, or Project CMS) of the content and data files being broadcasted (shared, transferred or copied), can receive it by inheriting it (sent by the Broadcaster site based on a scheduler or by content push), or can receive it by pulling it from the Broadcaster site.

And depending on the type of Document Management & Exchange content and data files being received on the receiving CMS site and the receiving configuration set on the receiving CMS, the content and data files can be redirected to the user's e-mail device and/or text messaging device based on the e-mail account and cell phone number of the user subscribe/operator of the receiving CMS site.

GCMS Group Communication: Advertisement System

The Administrator user has the ability to administer and configure the Advertisement Content Manager (19227 on FIG. 1). Within the advertisement content can be classified as at least Image (logo) of the advertisement, Text of the advertisement, URL Link of the advertisement to an external site and/or Link to a Video/Audio/Text file.

The Advertisement process is pre-defined to include the broadcast of Advertisement that will be delivered to the users on their respective CMS sites (Community CMS sites, Personal CMS sites and/or Project CMS sites) as well as e-mail devices and text messaging devices, depending on the type of advertisement and the advertisement configuration performed by the broadcaster with the Advertisement System ((2.d) on FIG. 4).

The Advertisement content produced by the Advertisement Broadcasters in this embodiment, will be distributed from the Community CMS site to the Personal CMS sites and/or Project CMS sites within the GCMS, and to other Personal CMS sites and Project CMS sites in other GCMS sites connected to the first GCMS site through the Community CMS site. The selection of the group/subgroup to broadcast will be set during the Advertisement Set Up process.

The broadcasting of the advertisement content can be based on distributing the content and data files related to the advertisement content, or distributing content and data files referencing the content and data files related to the advertisement content.

The broadcasting of the content and data files in relation to advertisement content can be done by: a) Sharing the content and data files across the Community CMS sites, Personal CMS sites and/or Project CMS sites within and/or across the groups or GCMS sites. This particular method of cross site content sharing, does not duplicate the content and data files being shared within and/or across the groups or GCMS sites; b) Transferring the content and data files from the Broadcasting CMS site to the Receiving CMS site. This particular method of cross site content sharing, does not duplicate the content and data files being transferred within and/or across the groups or GCMS sites; and c) Copying the content and data files across the Community CMS sites, Personal CMS sites and/or Project CMS sites within and/or across the groups or GCMS sites. This particular method of cross site content sharing, duplicates the content and data files within and/or across the groups or GCMS sites.

It is understood that a module representing web apps, virtual desktops/apps, web/cloud services and other user-defined modules, is a combination of content and data files that can be categorized as advertisement content, thus a module can be shared within and/or across groups or GCMS sites, and content and data files of a module, can be transferred and/or copied within and/or across groups or GCMS sites.

It is understood also, that the receiving CMS site (Community CMS sites, Personal CMS sites or Project CMS sites) of the content and data files being broadcasted (shared, transferred or copied), can receive it by inheriting it (sent by the Broadcaster site based on a scheduler or by content push), or can receive it by pulling it from the Broadcaster site.

And depending on the type of Advertisement content and data files being received on the receiving CMS site and the receiving configuration set on the receiving CMS, the content and data files can be redirected to the user's e-mail device and/or text messaging device based on the e-mail account and cell phone number of the user subscribe/operator of the receiving CMS site.

GCMS Group Communication: Content Update System

The Administrator user has the ability to administer and configure the Content Update Manager (19229 on FIG. 1). Within, the content can be classified as security access to the content and the actual content delivered by the broadcaster.

The content is pre-defined as text, video and audio, and the content can be also associated to content and data files representing a module (within, the module could represent a Web App, Virtual Desktop/App or Web/Cloud Services), and additional user-defined access/content, and managed by the Content Update system ((2.e) on FIG. 4).

The content produced by the User Broadcasters will be distributed from the Community CMS site to the Personal CMS sites or Project CMS site (it can also include another Community CMS site) within the GCMS, and to other Personal CMS sites and Project CMS sites in other GCMS sites connected to the first GCMS site through the Community CMS site.

The broadcasting of the content can be based on distributing the content and data files related to the content (security access to content and content), or distributing content and data files referencing the content and data files related to the content.

The broadcasting of the content and data files in relation to content can be done by: a) Sharing the content and data files across the Community CMS sites, Personal CMS sites and/or Project CMS sites within and/or across the groups or GCMS sites. This particular method of cross site content sharing, does not duplicate the content and data files being shared within and/or across the groups GCMS sites; b) Transferring the content and data files from the Broadcasting CMS site to the Receiving CMS site. This particular method of cross site content sharing, does not duplicate the content and data files being transferred within and/or across the groups or GCMS sites; and c) Copying the content and data files across the Community CMS sites, Personal CMS sites and/or Project CMS sites within and/or across the groups or PMGCMS sites. This particular method of cross site content sharing, duplicates the content and data files within and/or across the groups or GCMS sites.

It is understood that a module representing web apps, virtual desktops/apps, web/cloud services and other user-defined modules, is a combination of content and data files that can be categorized as content, thus a module can be shared within and/or across groups or GCMS sites, and content and data files of a module, can be transferred and/or copied within and/or across groups or GCMS sites.

It is understood also, that the receiving CMS site (Community CMS sites, Personal CMS sites, or Project CMS sites) of the content and data files being broadcasted (shared, transferred or copied), can receive it by inheriting it (sent by the Broadcaster site based on a scheduler or by content push), or can receive it by pulling it from the Broadcaster site.

And depending on the type of Content Update content and data files being received on the receiving CMS site and the receiving configuration set on the receiving CMS, the content and data files can be redirected to the user's e-mail device and/or text messaging device based on the e-mail account and cell phone number of the user subscribe/operator of the receiving CMS site.

GCMS Group Communication: Group Content Search Engine System

The Administrator user has the ability to administer and configure the Group Content Search Engine (19228 on FIG. 1). Within, the content to be searched can be classified as content in the GCMS, where the search operation will be performed in each Community CMS, Personal CMS and Project CMS connected to the GCMS.

The Group Content Search process is pre-defined to perform the search in the entire GCMS, but during the implementation project for the Educational Institution, the Group Content Search can be customize and fine-tuned to meet specific requirements from the Educational Institution's needs and based on the GCMS design. Such search engine requirements can be adjusted and broadcasted to the Personal CMS sites and Project CMS sites in the GCMS ((2.f) on FIG. 4).

The group content search requirements content produced by the User Broadcasters will be distributed from the Community CMS site to the Personal CMS sites or Project CMS site (it can also include another Community CMS site) within the GCMS, and to other Personal CMS sites and Project CMS sites in other GCMS sites connected to the first GCMS site through the Community CMS site.

The broadcasting of the group content search requirements content can be based on distributing the content and data files related to the content (content search requirements), or distributing content and data files referencing the content and data files related to the group content search requirements content.

The broadcasting of the group content search requirements content and data files in relation to content can be done by: a) Sharing the content and data files across the Community CMS sites, Personal CMS sites and/or Project CMS sites within and/or across the groups or GCMS sites. This particular method of cross site content sharing, does not duplicate the content and data files being shared within and/or across the groups GCMS sites; b) Transferring the content and data files from the Broadcasting CMS site to the Receiving CMS site. This particular method of cross site content sharing, does not duplicate the content and data files being transferred within and/or across the groups or GCMS sites; and c) Copying the content and data files across the Community CMS sites, Personal CMS sites and/or Project CMS sites within and/or across the groups or PMGCMS sites. This particular method of cross site content sharing, duplicates the content and data files within and/or across the groups or GCMS sites.

It is understood that a module representing web apps, virtual desktops/apps, web/cloud services and other user-defined modules, is a combination of content and data files that can be categorized as group content search requirements content, thus a module can be shared within and/or across groups or GCMS sites, and content and data files of a module, can be transferred and/or copied within and/or across groups or GCMS sites.

It is understood also, that the receiving CMS site (Community CMS sites, Personal CMS sites, or Project CMS sites) of the group content search requirements content and data files being broadcasted (shared, transferred or copied), can receive it by inheriting it (sent by the Broadcaster site based on a scheduler or by content push), or can receive it by pulling it from the Broadcaster site.

And depending on the type of Group Content Search requirements content and data files being received on the receiving CMS site and the receiving configuration set on the receiving CMS, the content and data files can be redirected to the user's e-mail device and/or text messaging device based on the e-mail account and cell phone number of the user subscribe/operator of the receiving CMS site.

GCMS Group Communication: Inappropriate Content Search Engine System

The Administrator user has the ability to administer and configure the Inappropriate Content Search Engine (1922A on FIG. 1). Within, the content to be searched can be classified as inappropriate content in the GCMS, and where the search operation for inappropriate content will be performed in each Community CMS site, Personal CMS site and Project CMS site connected to the GCMS.

The Inappropriate Content Search process is pre-defined to perform the search in the entire GCMS, but during the implementation project for the Educational Institution, the Inappropriate Content Search can be customize and fine-tuned to meet specific requirements from the Educational Institution's needs and based on the GCMS design. Such inappropriate search engine requirements can be adjusted and broadcasted to the Personal CMS sites and Project CMS sites in the GCMS ((2.g) on FIG. 4).

The inappropriate content search requirements content produced by the User Broadcasters will be distributed from the Community CMS site to the Personal CMS sites or Project CMS site (it can also include another Community CMS site) within the GCMS, and to other Personal CMS sites and Project CMS sites in other GCMS sites connected to the first GCMS site through the Community CMS site.

The broadcasting of the inappropriate content search requirements content can be based on distributing the content and data files related to the content (content search requirements), or distributing content and data files referencing the content and data files related to the inappropriate content search requirements content.

The broadcasting of the inappropriate content search requirements content and data files in relation to content can be done by: a) Sharing the content and data files across the Community CMS sites, Personal CMS sites and/or Project CMS sites within and/or across the groups or GCMS sites. This particular method of cross site content sharing, does not duplicate the content and data files being shared within and/or across the groups GCMS sites; b) Transferring the content and data files from the Broadcasting CMS site to the Receiving CMS site. This particular method of cross site content sharing, does not duplicate the content and data files being transferred within and/or across the groups or GCMS sites; and c) Copying the content and data files across the Community CMS sites, Personal CMS sites and/or Project CMS sites within and/or across the groups or PMGCMS sites. This particular method of cross site content sharing, duplicates the content and data files within and/or across the groups or GCMS sites.

It is understood that a module representing web apps, virtual desktops/apps, web/cloud services and other user-defined modules, is a combination of content and data files that can be categorized as inappropriate content search requirements content, thus a module can be shared within and/or across groups or GCMS sites, and content and data files of a module, can be transferred and/or copied within and/or across groups or GCMS sites.

It is understood also, that the receiving CMS site (Community CMS sites, Personal CMS sites, or Project CMS sites) of the inappropriate content search requirements content and data files being broadcasted (shared, transferred or copied), can receive it by inheriting it (sent by the Broadcaster site based on a scheduler or by content push), or can receive it by pulling it from the Broadcaster site.

And depending on the type of Inappropriate Content Search requirements content and data files being received on the receiving CMS site and the receiving configuration set on the receiving CMS, the content and data files can be redirected to the user's e-mail device and/or text messaging device based on the e-mail account and cell phone number of the user subscribe/operator of the receiving CMS site.

GCMS Group Communication: Group Search Engine Optimization System

The Administrator user has the ability to administer and configure the Group Search Engine Optimization Manager (1922B on FIG. 1). Within, the content to be broadcasted can be classified as search optimization content in the GCMS, and where the search operation will be optimized in each Community CMS, Personal CMS and Project CMS connected to the GCMS.

The Group Search Engine Optimization Content administration is pre-defined to maintain search optimization content (keywords) in the entire GCMS, but during the implementation project for the Educational Institution, the Group SEO Content administration can be customize and fine-tuned to meet specific requirements from the Educational Institution's needs and based on the GCMS design. Such Group SEO Content will be adjusted and broadcasted to the Personal CMS sites and Project CMS sites in the GCMS ((2.*h*) on FIG. 4).

The broadcasting of the Group SEO content can be based on distributing the content related to the Group SEO content.

The broadcasting of the Group SEO content is done by copying the content (keywords) across the Community CMS sites, Personal CMS sites and/or Project CMS sites within and/or across the groups or GCMS sites. This particular method of cross site content sharing, duplicates the content and data files within and/or across the groups or GCMS sites.

It is understood also, that the receiving CMS site (Community CMS site, Personal CMS site and Project CMS site) of the Group SEO content being broadcasted (copied), can receive it by inheriting it (sent by the Broadcaster site based on a scheduler or content push), or can receive it by pulling it from the Broadcaster site.

And depending on the type of Group SEO content and data files being received on the receiving CMS site and the receiving configuration set on the receiving CMS, the content and data files can be redirected to the user's e-mail device and/or text messaging device based on the e-mail account and cell phone number of the user subscribe/operator of the receiving CMS site.

GCMS Group Communication: Access to On-line Classroom Systems

The Administrator user has the ability to administer and configure the Access to On-line Classroom Systems (1922C on FIG. 1). Within, the content to be broadcasted can be classified as access content to the Online Classroom System of the Educational Institution, and where the broadcast operation of the access content will be to each Community CMS, Personal CMS and Project CMS connected to the GCMS and based on each user subscriber's role and attributes.

The Access to On-Line Classroom Content administration is pre-defined to be managed from one single point (Community CMS site) and across the entire GCMS (Personal CMS sites and Project CMS sites), but during the implementation project for the Educational Institution, the Access to On-Line Classroom Content administration can be customize and fine-tuned to meet specific requirements from the Educational Institution's needs and based on the GCMS design. Such Access to On-Line Classroom Content will be adjusted and broadcasted to the Personal CMS sites and Project CMS sites in the GCMS ((2.*i*) on FIG. 4).

The broadcasting of the Access to On-Line Classroom Content can be based on distributing the content and data files related to the Access to On-Line Classroom Content, or distributing content and data files referencing the content and data files related to the Access to On-Line Classroom Content.

The broadcasting of the content and data files in relation to Access to On-Line Classroom Content can be done by: a) Sharing the content and data files across the Community CMS sites, Personal CMS site and/or Project CMS sites within and/or across the groups or GCMS sites. This particular method of cross site content sharing, does not duplicate the content and data files being shared within and/or across the groups or GCMS sites; b) Transferring the content and data files from the Broadcasting CMS site to the Receiving CMS site. This particular method of cross site content sharing, does not duplicate the content and data files being transferred within and/or across the groups or GCMS sites; and c) Copying the content and data files across the Community CMS sites, Personal CMS sites and/or Project CMS sites within and/or across the groups or GCMS sites. This particular method of cross site content sharing, duplicates the content and data files within and/or across the groups or GCMS sites.

It is understood that a module representing web apps, virtual desktops/apps, web/cloud services and other user-defined modules related to Access to On-Line Classroom Content, is a combination of content and data files that can be categorized as Access to On-Line Classroom Content, thus a module can be shared within and/or across groups or GCMS sites, and content and data files of a module, can be transferred and/or copied within and/or across groups or GCMS sites.

It is understood also, that the receiving CMS site (Community CMS sites, Personal CMS sites or Project CMS sites) of the content and data files being broadcasted (shared, transferred or copied), can receive it by inheriting it (sent by the Broadcaster site based on a scheduler or content push), or can receive it by pulling it from the Broadcaster site.

And depending on the type of Access to On-Line Classroom content and data files being received on the receiving CMS site and the receiving configuration set on the receiving CMS, the content and data files can be redirected to the user's e-mail device and/or text messaging device based on the e-mail account and cell phone number of the user subscribe/operator of the receiving CMS site.

GCMS Group Communication: Access to FrontOffice and BackOffice Systems

The Administrator user has the ability to administer and configure the Access to FrontOffice and BackOffice Systems (1922D on FIG. 1). Within, the content to be broadcasted can be classified as access content to the FrontOffice and BackOffice System of the Educational Institution, and where the broadcast operation of the access content will be to each Community CMS, Personal CMS and Project CMS connected to the GCMS and based on each user subscriber's role and attributes.

The Access to FrontOffice and BackOffice System Content administration is pre-defined to be managed from one single point (Community CMS site) and across the entire GCMS (Personal CMS sites and Project CMS sites), but during the implementation project for the Educational Institution, the Access to FrontOffice and BackOffice System Content administration can be customize and fine-tuned to meet specific requirements from the Educational Institution's needs and based on the GCMS design. Such Access to FrontOffice and BackOffice System Content will be adjusted and broadcasted to the Personal CMS sites and Project CMS sites in the GCMS ((2.*j*) on FIG. 4).

The broadcasting of the Access to FrontOffice and BackOffice System Content can be based on distributing the content and data files related to the Access to FrontOffice and BackOffice System Content, or distributing content and data files referencing the content and data files related to the Access to FrontOffice and BackOffice System Content.

The broadcasting of the content and data files in relation to Access to FrontOffice and BackOffice System Content can be done by: a) Sharing the content and data files across the Community CMS sites, Personal CMS site and/or Project CMS sites within and/or across the groups or GCMS sites. This particular method of cross site content sharing, does not duplicate the content and data files being shared within and/or across the groups or GCMS sites; b) Transferring the content and data files from the Broadcasting CMS site to the Receiving CMS site. This particular method of cross site content sharing, does not duplicate the content and data files being transferred within and/or across the groups or GCMS sites; and c) Copying the content and data files across the Community CMS sites, Personal CMS sites and/or Project CMS sites within and/or across the groups or GCMS sites. This particular method of cross site content sharing, duplicates the content and data files within and/or across the groups or GCMS sites.

It is understood that a module representing web apps, virtual desktops/apps, web/cloud services and other user-defined modules related to Access to FrontOffice and BackOffice System Content, is a combination of content and data files that can be categorized as Access to FrontOffice and BackOffice System Content, thus a module can be shared within and/or across groups or GCMS sites, and content and data files of a module, can be transferred and/or copied within and/or across groups or GCMS sites.

It is understood also, that the receiving site (Community CMS, Personal CMS or Project CMS) of the content and data files being broadcasted (shared, transferred or copied), can receive it by inheriting it (sent by the Broadcaster site based on a scheduler or content push), or can receive it by pulling it from the Broadcaster site.

And depending on the type of Access to FrontOffice and BackOffice System content and data files being received on the receiving CMS site and the receiving configuration set on the receiving CMS, the content and data files can be redirected to the user's e-mail device and/or text messaging device based on the e-mail account and cell phone number of the user subscribe/operator of the receiving CMS site.

GCMS Group Communication: Access to Cloud Computer Systems

The Administrator user has the ability to administer and configure the Access to Cloud Computer Systems (1922E on FIG. 1). Within, the content to be broadcasted can be classified as access content to the Cloud Computer System, and where the broadcast operation of the access content will be to each Community CMS, Personal CMS and Project CMS connected to the GCMS and based on each user subscriber's role and attributes.

The Access to Cloud Computer System Content administration is pre-defined to be managed from one single point (Community CMS site) and across the entire GCMS (Personal CMS sites and Project CMS sites), but during the implementation project for the Educational Institution, the Access to Cloud Computer System Content administration can be customize and fine-tuned to meet specific requirements from the Educational Institution's needs and based on the GCMS design. Such Access to Cloud Computer Content will be adjusted and broadcasted to the Personal CMS sites and Project CMS sites in the GCMS ((2.*k*) on FIG. 4).

It is understood that the Access to Cloud Computer content includes access content to Web Apps, Virtual Desktop, Virtual Apps and Web/Cloud Services. The broadcasting of the Access to Cloud Computer Content can be based on distributing the content and data files related to the Access t to Cloud Computer Content, or distributing content and data files referencing the content and data files related to the Access to Cloud Computer Content.

The broadcasting of the content and data files in relation to Access to Cloud Computer Content can be done by: a) Sharing the content and data files across the Community CMS sites, Personal CMS site and/or Project CMS sites within and/or across the groups or GCMS sites. This particular method of cross site content sharing, does not duplicate the content and data files being shared within and/or across the groups or GCMS sites; b) Transferring the content and data files from the Broadcasting CMS site to the Receiving CMS site. This particular method of cross site content sharing, does not duplicate the content and data files being transferred within and/or across the groups or GCMS sites; and c) Copying the content and data files across the Community CMS sites, Personal CMS sites and/or Project CMS sites within and/or across the groups or GCMS sites. This particular method of cross site content sharing, duplicates the content and data files within and/or across the groups or GCMS sites.

It is understood that a module representing web apps, virtual desktops/apps, web/cloud services and other user-defined modules related to Access to Cloud Computer Content, is a combination of content and data files that can be categorized as Access to Cloud Computer Content, thus a module can be shared within and/or across groups or GCMS sites, and content and data files of a module, can be transferred and/or copied within and/or across groups or GCMS sites.

It is understood also, that the receiving site (Community CMS, Personal CMS or Project CMS) of the content and data files being broadcasted (shared, transferred or copied), can receive it by inheriting it (sent by the Broadcaster site based on a scheduler or content push), or can receive it by pulling it from the Broadcaster site.

And depending on the type of Access to Cloud Computer content and data files being received on the receiving CMS site and the receiving configuration set on the receiving CMS, the content and data files can be redirected to the user's e-mail device and/or text messaging device based on the e-mail account and cell phone number of the user subscribe/operator of the receiving CMS site.

GCMS Group Communication: Channel Manager Functions

The Administrator user has the ability to administer and customize, with the Communication Channel Manager functions (19220 on FIG. 1), additional attributes in a group communication. Among these is the Channel Set Up (19221 on FIG. 1), Broadcast Manager (19222 on FIG. 1), Mufti-Directional Manager (19223 on FIG. 1) and Posting Manager (19224 on FIG. 1).

The Communication Channel Set Up System and Method 19221 (also described on FIG. 8), defines and establishes a direction of communication for messages (e.g.: from the Messaging Board System, Notification System, Document Management & Exchange System, Advertisement System, Content Update System, Group Content Search Engine System, Inappropriate Content Search Engine System, Group Search Engine Optimization System, Access On-line Classroom System, Access FrontOffice and BackOffice Systems, Access to Cloud Computer Systems, and from any other user-defined group system) sent among sites (Community CMS sites, Personal CMS sites and Project CMS sites) 19211, 19212 and 19213 and to e-mail devices 11200 and text-messaging 11300 devices within or among Educational Groups (GCMS) 19200 across the internet. FIG. 8, shows a message from the messaging board system, being sent from a Professor (Professional Professor Site [Personal CMS site] 19213) to a Student (Professional Student Site [Personal CMS site] 19213, Student E-Mail Device 11200 and Student TEXT-Messaging Device 11300). The Professor will include a communication channel module 3000 in a page of his/her site (Personal CMS site) or professional site 19213. Then, on the channel id holder 3100 of the channel module 3000 will include a new channel id 3110 specified by a naming convention for the channels. Then, on the body section of the module 3200 will include the message (e.g.: "DEF") to be sent 3210. The Professor then will list in the Community CMS, the different channel ids with its corresponding description for a particular subject (e.g.: "[DomainName]—[ChannelNumber1]", [DomainName]—[ChannelNumber2]"). The Student, then will include a communication channel module 3000 in a page of his/her sites (Personal CMS) or professional site 19213. Then, on the channel id holder 3100 of the channel module 3000 will include the channel id 3110 specified by the Professor. The Student has the control of redirecting the message to his e-mail device (e.g.: by specifying +E on the channel id) and to his text-messaging device (e.g.: by specifying +T on the channel id) 3110. Later, the Broadcast Manager 19222 will push the message (e.g.: "DEF") from the Professor's site (Personal CMS) to the Student's site (Personal CMS), e-mail and text-messaging devices, following the Broadcast Direction for Channel (2140, 2141 and 2142 respectively). The e-mail device 11200 will receive an e-mail from the Educational Group (GCMS) with a Reference Id 3310 specifying the channel id (e.g.: "[DomainName]—ChannelNumber1]") and in the body of the e-mail 3320 the message (e.g.: "DEF") 3210. The text-messaging device 11300 will receive a text message with a Reference Id 3410 specifying the channel id (e.g.: "[DomainName]—[ChannelNumber1]") and in the body of the text message 3420 the message (e.g.: "DEF") 3210.

As the above naming convention on communication channel has been described in terms of a specific naming convention and format, it is to be understood that the invention is not limited to this naming convention and format. This naming convention and format may be embodied in many different ways and should not be construed as limited to the embodiments set forth herein; rather, this specific naming convention and format is provided by way of illustration only and so that this disclosure will be thorough, complete and will fully convey the full scope of the naming convention and format to those skilled in the art. Indeed, many modifications and other embodiments of the naming convention and format will come to mind of those skilled in the art to which this naming convention and format pertains, and which are intended to be and are covered herein.

The Broadcast Manager 19222 will broadcast all messages based on a Scheduler 19252. The Broadcast Manager will broadcast messages from the Messaging Board System, Notification System, Document Management & Exchange System, Advertisement System, Content Update System, Group Content Search Engine System, Inappropriate Content Search Engine System, Group Search Engine Optimization System, Access On-line Classroom System, Access FrontOffice and BackOffice Systems, Access to Cloud Computer Systems, and from any other user-defined group system).

The Multi-Directional communication (19223 on FIG. 1) system and method allows for communication-direction among the CMS sites (2000 on FIG. 7) providing all possible directions of communication as shown on FIG. 7. Some of them are listed herein: 1) Communication-Direction within the Group Cloud Management System or GCMS (2100 on FIG. 7): 1.a) From User Community Site (Community CMS) to User Community Site (Community CMS) (2120 on FIG. 7); 1.b) From User Community Site (Community CMS) to Personal CMS site (2110 on FIG. 7); 1.c) From User Community Site (Community CMS) to E-Mail Device (2111 on FIG. 7); 1.d) From User Community Site (Community CMS) to Text Message Device (2112 on FIG. 7); 1.e) From Personal CMS to User Community Site (Community CMS) (2130 on FIG. 7); 1.f) From Personal CMS to Personal CMS site (2140 on FIG. 7). 2) Communication-Direction among Groups (GCMS) (2200 on FIG. 7): 2.a) From User Community Site (Community CMS) from Group Cloud Management System (GCMS) "B" to User Community Site (Community CMS) from Group Cloud Management System (GCMS) "A" 2220; 2.b) From User Community Site (Community CMS) from Group Cloud Management System (GCMS) "B" to Personal CMS from Group Cloud Management System (GCMS) "A" 2210; 2.c) From Personal CMS from Group Cloud Management System (GCMS) "B" to Personal CMS from Group Cloud Management System (GCMS) "A" 2240 (+e-mail 2241, +txt-message 2242); 2.d) From Personal CMS from Group Cloud Management System (GCMS) "A" to Community CMS from Group Cloud Management System (GCMS) "B" 2230; 2.e) etc. (see FIG. 7).

The Posting Manager 19224 (FIG. 1) is an intermediate stage between the process of saving a notification and broadcasting 19222 (FIG. 1) the notification to the receivers. If a particular notification massage is saved, but not posted, then the broadcast manager 19222 (FIG. 1) will not broadcast the message. The broadcast manager 19222 (FIG. 1) will only broadcast posted notifications. The Posting Manager can be fine-tuned in the process of post content across the receiving CMS sites (Community CMS sites, Personal CMS sites and Project CMS sites) from the Messaging Board System, Notification System, Document Management & Exchange System, Advertisement System, Content Update System, Group Content Search Engine System, Inappropriate Content Search Engine System, Group Search Engine Optimization System, Access On-line Classroom System, Access FrontOffice and BackOffice Systems, Access to Cloud Computer Systems, and from any other user-defined group system).

GCMS Group Communication Process

The Educational Group Communication process (Group Communication on FIG. 4) (FIG. 15/FLOW CHART 2) is the process followed to establish a communication among the Professor (Teacher), Staff, Project, Student and/or Alumnus and Community entities. This group communication involves the Community sites (Community CMS sites) 19211 19212 ((a) and (b) on FIG. 4), the Professional Sites (Personal CMS sites and Project CMS sites) 19213 and the entity's e-mail 11200 and text messaging 11300 devices ((c) on FIG. 4). A technical view of a communication between two CMS sites is shown on FIG. 5.a and FIG. 5.b.

The Educational Group Communication (FIG. 4) (FIG. 15/FLOW CHART 2) (FIG. 5.a and 5.b) provides a communication platform to support the way the Professors (Teachers), Staff, Projects, Students and/or Alumnus (Personal CMS sites) will interact within the Educational Group (GCMS) 19200 for the Educational Institution (K-12 or Higher Education).

The system and methods of the present invention, allows the Educational Institution to design the Educational Group (GCMS) with the proper configuration of Community CMS sites, Personal CMS sites and Project CMS sites, and the proper Group Communication among these CMS sites. Because of this flexibility, it is important to properly follow the Implementation Methodology of the system and methods of the present invention (FIG. 9).

In this particular embodiment, there are two Community CMS sites, one for Faculty, Staff and Projects (R&D Projects conducted at the Educational Institution), and one for Students and Alumnus:

The Faculty, Staff and Projects Community site (Community CMS) ((a) on FIG. 4), is where all Professors (Teachers), Employees and/or Projects have an account and where they can participate in Discussion Forums, receive support, training and other related services, as well as post messages in the Message Board System ((2.a) on FIG. 4), create and send Notifications ((2.b) on FIG. 4) to Professors (Teachers), Employees, Projects, Students and Alumnus, Manage and Exchange Community Documents ((2.c) on FIG. 4). Staff and Admin Users will be able to Manage Advertisement content in the GCMS, from Sponsors ((2.d) on FIG. 4), Content from the Educational Institution ((2.e) on FIG. 4), Search Group Content from the Educational Group ((2.f) on FIG. 4), define Inappropriate Content to be searched in the Educational Group ((2.g) on FIG. 4), define Keywords to optimize the search on the Educational Group ((2.h) on FIG. 4), define Access to Third Party Systems ((2.i, 2.j, 2.k) on FIG. 4, FIG. 5a, FIG. 5b, FIG. 25a and FIG. 29a).

The Students and/or Alumnus Community site (Community CMS) ((b) on FIG. 4), is where all Students and/or Alumnus have an account and where they can participate in Discussion Forums, receive support, training, and other related services, as well as post messages in the Message Board System ((2.a) on FIG. 4), create and send Notifications ((2.b) on FIG. 4) to Students, Alumnus, Professors (Teachers), Employees and/or Projects, and any other Group Communication feature available in their community (Group Communication on FIG. 4).

It is important to mention that the Faculty, Staff, Projects, Students and Alumnus can be all included in one Community CMS site which is the Controlling CMS of the GCMS, or they can be reorganized in multiple Community CMS sites or Controlling CMS sites with the purpose of fine-tuning security and the behavior of the dependent Personal CMS sites and Projects CMS sites connected to those Communities CMS sites.

The Professional Sites (Personal CMS sites and Project CMS sites) for Students, Alumnus, Professors (Teachers), Employees and/or Projects ((c) on FIG. 4) is where each of these have their own software environment (software infrastructure) that will allow them to: 1) Market their respective "professional profile" over the internet, as well as share personal information (related to family, sports, hobbies, or user defined information) using the Front-End (Pages and Menu Options); 2) Store files in their own elastic space; 3) Use Front-End Web Apps and/or Web/Cloud services, and Back-End Virtual Desktop/Apps, Web Apps and/or Web/Cloud services (Cloud Computer); and 4) Connect their respective Personal CMS sites and/or Project CMS sites in a group (GCMS) or Educational Group, with the respective Community CMS sites controlling the group/s, and participate in Group Communication among the CMS sites in the GCMS and/or cross GCMS sites.

The Personal CMS site, provides to the user (Faculty, Staff, Student, Alumnus) with a personal software device environment (cloud environment) that can be personalized independently by each user (personal cloud environment), which features software for use to deliver anywhere, at any time and on any hardware device, collaboration, virtualization and cloud computing services for personal use to securely and in one place with elastic capacity, store, maintain and use web apps, virtual apps, files, photos, music, video, virtual desktops, software as a service and professional and personal profile for use in a stand-alone mode or connected-in-a-group mode with the purpose of collaboration via a cloud web and virtual environment established for the Educational Institution.

It is understood that the description above applies also to Project CMS sites, where the services relates to a R&D Project and a Project Team; and it is also understood that the same description above also applies for a Community CMS sites, where the service relates to a Community of Users and an Educational Group (e.g.: University System, University, Campus, Program, etc.).

Faculty, Students, Staff, Alumnus and Projects Teams will use their respective Personal CMS sites and Project CMS sites to receive and send messages of their interest using the Message Board System ((2.a) on FIG. 4), as well as to receive Notifications ((2.b) on FIG. 4) from others from the same Education Group (GCMS) and/or from other Educational Groups (other GCMS sites). In addition, Professional sites (Personal CMS sites and Project CMS sites) will be able to receive content from the Document Management & Exchange System ((2.c) on FIG. 4), Advertisement System ((2.d) on FIG. 4), Content Update System ((2.e) on FIG. 4), Group Content Search Engine System ((2.f) on FIG. 4), Inappropriate Content Search Engine System ((2.g) on FIG. 4), Group Search Engine Optimization ((2.h) on FIG. 4), Access to Third Party Systems/Apps ((2.*i*, 2.*j*, 2.*k*) on FIG. 4, FIG. 5.*a* and FIG. 5.*b*); that are controlled by the Educational Group (GCMS) or Educational Institution.

Faculty, Staff, Projects, Students and Alumnus can exchange Documents ((2.*c*) on FIG. 4), (Word, Excel, or any other types of documents or files including text, video, voice and image) by uploading and downloading these documents from and/or to their respective Professional sites (Personal CMS sites and Project CMS sites) ((c) on FIG. 4) and/or respective Community CMS site ((a) and (b) on FIG. 4). They can also read and or modify these documents, without the need of exchanging them via e-mail and directly from each of their respective Personal CMS sites, as these are connected to the GCMS and participating in cloud collaboration.

These sites (Personal CMS sites, Project CMS sites and Community CMS sites), have also the ability to create links and feeds to and/or from the Educational Institution's entity website (Higher Education or K-12 Institution's Website) by supporting the standards for Links and RSS Technology (Really Simple Syndication).

These sites (Personal CMS sites, Project CMS sites and Community CMS sites), include Additional Features (described on FIG. 4), allowing the Educational Group (GCMS) to share content with the Internet or World Wide Web. It is understood that an Educational Institution can decide to replace its website entirely by transferring all the content in its website into at least one of the Community CMS sites controlling the GCMS for the Educational Institution, as the Community CMS site includes all necessary functionality to maintain a good looking educational institution website.

The communication process among CMS sites within the GCMS and among CMS sites across multiple GCMS sites can be summarized in this embodiment in 9 sub-processes. These sub-processes are associated with different forms of Cross Site Content Sharing supporting Social Collaboration in a Site Groups Platform (FIG. 15/FLOW CHART 2, 8000): 1) Message Board 8100 process (FIG. 16/FLOW CHART 2*a*); 2) Notification 8200 Process (FIG. 17/FLOW CHART 2*b*); 3) Document Exchange 8300 Process (FIG. 18/FLOW CHART 2*c*); 4) Advertisement 8400 Process (FIG. 19/FLOW CHART 2*d*); 5) Content Update 8500 Process (FIG. 20/FLOW CHART 2*e*); 6) Group Content Search Engine 8600 Process (FIG. 21/FLOW CHART 2*f*); 7) Inappropriate Content 8700 Search Process (FIG. 22/FLOW CHART 2*g*); 8) Group Search Engine Optimization 8800 Process (FIG. 23/FLOW CHART 2*h*); 9) Access to Third Party Systems/Apps (8910-Access to Online Classroom Systems [from the educational institution], 8920-Access to Front/Back Office Systems [from the educational institution], 8930-Access to Cloud Computer Systems[web apps, virtual desktop/apps and others, provided by the educational institution or included by the GCMS system and in the Personal CMS, Project CMS and/or Community CMS] (FIG. 24/FLOW CHART 2*i*, 2*j*, 2*k*, FIG. 5.*a* and FIG. 5.*b*)).

GCMS Group Communication: Message Board Process

The Message Board 8100 Process (FIG. 16/FLOW CHART 2*a*) is the old concept of a message board process, but now, electronically. The Message Board System and Process is categorized as a social collaboration solution with cross site content sharing on a site groups platform (GCMS). A Professor (Teacher), Employee, Project Team, Student and/or Alumnus can post a message on the message board system at the Faculty, Staff, Project Community site or Student, Alumnus Community Site (Community CMS sites) 19211 19212 or at their own site (Personal CMS site or Project CMS site) 19213, and then, other Professors (Teachers), Employees, Project Teams, Students or Alumnus can retrieve at their site (Personal CMS sites or Project CMS sites) 19213 the message that has been posted by the prior Professor (Teacher), Employee, Project Team, Student and/or Alumnus.

The first step executed by the user in this process, is the Preparation of the Message 8110 comprising the step of including a new Communication Module 8111 and then including the Channel Id and the Message 8112, depending on the creator, a Professor (Teacher), Employee, Project Team, Student or an Alumnus, the message will be saved (or posted) respectively to the Professor's (Teacher's), Employee's Project Team's, or Student's, and/or Alumnus' Community site (Community CMS site) 19212 19211 and/or their own Professional site (Personal CMS site and Project CMS site) 19213.

The Professor (Teacher), Employee Project Team, Student, or Alumnus will know by the creator of the message or by looking into the Message Directory at the Community site (Community CMS sites) 19212 19211, that there is a message posted and that can be retrieved, they will also know the communication channel id. So the Student, Alumnus, Professor (Teacher), Employee and/or Project Team interested in that particular message will capture the message 8120 by including a communication module 8121 in a page of his/her professional site (Personal CMS site and Project CMS site) and by assigning the channel id provided by the creator 8122.

The message broadcast process 8130, runs on a scheduler 19252, when is time to propagate 8131, the process will read the message posted by the creators in the Community or Professional sites (Community CMS site, Personal CMS site and Project CMS site) 19211 19212 19213 and will broadcast 8132 those messages to the Student's, Alumnus', Professor's (Teacher's), Employees' and/or Project Team's Professional Sites (Personal CMS sites and Project CMS sites) 19213, that are expecting the message based on the message code assigned. The message will be broadcasted also to the e-mail and text message devices of the user receiving the message if specified by the receiver user.

By using the Message Board System and Process, each Student, Alumnus e-F Professor (Teacher), Staff and/or Project Team has the flexibility and convenience of just including the messages of their interest in their own site (Personal CMS sites and Project CMS sites). Every time that the message creator updates the message, the Professional site (Personal CMS sites and Project CMS sites) that carries the communication channel, will receive the new updated message.

The Messaging Board System and Process is configurable and fine-tuned during the Implementation Project of the present invention for the Educational Institution, following the Implementation Methodology described on FIG. 9 and section: GCMS System Implementation Methodology.

GCMS Group Communication: Notification Process

The Notification 8200 Process (FIG. 17/FLOW CHART 2*b*), is the process followed to notify Students, Alumnus, Professors (Teachers), Employees, and/or Projects Teams of a particular event. The Notification System and Process is categorized as a social collaboration solution with cross site content sharing on a sites groups platform (GCMS).

The first step executed by the user in this process, is the Preparation of the Notification 8210, depending on the creator, a Student, Alumnus, Professor (Teacher), Employee and/or Project Team, the notification will be imputed 8211, validated 8212 and saved 8213 respectively in the Student's, Alumnus', Professor's (Teacher's), Employee's, and/or Project Team's Community site (Community CMS sites) 19211 19212. The configuration of the Notification allows defining the type of notification (Emergency 8221 or Standard 8222), a selection criteria based on attributes of the recipients (subgroup of students, alumnus, professors [teachers], employees, and/or projects teams) and the Notification method (site [Personal CMS sites and Project CMS sites] 11100, e-mail 11200 and text-message 11300, also (c) on FIG. 4).

The Type of Notification includes the Emergency Notification 8221 and Standard Notification 8222. While the Emergency Notification is sent to everyone in the Educational Group (GCMS) and sent via all notification methods; the Standard Notification is configurable, so it can be sent to a specific subgroup of students, alumnus, professors (teachers), employees, and/or projects teams and only via a specific notification method.

The Selection Group to send the notification, is user defined and represents the different groups of interest within the Educational Group (GCMS) (faculty, Degree, Subject, and other user defined classifications). The selection Group is configured based on the Educational Institution where this present invention (Educational Group—GCMS) is implemented, creating an easy way to group Students, Alumnus, Professors (Teachers), Staff and/or Projects Teams' CMS sites (Personal CMS sites and Project CMS sites), based on a common interest or topic.

The Notification Method includes: a) The notification sent to the Professional Sites (Personal CMS sites and Project CMS sites) 19213 accessed with a web browser device 11100; b) The notification sent via E-mail device 11200; and c) The notification sent via Text Message device 11300 (Cell Phone, PDA, Mobile Devices, Tables, and others).

Once the Notification is prepared and saved 8213 respectively in the Student's, Alumnus' Community site (Community CMS sites) 19211 and/or the Professor's (Teacher's), Employee and/or Projects Community site (Community CMS sites) 19212, then the creator of the Notification can execute the Posting Process 8220.

The Posting Process 8220 will review the notification configuration. If the notification is an Emergency Notification 8221, then will post the notification in all Professional Sites (Personal CMS sites and Project CMS sites) 19213, will send the notification via e-mail 11200 and text message 11300 to the Professors (Teachers), Employee, Projects Teams, Students (and student's parents or guardians) and Alumnus.

If the notification is a Standard Notification 8222, then the process will execute the posting based on the notification configuration that will determine the selection group of recipients for the notification and the notification method to be used.

By using the Notification System and Process, Educational Institutions have an instant way to communicate to the entire Faculty, Staff and Student body, any type of message (Emergency or Standard), and such message will be delivered at least in one of: 1) A content into a Page/Module of the Personal CMS site of the user, 2) An e-mail into the e-mail device of the user, and 2) A text message into the text messaging device of the user. It is understood that the content can include Video and Audio, so the Notification can have the form of a Video/Audio communication transferred through a Video/Conferencing Module (Web App and/or Web/Cloud Service) to the Personal CMS site of the user, and such Video/Audio Communication can be Live or first Recorded and then broadcasted.

The Notification System and Process is configurable and fine-tuned during the Implementation Project of the present invention for the Educational Institution, following the Implementation Methodology described on FIG. 9 and section: GCMS System Implementation Methodology.

GCMS Group Communication: Document Exchange Process

The Document Exchange 8300 Process (FIG. 18/FLOW CHART 2c), is the process followed to exchange documents among Students, Alumnus, Professors (Teachers), Employees, and/or Projects Teams by uploading 8311 8321 or downloading 8312 8322 from their Professional Sites (Personal CMS and Project CMS) 19213 and Communities (Community CMS) 19211 19212. The Document Exchange System and Process is categorized as a social collaboration solution with cross site content sharing on a sites groups platform (GCMS).

The Document Exchange System and Process in relation to the Community CMS, is implemented on a shared module across all sites (Community CMS sites, Personal CMS sites and Project CMS sites) in a group or subgroup of the GCMS. This allows the user to access the documents of the Community CMS directly from his/her Personal CMS or Project CMS.

The Document Exchange System and Process is configurable and fine-tuned during the Implementation Project of the present invention for the Educational Institution, following the Implementation Methodology described on FIG. 9 and section: GCMS System Implementation Methodology.

GCMS Group Communication: Advertisement Process

The Advertisement Process 8400 (FIG. 19/FLOW CHART 2d), is the process followed to exchange advertisement content among Students, Alumnus, Professors (Teachers), Employees, and/or Projects Team sites (Personal CMS and Project CMS) by including 8410 the advertisers logo file, keyword and URL link into the Community site (Community CMS) 19212, including the Advertisement URL Location 8420 into the Community site (Community CMS) 19212 and later broadcasting this content 8430 from the Community site (Community CMS) 19212 to the Professional Sites (Personal CMS and Project CMS) 19213, to then being displayed 8440 by the Professional Sites (Personal CMS and Project CMS) 19213. The Advertisement System and Process is categorized as a social collaboration solution with cross site content sharing on a sites groups platform (GCMS).

By using the Advertisement System and Process, Educational Institutions have a way of obtaining Annual Funding from an Advertisement Revenue Stream that can be generated by bringing Sponsors to place their logos in an Advertisement System that the Educational Institution can fine-tune based on its needs and in its Educational Group (GCMS) and independently from other Educational Institutions' GCMS sites.

The Advertisement System and Process is configurable and fine-tuned during the Implementation Project of the present invention for the Educational Institution, following the Implementation Methodology described on FIG. 9 and section: GCMS System Implementation Methodology.

GCMS Group Communication: Content Update Process

The Content Update Process 8500 (FIG. 20/FLOW CHART 2e), is the process followed to exchange educational institution's content among Students, Alumnus, Professors (Teachers), Employees and/or Projects Teams sites (Personal CMS sites and Project CMS sites) by including 8510 the content into the Community site (Community CMS sites) 19212, including the Content Update URL Location 8520 into the Community site (Community CMS sites) 19212 and later broadcasting this content 8530 from the Community site (Community CMS sites) 19212 to the Professional Sites (Personal CMS sites and Project CMS sites) 19213, to then being displayed 8540 by the Professional Sites (Personal CMS sites and Project CMS sites) 19213. The Content Update System and Process is categorized as a social collaboration solution with cross site content sharing on a site groups platform (GCMS).

By using the Content Update System and Process, Educational Institutions have a way of maintaining a single set of content and data files (without duplicating) across the entire GCMS comprised by the several CMS sites. For example, a State University System comprised by five Universities, can have a GCMS structure of a Community CMS site controlling a group of five Community CMS sites (one for each University), thus it can include content and data files in the controlling Community CMS site, and share that content and data files across the five Community CMS site. Such content could be public content (for anyone on the World Wide Web) or private content, just for the GCMS. The benefits of this approach are: a) Content and data files easy to maintain and in one single site, b) Maintaining the same "content message" across the entire University System (GCMS), but personalized for each University or Campus (Group, Sub-Group, Team, Personal) (GCMS/CMS), and c) No duplication of content and data files.

It is understood that the content and data files broadcasted with the Content Update System and Process, could relate to a module representing a Web App, a Virtual Desktop, a Virtual App or a Web/Cloud Service, as a consequence, the benefits for the Educational Institution are: a) The Module is installed and maintained in only one site and shared across all sites in the GCMS (e.g.: Personal CMS sites and Project CMS sites), b) No duplication of modules/data, c) The data stored by the module is kept in one site (e.g.: Community CMS site), even though is manipulated by the users from other sites (e.g.: Personal CMS sites and Project CMS sites), and d) An easier and fast way to grant and deny access to the module across the GCMS.

The Content Update System and Process is configurable and fine-tuned during the Implementation Project of the present invention for the Educational Institution, following the Implementation Methodology described on FIG. 9 and section: GCMS System Implementation Methodology.

GCMS Group Communication: Group Content Search Process

The Group Content Search Engine Process 8600 (FIG. 21/FLOW CHART 2*f*), is the process followed to search Educational Groups (GCMS) content among Students, Alumnus, Professors (Teachers), Employees and/or Projects Team sites (Community CMS, Personal CMS and Project CMS) by including 8610 the content to be searched into the Community site (Community CMS) 19212, including the execution of the Group Search 8620 that searches the Community site (Community CMS) 19211 19212 to the Professional Sites (Personal CMS and Project CMS) 19213, to then display 8630 the results of the URL founded. The Group Content Search Engine System and Process is categorized as a social collaboration solution with cross site content sharing on a sites groups platform (GCMS).

By using the Group Content Search Engine System and Process, Educational Institutions have a way of searching for content across the entire GCMS, or on a CMS by CMS basis. The Group Content Search Engine will search content that is public content (exposed to the World Wide Web) or content that is private content and only for the GCMS. The benefit of this approach are: a) A faster and easy way to search across the GCMS, b) Flexible fine-tuning capabilities per GCMS, sub-groups of a GCMS and CMS sites.

The Group Content Search Engine System and Process is configurable and fine-tuned during the Implementation Project of the present invention for the Educational Institution, following the Implementation Methodology described on FIG. 9 and section: GCMS System Implementation Methodology.

GCMS Group Communication: Inappropriate Content Search Process

The Inappropriate Content Search Process 8700 (FIG. 22/FLOW CHART 2*g*), is the process followed to search inappropriate content within the Educational Group (GCMS) by including the Inappropriate Content 8710 into the Community site (Community CMS site) 19212, and the Clean Internet Content Database 19214 and Inappropriate Content search parameters 8720 and later search this content 8730 from the Community site (Community CMS site) 19212 and Database 19214 in the Professional Sites (Personal CMS site and Project CMS site) 19213, to then display 8740 the results of the URL founded. The Inappropriate Content Search Engine System and Process is categorized as a social collaboration solution with cross site content sharing on a sites groups platform (GCMS).

By using the Inappropriate Content Search Engine System and Process, Educational Institutions have a way of defining, creating and storing, what it is consider "Inappropriate Content" to be included in any CMS site in the GCMS (Community CMS sites, Personal CMS sites and Project CMS sites). And based on the "Inappropriate Content" keywords, have the Inappropriate Content Search Engine running on a Scheduler (e.g.: 24/7/365), and reporting the CMS sites that are including inappropriate content. The benefit of this approach is to maintain "clean content" within the GCMS, by searching and removing the "polluted content", thus maintaining a good public image of the Educational Institution across the GCMS (Community CMS sites, Personal CMS sites and Project CMS sites).

The Group Content Search Engine System and Process is configurable and fine-tuned during the Implementation Project of the present invention for the Educational Institution, following the Implementation Methodology described on FIG. 9 and section: GCMS System Implementation Methodology.

GCMS Group Communication: Group Search Engine Optimization Process

The Group Search Engine optimization Process 8800 (FIG. 23/FLOW CHART 2*h*), is the process followed to optimize the search of content in the Educational Group (GCMS) by including 8810 the optimization keyword-content into the Community site (Community CMS) 19212, including the optimization keyword-content schedule broadcast 8820 into the Community site (Community CMS) 19212 and later broadcasting this optimization keyword-content 8830 from the Community site (Community CMS) 19212 to the Professional Sites (Personal CMS and Project CMS) 19213. The Group Search Engine Optimization System and Process is categorized as a social collaboration solution with cross site content sharing on a sites groups platform (GCMS).

By using the Group Search Engine Optimization System and Process, Educational Institutions have a way of maintaining high ranking levels of search results by search engines and for the entire GCMS site (all CMS sites comprising the group). The benefit of this approach are: a) Easy to maintain Keywords across the GCMS, b) Flexibility on the Search Engine Optimization (SEO), as the SEO strategy can be divided at the GCMS level, sub-groups within the GCMS, and at each CMS level, and c) Better exposure of the Educational Institution's brand, as each Personal CMS site has a "Brand and Theme" from the Educational Institution in its Front-End Look and Feel Template, that will be displayed when someone is even searching for a person's attribute (e.g.:

name, profession, etc) in any search engine. For example, someone could be searching on Google for the person "Kelley Del Real", and the Personal CMS site from Kelley Del Real will appear as a search result, as one of the Keywords entered by Kelley Del Real in her Personal CMS site was the actual keyword "Kelley Del Real" (her name); the Personal CMS site from Kelley Del Real has a Look and Feel Template from the University where she is attending, thus the Keyword "Kelley Del Real" is advertising the University. The same applies for a Personal CMS site from a Professor and Staff, and the Project CMS site from a R&D Project. The same also applies to an Alumnus, but with some security access differences, as the Alumnus is not a full time entity engaged in the Educational Institution like a Student, Professor, Staff and R&D Project is. For example, lets assume the student Kelley Del Real is graduating from the University with a PHD in Medicine (e.g.: Neurology), so now, Dr. Kelley Del Real M.D. is graduating her Personal CMS site from the Educational Group (GCMS) and into the Alumni Group (GCMS), thus changing the security access to content and data files of the GCMS and changing the Front-End Look and Feel Template. The Keyword "Kelley Del Real" remains across her Personal CMS site (as attributes of some of the several Pages), and the new Front-End Look and Feel Template is no longer associated to the University (is a standard one) on the several Pages except on the Pages under the section controlled by the Menu Option "My School" (103200 on FIG. 25), which these Pages will continue using the Skins and Containers from the Look and Feel Template from the University. It is understood that a Personal CMS site has several Front-End Look and Feel Templates (each Template with several Skins and Containers), and each Page of the Personal CMS site can have it's own Skin from the several Skins in the several Templates, and each Module can use it's own Container from the several Containers in the several Templates. It is also understood now that the Group Search Engine Optimization System and Process will only have effect on the Pages under the section controlled by the Menu Option "My School" as is the only Front-End section of the Personal CMS site connected to the Educational Institution through the Alumni Group (GCMS). And it is also understood that any other Group Communication option controlled by the Educational Institution's GCMS will only have an effect on Kelley Del Real's Personal CMS site only on the Pages in the section under the Menu Option "My School".

Finally, it is also understood that if Dr. Kelley Del Real M.D. no longer wants to be involved with the University, she will not connect her Personal CMS site to the Alumni Group (GCMS) of the University, as a consequence, her Personal CMS site will be operating as Stand-Alone and the Community CMS sites controlling the GCMS sites of the University (Educational Group, Alumni Group or others), will not control any section of the Personal CMS site from Dr. Kelley Del Real M.D.

The Group Search Engine Optimization System and Process is configurable and fine-tuned during the Implementation Project of the present invention for the Educational Institution, following the Implementation Methodology described on FIG. 9 and section: GCMS System Implementation Methodology.

GCMS Group Communication: Access to Third-Party Systems Process

The Access to Third-Party Systems Process 8900 (FIG. 24/FLOW CHART 2i, 2j, 2k), is the process followed to implement and distribute the security access and content of the third-party systems within the Educational Group (GCMS) by including 8910 8920 8930 the security access and content links into the Community site (Community CMS) 19212 19211, and later broadcasting this security access and content links 8940 from the Community site (Community CMS) 19212 19211 to the Professional Sites (Personal CMS and Project CMS) 19213. The Access to Third-Party Systems System and Process is categorized as a social collaboration solution with cross site content sharing on a sites groups platform (GCMS).

The access to third-party systems process in this embodiment refers to: a) Online Classroom Systems; b) FrontOffice and BackOffice Systems; c) Cloud Computer Systems (web apps, virtual desktop and virtual apps, and web/cloud services). And for these three categories, the access to third-party systems content, refers to security access and content and data files associated to the third-party system. It is understood that the system supports any other user-defined category beyond the three described in this paragraph (a, b, and c).

By using the Access to Third Party Systems and Process, Educational Institutions have a way of obtaining Annual Funding from a Software as a Service Revenue Stream that can be generated when delivering Software Application Modules (Web Apps, Virtual Desktop, Virtual Apps, and Web/Cloud Services) to each users' Personal CMS sites and Project CMS sites, as the users will no longer buy these Software Applications and install them into their computers. The benefits of this approach for the Educational Institution are: a) Annual Funding generation from Software as a Service Revenue Streams; b) Cost reduction on software installation and maintenance, as the software is deliver to the users' Personal CMS sites instead of installing it in each computer (e.g.: Staff's personal computers in the campus offices, or personal computers in Labs); c) Easy and fast way to remove access to software applications from the Educational Institution once a user's Personal CMS site disconnects from the GCMS.

The benefits of this approach for the users are: a) No need to buy, install, maintain and upgrade software in a personal computer as it is delivered to the Personal CMS site; b) Cost saving on software as the software is bought only one time for the Personal CMS site that can be accessed from any device owned by the user (e.g.: Personal Computer at home, Laptop, Tablet, etc.); c) The user owns some of the licenses of the software delivered to his/her Personal CMS site, as a consequence, once his/her Personal CMS site disconnects from the GCMS from the Educational Institution (e.g.: Student graduating, employee resigning, etc.), the user can continue using his/her Personal CMS site in a stand-alone mode with all the software applications he/she has acquired a license for. For example, lets assume the student Kelley Del Real is accessing the Online Classroom System from the University. Such access will be done as there will be a Page under the Menu Option "My School", which will be controlled by the Community CMS site (FIG. 30) controlling the Educational Group (GCMS), in which the Page will hold a Module Web App, Virtual App and/or Web/Cloud Service to the Online Classroom System. The same approach applies to FrontOffice and BackOffice Systems from the University, delivered to Kelley Del Real's Personal CMS site Pages under the section controlled by the Menu Option "My School" (103200 on FIG. 25). A similar approach will be for Access to Cloud Computer Systems, but for those Modules related to Web Apps, Virtual Desktop, Virtual Apps and/or Web/Cloud services, where Kelley Del Real will purchase a license to use, and these Modules will be delivered to Pages under the section controlled by the exemplary Menu Option "GTYS" (103700 on FIG. 25), and controlled by a Community CMS site controlling a GCMS different from the Educational Institution and by a different company delivering these Cloud Computing Systems. It is understood that now, Dr. Kelley Del Real M.D. no longer associated with the University, will only lose those Software Applications she had access to through the section controlled by the Menu Option "My School" but she will continue to have access to the Software Applications where she has purchased a license and where these have been delivered to her Personal CMS site under the Menu Option "GTYS".

The Access to Third-Party Systems System and Process is configurable and fine-tuned during the Implementation Project of the present invention for the Educational Institution, following the Implementation Methodology described on FIG. 9 and section: GCMS System Implementation Methodology.

GCMS Group Communication: Educational Group Road Map and Graduation Manager

To properly implement the Educational Group Cloud Management System at any group, it is recommended to define the Educational Group Road Map 19241 and rules for the Graduation Manager 19242 described on FIG. 6 and to follow the Systems Implementation Methodology "Method-e" 9000 described on FIG. 9 and section: GCMS System Implementation Methodology.

The Educational Group Road Map 19241 (FIG. 6) will determine the amount of Educational Groups (GCMS) in the implementation and the road to be followed by the CMS sites (Community CMS sites, Personal CMS sites and Project CMS sites) traveling from Group (GCMS) to Group (GCMS). For example, at the end of the graduation, the Student Site (Personal CMS site) traveling from the Educational Group (GCMS) to the Alumni Group (GCMS).

The Graduation Manager 19242 (FIG. 6) will determine the changes to be made on the Professional Site (Personal CMS site) (Student, Alumnus, Professor [Teacher], Employee and/or Project Team) when changing from Group to Group or just exiting a Group or entering a Group. The changes are associated to two main categories: a) Front-End Look and Feel, b) Content and Data Files (within is included the proper security access to content and data files related to the group). It is understood that the content and data files also relates to content and data files associated with a module representing a web app, a virtual desktop/app or a web/cloud service.

GCMS Group Communication: Tech. View/Description of CMS to CMS Communication

The GCMS Group Communication is established by at least two CMS sites communicating. Referring to communication is as referring to content sharing, content transferring, content copying, etc. and referring to content is referring to content and data files in the form of at least one of a Text, a Video, a Audio, a Image, a Data, a File, a Menu, a Page and a Module, and when referring to Page and Module is as referring to a Page and/or a Module in the form of at least a Web App, a Virtual Desktop, a Virtual App, and a Web/Cloud Service.

The CMS sites (Community CMS sites, Personal CMS sites and Project CMS sites) shown in FIG. 1 (19211, 19212 and 19213), FIG. 3 ((*a*), (*b*) and (*c*)), FIG. 4 ((*a*), (*b*) and (*c*)), and FIG. 5, can be better understood by representing them in a Technical Block Design drawing as shown on FIG. 5.*a* and FIG. 5.*b*. These two figures show the different components of a CMS, and how each of these components can communicate with the components of another CMS.

A CMS site is mainly divided in five elements: 1) CMS File/Data, 2) CMS Front-End, 3) CMS Back-End, 4) CMS Group Connectivity and 5) CMS Client.

The CMS File/Data is comprised by the content and data files created and stored by the user, and by the content and data files related to modules representing software applications. The actual content is stored in a Database and the Data Files in a Folder/Sub-Folder directory structure. The Database is managed by a RDBMS or Relational Database Management System, and the Data Files in the Folder/Sub-Folder directory structure by a File System.

The CMS Front-End is comprised by the CMS Pages structure that is navigated using the Menu Options. Some of the Pages are Public Pages and others are Private Pages (login required into the CMS site). Within the Private Pages, some are accessible based on a user-defined User Role, and others are only available to the User Administrator of the CMS site. The CMS Front-End is accessible via an Internet Browser device. The CMS Front-End access the content and data files in the CMS File/Data section of the CMS site and the CMS Back-End.

The CMS Client is similar to the CMS Front-End as to a CMS Page structure, but such Page structure resides in the end-point device as an App. For example, an App for the iPhone, iPad, Droid, etc. The CMS Client access the content and data files in the CMS File/Data section and CMS Back-End section of the CMS site.

The CMS Back-End is comprised by three main elements, a Receiver of virtual applications, and the virtual applications that can be divided in Cloud Desktop and Cloud Applications. The Cloud Desktop and Cloud Applications are for example the Operating System (e.g.: Windows, Linux, etc.) and Applications (e.g.: MS Word, MS Excel, etc.). The Cloud Desktop and Cloud Applications access the content and data files from the CMS File/Data section of the CMS site.

Within the CMS site, each of the components of the CMS site are communicating as follows: 1) CMS Front-End communicates with CMS Files/Data, 2) CMS Front-End communicates with CMS Back-End, 3) CMS Back-End communicates with CMS Files/Data, 4) CMS Client communicates with CMS File/Data, 5) CMS Client communicates with CMS Back-End, 6) Communication within the CMS Files/Data, 7) Communication within the CMS Back-End, 8) Communication within the CMS Client, 9) Communication within the CMS Front-End. See CMS Communication on FIG. 5.*a* and FIG. 5.*b*. See also exemplary screen shots of a user accessing to the several components of the CMS site (e.g.: Personal CMS site) on FIG. 25, FIG. 25*a*, FIG. 26, FIG. 27, FIG. 28, FIG. 29 and FIG. 29*a*.

The CMS Group Connectivity is comprised by content and data files providing the CMS site with the capability of connecting to at least one other CMS site creating the GCMS (19200 on FIG. 5.*a* and FIG. 1).

A CMS site can communicate with another CMS site as follows: 1) at the CMS Files/Data Level: 1.a) at the Database Level, 1.b) at the Folder/Sub-Folder Level; 2) at the CMS Back-End Level: 2.a) at Cloud Desktop Level, 2.b) at Cloud Apps Level, 2.c) at Receiver Level; 3) at the CMS Front-End Level: 3.a) at Menu Options Level, 3.b) at Page Level, 3.c) at Module Level, 3.d) at Skin/Container Level. See GCMS Group Communication on FIG. 5.*a*.

GCMS Security and Accessibility Management Functions

The Administrator of the GCMS is allowed to create Users and User Roles across the entire GCMS site (19255 on FIG. 1) comprised by the Users and User Roles in all CMS sites in the group (Community CMS sites, Personal CMS sites and/or Project CMS sites). The generation process of a CMS site (e.g.: Personal CMS site), includes the creation of a new set of security system (19255 on FIG. 1), comprised by Users and User Roles, for the recently created CMS site.

The establishment of the GCMS is possible by correlating through the security system (19255 and 19240 on FIG. 1), a non administrator user in the Community CMS site (controlling the GCMS), with the Administrator user of the actual CMS site in the GCMS (e.g.: the Administrator user of the Personal CMS site, Project CMS site or another Community CMS site). It is understood that the non administrator user in the Community CMS site (controlling the GCMS) associated with the Administrator user of a CMS site in the GCMS, is associated with a role in the Community CMS site, related to a CMS (e.g.: Role=Personal CMS site Subscriber).

Another level of security in the GCMS is the possibility to encrypt the internet communication between the user browser device and the hosting servers when the users access each individual CMS site. The encryption is possible by the different SSL Certificates of Encryption available in the market. The Encryption Certificate Activation (19256 on FIG. 1) allows all CMS sites (Community CMS, Personal CMS sites and Project CMS sites) to be accessed through a SSL Certificate of Encryption. This can be done by using one SSL Certificate of Encryption at the GCMS level, and/or each CMS having its own SSL Certificate of Encryption and associated to at least one user-defined domain name assigned to the CMS site. It is understood that a CMS site can be access securely by several SSL Certificates of Encryption, as each Certificate can be associated to each of the user-defined domain names assigned to the CMS site.

Another level of security in the GCMS is the possibility to customize the integration of a CMS site to third-party applications (19253 on FIG. 1) by encrypting a user and password and respective connection string as part of the settings of the CMS site (Community CMS sites, Personal CMS sites and Project CMS sites).

The system delivers to the user, services through the CMS sites in the GCMS. The user has to subscribe to a CMS site (e.g.: Personal CMS site) to be able to receive these services. The subscription of a CMS site is tied to a payment processing (19257 on FIG. 1) system and method which addresses the consumption need from the user. The consumption by the user includes but is not limited to: subscription of the CMS site, content consumption, and applications and services consumption (web apps, virtual desktop/apps, web/cloud services, elastic storage, etc.).

The system delivers to the user, access to CMS sites (Community CMS sites, Personal CMS sites and Project CMS sites) in the GCMS, through URL Addresses, that are automatically generated (19254 on FIG. 1) as sub-domain names from the main domain name where the GCMS is located, at the time the CMS site is created (e.g.: Personal CMS site). The user has the ability later on to associate unlimited independent Domain Names to his/her CMS site.

The system delivers communication to the user though the CMS site (e.g.: Personal CMS sites) and extends that communication through the delivery of such to the user's e-mail device and text messaging device, based on at least one e-mail account and one text message account (cell phone number) on file. The administration of the communication to the user's e-mail device and text messaging device is done through the mail manager system (19251 on FIG. 1).

The GCMS allows the administrator to schedule tasks related to administration and communication within the group of CMS sites. These tasks can be schedule with the tasks scheduler system (19252 on FIG. 1), and include but are not limited to: broadcast content schedules, notification schedules, back-up schedules, searches schedules, etc.

The GCMS security system as to the User and User Roles, allows an educational institution to define granular security in the entire GCMS deployment. For example, a GCMS for a State University System comprised by five Universities, will result in an implementation of a Community CMS site at the System Office level controlling a group of five Community CMS sites (one for each University). Each of these 6 Community CMS sites have their own and independent security system (user and user roles), with the difference that the controlling Community CMS site security system, will allow some user security of it's children CMS sites to be granted to it's users. In addition, each CMS site connected to a University CMS site (e.g.: Personal CMS site and Project CMS site) will have also their own security system independent from the security system from the rest of the CMS sites (e.g.: Community CMS site, Personal CMS sites and Project CMS sites. So as for this example, there will be three levels of security systems (user and user roles): $1^{st}$ Level or the System Level, 2) $2^{nd}$ Level or the University/Campus Level, and $3^{rd}$ Level or the Personal Level. And the CMS sites in each level, with their own security system.

GCMS Personalization and Customization

Due to the GCMS capabilities of Mufti-Tier Levels of Parent/Child relationships, Mufti-Level and Granular Security System, and the Multi-Level of CMS Templates and Front-End Look and Feel Templates, the system and method of the present invention can provide the maximum level of GCMS Personalization and Customization that can be designed. Each CMS site in the GCMS can be independently personalized and customized from each other in the GCMS, in the following areas: 1) Levels of Mufti-Tier Parent/Child relationships, 2) Security, 3) CMS Template and 4) Front-End Look and Feel Template, 5) CMS Components: 5.a) CMS Front-End, 5.b) CMS Back-End, 5.c) CMS Files/Data, 5.d) CMS Client, 5.e) CMS Communication.

The GCMS Personalization and Customization also extends to the design of the Ecosystem to be deployed in the GCMS and the different Revenue Streams and Cost Elimination Streams that can be design and implemented in the Ecosystem, with the purpose of Annual Funding Generation. Such Personalization and Customization for the Ecosystem and Annual Funding Generation is designed and implemented at the Community CMS sites that are acting as controlling CMS sites of a GCMS or sub-groups (sub-GCMS). The GCMS Personalization and Customization including the design and implementation of the Ecosystem for Annual Funding Generation, will also depend on the type of deployment selected (see section: GCMS/CMS—Open Cloud Environment, GCMS/CMS—Private Cloud Environment and GCMS/CMS—Hybrid Cloud Environment), so it is recommended to follow the suggested implementation methodology on FIG. 9 (see section GCMS System Implementation Methodology).

GCMS Software and Hardware Platform Infrastructure

The GCMS is normally deployed on a datacenter with at least one hosting server computer, and the GCMS is accessible by the user through User Access Devices that are normally residing outside of the datacenter, and connected to the datacenter through a network or world wide web network or internet (or Intranet, LANs, WANs, or other network or some combination thereof).

The Hardware System Architecture described on FIG. 2, shows an example of the different server components for the deployment of the GCMS. At least one server is required to deploy all software needed for the GCMS, but the user load and traffic of transactions will drastically impact the performance that can be delivered through one server machine. This is the reason why the different types of software for the GCMS platform to operate, can be deployed in more than one server computer that can generally be organized as but not limited to: Load Balancers, Web Servers, Application Servers and Data Base Servers.

The Hardware System Architecture described on FIG. 2, shows an example of the different user access devices to access the GCMS. At least one user access device is needed to fulfill the function of the Internet-Browser Device to access a CMS site (Community CMS site, Personal CMS site or Project CMS site). For example, the Internet-Browser Device could have the size of a Plasma TV, Computer Monitor, Car Display Dashboard and/or Mobile Phone Size Display. Because of the different sizes on the Internet-Browser Devices, the Front-End of the CMS site, includes a framework for Skins and Containers that will adjust automatically from one Internet-Browser Device to another, so the user can access the CMS site (e.g.: Personal CMS site) seamlessly from any device.

In addition, the E-mail Device and Text Messaging Device could be a hardware device that also includes the Internet-Browser device, or just a device for E-mail and/or Text Messages.

The Software System Architecture described on FIG. 1, shows an example of the different server software components for the deployment of the GCMS that could be grouped as, but not limited to: Operating System (13000 on FIG. 1), Web Server Hosting (IIS, Apache, Firewall, Spam Control, Virus Detection, etc.) (14000 on FIG. 1), ASP.NET Web Application Framework (15000 on FIG. 1), Visual Studio .NET (16000 on FIG. 1), Application Software (MS Office, Word, Excel, Outlook, Acrobat, etc.) (17000 on FIG. 1), Client-Server Topology (File System and RDBMS software) (18000 on FIG. 1).

The Software System Architecture described on FIG. 1, shows an example of the different client software components to access the GCMS that could be grouped as, but not limited to: Internet Browser (11100 on FIG. 1), e-mail device (11200 on FIG. 1), text messaging device (11300 on FIG. 1).

CMS Functionality: CMS Site Common Features

The CMS site (e.g.: Community CMS sites, Personal CMS sites and Project CMS sites) include the following common features that are listed on FIG. 4 under Additional Features for Community CMS, Personal CMS and Project CMS:

The Control Panel function for cloud management and administration in the cloud management system sites (see Control Panel 111000 for the Personal CMS site on FIG. 26), includes functions for: a) Setting the operational Mode (111100 on FIG. 26) of the cloud management system site, including at least a View mode, Edit mode and Design mode; b) Administering Pages (111200 on FIG. 26) in the cloud management system site including at least Adding pages, managing Settings of a page, Deleting, Copying, Exporting and Importing a pages; c) Managing Modules (111300 on FIG. 26) into a Page of the cloud management system site, within including at least Adding New Modules into a Page, Adding Existing Modules already included in a Page, into a New Page where are Pages will share the Module and its content, and Install Additional Modules into the cloud management system site, where later can be added into Pages; d) Managing Common Tasks (111400 on FIG. 26) in the cloud management system site, within including at least Site administration, Users administration, Roles administration, Files administration, Help access and Solution Explorer access.

The Front-End Environment of the cloud management system site is divided in Pages (132000 on FIG. 28), accessible by Menu Options (103000 on FIG. 25) or URL Links, and each Page subsequently divided in Panes (132100, 132200, 132300, 132300, 132400, 132500, 132600 on FIG. 28) capable of storing Modules (131100 on FIG. 28 also 102000, 104000, 105000, 105000, 106000, 108000, 109000 on FIG. 25) containing web apps, virtual desktop/apps or web/cloud services, with a look and feel predefined by a Look and Feel Templates containing Page/Pane Layouts and Designs called Skins, and Module Frame Layouts and Designs called Containers, further comprising means for replacing the existing look and feel of the Front-End Environment of the cloud management system site with a new predefined look and feel provided by a new Look and Feel Template from an Inventory of Look and Feel Templates available in the system, without altering the user content and data files related to the user of the system or respective functionality provided by a module.

The User-Defined Menu Options and Pages, provide the capability for unlimited personalized growth for the cloud management system sites and, in the form of menus, pages, modules representing web apps, virtual desktops/apps, web/cloud services and other user-defined modules.

The Module Management (131100 on FIG. 28), provides already modules in the CMS site ready to be included on a given Page. These modules are: a) The Blog module, wherein allowing the users to set up the module and blog and store such blog content with the module; b) The Forum module, wherein allowing users to set up the module and enter into forums of discussion and store such discussions with the module; c) The Announcements module, wherein allowing the user to set up the module and store and communicate announcements with the module; d) The Latest News module, wherein allowing the user to set up the module and store and communicate latest news with the module; e) The Banners module, wherein allowing the user to set up the module and store and display banners with the module; f) The Slide Show module, wherein allowing the user to set up the module and store and show presentation slides with the module; g) The eCommerce module, wherein allowing the user to set up the module and store and process e-commerce transactions with the module; h) The Audio file player module, wherein allowing the user to set up the module and listen to audio files with the module; i) The Video file player module, wherein allowing the user to set up the module and watch video files with the module; j) The Events module, wherein allowing the user to set up the module and plan and store events information on a calendar with the module; h) The FAQs—Frequently Asked Questions module, wherein allowing the user to set up the module and store and answer to frequently asked questions with the module; i) The Feed Explorer module, wherein allowing the user to set up the module and select with the module, additional modules available in the system, wherein these additional modules are in the form of web apps, virtual desktop/apps, web/cloud services and other user-defined modules; j) The Form Master module, wherein allowing the user to set up the module and create custom forms with the module to capture data; k) The Google Addsense module, wherein allowing the user to set up the module and display advertisement with the module from the Google Adds service; l) The generation of revenue stream from a third party advertisement system; m) The Help module, wherein allowing the user to set up the module and create, store and display custom Help content with the module; n) The Links module, wherein allowing the user to set up the module and create and store links with the module to other URL addresses, sites, pages, files and other common hyperlink support; o) The Marketshare module, wherein allowing the user to set up the module and create market-share from the marketplace; p) The generating a revenue stream from the sales of modules, wherein the modules are in the form of web apps, virtual desktop/apps, web/cloud services and other user-defined modules, q) The Media module, wherein allowing the user to set up the module and render media content with the module, from a relative or absolute URL, Page or Media File; r) The News Feeds (RSS) module, wherein allowing the user to set up the module and render news feeds content with the module from other sites via really simple syndication; s) The Reports module, wherein allowing the user to set up the module and generate simple user-defined query reports with the module to retrieve data stored by users in the cloud management system site; t) The Repository module, wherein allowing the user to set up the module and upload and store with the module, files and their attributes into the cloud management system site, to later on, be able to track statistical activity related to those files, and to be presented in a customized Repository Dashboard; u) The Search input/results module, wherein allowing the user to set up the module and search, with the module, content in the cloud management system site, and the results to be presented in a search results report; v) The Survey module, wherein allowing the user to set up the module and conduct surveys and store surveys' results with the module, to later on, be able to review the results of the survey in a bar chart including the number of responses; w) The TXT/HTML module, wherein allowing the user to set up the module and store text or html content with the module; x) The XML/XSL module, wherein allowing the user to set up the module and store xml or xsl content with the module; y) The User Defined Tables module, wherein allowing the user to set up the module and create and store a custom table on a page with content to be displayed with the module, such content activity will be tracked by user, column and row of the table; z) The Users Online module, wherein allowing the user to set up the module and track with the module, membership registration and visitors to the cloud management system site and to the group cloud management system; aa) The Wiki module, wherein allowing the user to set up the module and capture and store Page ratings and Page comments with the module; ab) The Feedback Email Communication module, wherein allowing the user to set up the module and store text or html content with the module; ac) The User Registration Forms module, wherein allowing the user to set up the module and receive communication in the form of written text, which such communication content will be stored in the cloud management system site and such communication will be notified to the user with an e-mail sent by the cloud management system site to the user's e-mail address on file; ad) The Data Capture Forms module, wherein allowing the user to set up the module and capture and store data in a user-defined form with the module; ae) The IFrame module, wherein allowing the user to set up the module and create a frame to access and receive content from web apps, virtual desktop/apps and other web/cloud services directly in the module acting as a receiver; af) The Map module, wherein allowing the user to set up the module and display in a geographical map a stored unit-street-city-state-country address; ag) The User-Defined Module, wherein providing the capability for unlimited personalized modular growth for the cloud management system sites, where the module is associated with a web app, virtual desktop/app, web/cloud services and other user-defined module.

The Administration of a CMS site, includes: a) The management of the cloud management system site setting, pages, users and user roles; b) The management of vendors for banners; c) The management, storage and reporting the activity-log of the CMS site; d) The management and sending newsletters in the form of bulk e-mail the cloud management system site registered users; e) The management of files (FIG. 29 and FIG. 29a) in the cloud management system site, within providing the user the capability of storing at least text files, graphic files, audio files, video files, image files, in user-defined folders and sub-folders; f) deletion of pages and modules in the cloud management system site, within providing a temporary deletion of same into the recycling bin, from which it can be restored back to its original location in the cloud management system site or permanently be deleted from the cloud management system site; g) The viewing of log entries to events in the cloud management system site; h) The management of Look and Feel Templates, also known as skins and containers, in the cloud management system site; i) The management of language-sets in the cloud management system site; j) The management the configuration of the cloud management system site through the help of a user-friendly wizard; k) the management of user authentication settings in the cloud management system site, within managing authentication settings for at least one user-defined third party site; l) The management of the review and selection of solutions for the cloud management system site that are available in the marketplace, wherein the solutions include Look and Feel Templates, also known as Skin and Containers, and modules for web apps, virtual desktop/apps, web/cloud services and other related modules; m) The managing the communication of a summary of major features in a What's New Page for each upgrade release of the cloud management system site; n) The management of user-defined administration function for the cloud management system site; o) The management of system wide settings from the cloud management system site, wherein the system wide settings are performed by the user administrator of the group cloud management system; p) The management of cloud management system sites within the system from the cloud management system site, wherein the management of cloud management system sites within the system is performed by a user administrator of the group cloud management system and includes adding a new cloud management system site, exporting the content of a cloud management system site into a template that can later be used to generate a new cloud management system sire from the template, deleting a cloud management system site, and editing the site settings of at least one cloud management system site; q) The management of system wide modules for web apps, virtual desktop/apps, web/cloud services and other related modules from the cloud management system site, wherein the system wide management of the module is done by the user administrator of the group cloud management system and includes installing new modules in the group cloud management system, creating new module definitions for the group cloud management system and importing new module definitions into the group cloud management system and making them available for the cloud management system sites; r) The management of system wide files from the cloud management system site, within providing the user administrator of the group cloud management system with the capability of storing at least text files, graphic files, audio files, video files and image files, in user-defined folders and sub-folders at the group system level or group cloud management system; s) The management of system wide execution of SQL Scripts from the cloud management system and by the user administrator of the group cloud management system and install and manage such scripts as Dashboard Controls into the System Wide Dashboard; t) The management of system wide schedule tasks from the cloud management system site and by the user administrator of the group cloud management system; u) The management of system wide search settings from the cloud management system site and by the user administrator of the group cloud management system; v) The management of system wide data lists from the cloud management system site and by the user administrator of the group cloud management system; w) The managing of system wide user administrator accounts from the cloud management system site and by the user administrator of the group cloud management system; x) The management of system wide Look and Feel Templates, also know as skins and containers, from the cloud management system site and by the user administrator of the group cloud management system; y) The management of group communication, wherein the group communication is among the cloud management system site and at least another cloud management system site; z) The management of cloud computer associated with the cloud management system site, wherein are modules representing web apps, virtual desktops, virtual apps and web/cloud services.

CMS Functionality: Community CMS Site Features

The Community CMS site (FIG. 30) include all features described for the CMS site (see section: CMS Site Common Features), but specifically from the Community CMS Template, includes the following features (see FIG. 4):

The Community CMS sites for the Faculty, Staff, Project Teams, Students and Alumnus, allows users to communicate through Community Discussion Forums, within providing the means for administration and access, including in these, the ability to perform it from their respective Personal CMS sites and Project CMS sites by having the community discussion forums on a shared module or group module among the Community CMS sites, Personal CMS sites and Project CMS sites in the GCMS.

The Community CMS sites for the Faculty, Staff, Project Teams, Students and Alumnus, allows users to communicate through Community Blogs, within providing the means for administration and access, including in these, the ability to perform it from their respective Personal CMS sites and Project CMS sites by having the community blogs on a shared module or group module among the Community CMS sites, Personal CMS sites and Project CMS sites in the GCMS.

The Community CMS sites for the Faculty, Staff, Project Teams, Students and Alumnus, allows users to engage in e-commerce transactions in the Community Marketplace, within providing the means for administration and the access, including in these, the ability to perform it from their respective Personal CMS sites and Project CMS sites by having the community marketplace on a shared module among the Community CMS sites, Personal CMS sites and Project CMS sites in the GCMS.

The Community CMS sites for the Faculty, Staff, Project Teams, Students and Alumnus, allows users to receive system support from the Community Support, within providing the means for administration and access, including in these, the ability to perform it from their respective Personal CMS sites and Project CMS sites by having the community support on a shared module among the Community CMS sites, Personal CMS sites and Project CMS sites in the GCMS.

The Community CMS sites for the Faculty, Staff, Project Teams, Students and Alumnus, allows users to receive access to the Community Video-Training, within providing the means for administration and access, including in these, the ability to perform it from their respective Personal CMS sites and Project CMS sites by having the community video training on a shared module among the Community CMS sites, Personal CMS sites and Project CMS sites in the GCMS.

The Community CMS sites for the Faculty, Staff, Project Teams, Students and Alumnus, allows users to register in the system to use the Community CMS sites and/or subscribe to Personal CMS sites and Project CMS sites in the GCMS.

The Community CMS sites for the Faculty, Staff, Project Teams, Students and Alumnus, allows users to pay for the service to use the Community CMS sites and/or subscribe to Personal CMS sites and Project CMS sites in the GCMS.

The Community CMS sites for the Faculty, Staff, Project Teams, Students and Alumnus, allows the administrator user to include User-Defined functions of the system through modules for web apps, virtual desktop/apps and web/cloud services, within providing the means for administration and access, including in these, the ability to perform them from their respective Personal CMS sites and Project CMS sites in the GCMS.

The Community CMS sites for the Faculty, Staff, Project Teams, Students and Alumnus, provides the user with the ability to manage the administration of and communication within the group cloud management system, further comprising but not limited to: a) The management of messaging board content, within generating messaging board content to be broadcasted to the Personal CMS sites and Project CMS sites; b) The management of notifications content, within generating notifications content to be broadcasted to the Personal CMS sites and Project CMS sites; c) The management and exchange of documents available for the entire GCMS, within the means for the user to access these documents from their respective Personal CMS site and Project CMS sites; d) The management of advertisement content, within the means for electronic payment for advertisement services and broadcasting advertisement content to the Personal CMS sites and Project CMS sites; e) The management of updated content and data files, within generating updated content and data files to be broadcasted to the Personal CMS sites and Project CMS sites; f) The management of group content search, within generating search for content across all Community CMS sites, Personal CMS sites and Project CMS sites in the GCMS; g) The management of inappropriate content, within generating search for inappropriate content across all Community CMS sites, personal CMS sites and Project CMS sites in the GCMS; h) The management of group search engine optimization, within generating keyword-content to be broadcasted to the Community CMS sites, Personal CMS sites and Project CMS sites in the GCMS; i) The management of Access to Online Classroom Systems, within generating access content to Online Classroom Systems to be broadcasted to the Personal CMS sites and Project CMS sites in the GCMS; j) The management of Access to FrontOffice/BackOffice Systems, within generating access content to FrontOffice and BackOffice Systems to be broadcasted to the Personal CMS sites and Project CMS sites in the GCMS; k) The management of Access to Cloud Computer Systems (web apps, virtual desktop, virtual apps and cloud services), within generating access content to Cloud Computer Systems to be broadcasted to the Personal CMS sites and Project CMS sites in the GCMS.

The Community CMS sites for the Faculty, Staff, Project Teams, Students and Alumnus, provides the generation of the group cloud management system, further comprising: a) The process of enrolling users in the Community CMS sites, wherein the users are associated with a role defined in the Community CMS sites; b) The process for generating Personal CMS sites and Project CMS sites based on user attributes captured when enrolling users in the Community CMS sites, within the means for selecting the appropriate Personal CMS and Project CMS Template, and respective electronic subscription payment associated with the user role in the Community CMS sites, wherein these users become subscribers of Personal CMS sites and Project CMS sites which they will manage and control and where these subscriber users will manage and control the users and user roles in their respective Personal CMS sites and Project CMS sites.

The Community CMS site provides to the generation of reports related to the group cloud management system, further comprising: a) The generation of reports with all user accounts including users subscribers and a link to their respective cloud management system sites (Personal CMS sites and/or Project CMS sites), wherein the user accounts and cloud management system sites are associated with a user role of the Community CMS site from which they are connected to.

The Social Networking module, that normally will be installed only on a CMS site functioning as a Community CMS site (FIG. 30), includes the functions of managing User Events, User Profiles, User Groups, User Wall, User Referrals and User Defined Features, allowing the customization and addition of functionality growth of the Social Networking module. The Social Networking Module, includes the function of accessing the Social Networking module in the cloud management system site (Community CMS site), from at least one other cloud management system site (Personal CMS site).

CMS Functionality: Personal CMS Site Features

The Personal CMS site include all features described for the CMS site (see section: CMS Site Common Features), but specifically from the Personal CMS Template, includes the following features (see FIG. 4):

The Personal CMS site includes a Look and Feel Template for the Front-End of the Personal CMS site, that will adjust to any size Internet-Browser device (see FIG. 25, FIG. 25*a*, FIG. 26, FIG. 27, FIG. 28, FIG. 29, FIG. 29*a*), among these but not limited to a Plasma TV size, Computer Monitor size, Tablet size, Car Dashboard Display size and Phone size, allowing the user to access his/her Personal CMS site from any device.

The Personal CMS site includes for the Administrator or Subscriber, profile information related to his/her e-mail address and text messaging address (e.g.: Cell Phone Number), allowing the Personal CMS site (accessed with an Internet-Browser) to be connected to an e-mail application and device and a text messaging application and device (FIG. 4, FIG. 5, FIG. 8). This feature allows the user to receive information via e-mail and text message, from his/her Personal CMS site and/or from the GCMS where hie/her Personal CMS site is connected to.

The Personal CMS site includes a set of predefined content and data files associated to a) Professional Resume; b) Professional Research; c) Professional Initiatives; d) Professional Discovery; e) Personal Blog Module; f) Personal Discussion Forums Module; g) Family Section; h) Hobbies Section; i) Contact Information; j) User Registration; k) user-defined section.

The Personal CMS site can belong, at the same time, to more than one group of CMS sites, the groups being Group Cloud Management System sites (GCMS sites).

The Personal CMS site (CMS site created from a Personal CMS Template), can include within other CMS Templates that can be later on added through the Import Manager (19231 on FIG. 1). For example, FIG. 6 shows in the Educational Group—H.Ed (GCMS for Higher Education), the Student Cloud (SC), also known as a Personal Cloud. So the Personal CMS site now cloud includes two CMS Templates. For example, a student pursuing a masters degree, can have the template of the Personal CMS Template for Student in a Masters Degree from Educational Institution A, and at the same time, the template of a Personal CMS Template related to an Alumnus from the Educational Institution where he/she obtained the bachelor degree. It is understood that in this example, the Personal CMS site is connected to two Educational Institutions, and both of them using a specific Personal CMS Template: One because the Personal CMS has connected as an Alumnus to one GCMS site, and the other because the Personal CMS has connected as a Student to one other GCMS site.

CMS Functionality: Project CMS Site Features

The Project CMS site include all features described for the CMS site (see section: CMS Site Common Features), but specifically from the Project CMS Template, includes the following features (FIG. 4):

The Project CMS site includes a Look and Feel Template for the Front-End of the Project CMS site, that will adjust to any size Internet-Browser device, among these but not limited to a Plasma TV size, Computer Monitor size, Tablet size, Car Dashboard Display size and Phone size, allowing the user to access his/her Project CMS site from any device.

The Project CMS site includes for the Administrator or Subscriber, profile information related to his/her e-mail address and text messaging address (e.g.: Cell Phone Number), allowing the Project CMS site (accessed with an Internet-Browser) to be connected to an e-mail application and device and a text messaging application and device (FIG. 4, FIG. 5, FIG. 8). This feature allows the user to receive information via e-mail and text message, from his/her Project CMS site and/or from the GCMS where his/her Project CMS site is connected to.

The Project CMS site includes a set of predefined content and data files associated to a) Project Resume/Project Team; b) Project Research; c) Project Initiatives; d) Project Discovery; e) Project Blog Module; f) Project Discussion Forums Module; g) Contact Information; h) User Registration; i) user-defined section.

The Project CMS site can belong, at the same time, to more than one group of CMS sites, the groups being Group Cloud Management System sites (GCMS sites).

The Project CMS site (CMS site created from a Project CMS Template), can include within other CMS Templates that can be later on added through the Import Manager (19231 on FIG. 1). For example, FIG. 6 shows in the Educational Group—H.Ed (GCMS for Higher Education), the Project Cloud (PC), also known as a Project Cloud. So the Project CMS site now cloud includes two CMS Templates. For example, an R&D Project, can have the template of the Project CMS Template for Educational Institution A, and at the same time, the template of a Project CMS Template related to Educational Institution B, as these two Educational Institutions could be participating in a Co-R&D Projects. It is understood that in this example, the Project CMS site is connected to two Educational Institutions, and both of them using a specific Project CMS Template from each Educational Institution: One because the Project CMS has connected to the GCMS site of Educational Institution A, and the other because the Project CMS has connected at the same time to the GCMS site from Educational Institution B.

GCMS/CMS—Open Cloud Environment

The present invention might be used as an Open Cloud Environment platform where anyone can subscribe to a Group Cloud Management System (GCMS) as a GCMS Subscriber/Operator and/or to a Cloud Management System (CMS) as a CMS Subscriber/Operator. The GCMS Subscriber/Operator will manage the Community CMS for Faculty, Staff, Project Teams, Students and Alumnus by enrolling the Educational Institution into a GCMS configuration deployment (multiple GCMS sites within a main GCMS) and providing these user with a subscription to a Personal CMS site and/or a Project CMS site. An example of an Open Cloud Environment is located on www.GoToYourSite.com, so by entering this public available website, the Educational Institution can deploy a GCMS configuration and enroll Faculty, Staff, Project Teams, Students and Alumnus into the corresponding Community CMS sites within the GCMS, and allow these users to subscribe to and operate their own Personal CMS sites and/or a Project CMS sites within the GCMS configuration.

GCMS/CMS—Private Cloud Environment

The present invention might be used as a Private Cloud Environment platform where the invention is deployed on site for the Subscriber/Operator of the GCMS deployment, now acting as the GCMS Hoster. In this configuration, there will be only one Hoster managing the environment (e.g.: the Educational Institution). Typically in this configuration, there will be only one Hosted GCMS Servers Environment, wherein, multiple GCMS sites per Educational Groups deployed in the environment, and the content broadcasted to the Personal CMS sites and Project CMS sites, will be very restricted to what the Hoster (Educational Institution), wants to offer.

GCMS/CMS—Hybrid Cloud Environment

The present invention might be used as a Hybrid Cloud Environment platform where the invention is deployed on site (Private Cloud Environment) for a Subscriber/Operator acting as a GCMS Hoster (e.g.: Educational Institution), but connected to another of the present invention deployed publicly (Open Cloud Environment) like the one located at www.GoToYourSite.com. In this configuration, content and data files from one GCMS Hosted environment (e.g.: Open Cloud Environment from www.GoToYourSite.com) can be broadcasted to the CMS sites (e.g.: Personal CMS sites) located in the other GCMS Hosted environment (e.g.: Private Cloud Environment from the Educational Institution), thus expanding the broadcasted content and data files offering to the user in his/her Personal CMS sites. Such content and data files including but not limited to content and data files associated with modules representing web apps, virtual desktops, virtual apps and web/cloud services.

GCMS/CMS—Retail Software Application

The present invention might be used as a Retail Software Application, to be sold to a third party entities interested in deploying an Open Cloud Environment, a Private Cloud Environment, and/or a Hybrid Cloud Environment. In this configuration, the present invention can be offered as a downloadable Software Application from a public website, or as a Software Application saved on a CD or DVD disk as a retail software product.

GCMS System Implementation Methodology

The Systems Implementation Methodology 9000 (FIG. 9) comprises 4 phases: a Phase 1—Strategy and Planning 9100, a Phase 2—Design and Simulation 9200, a Phase 3—Implementation 9300 and a Phase 4—Production Cutover 9400.

GCMS System Implementation Methodology: Phase 1—Strategy and Planning

The first phase is called Strategy and Planning 9100, this phase is executed to define the project, review the actual systems architecture, install the new systems architecture and create and train the project team. This phase includes a series of stages, segments and tasks that can be summarized as follows:

Project Definition: Conduct Project Planning workshop with the Educational Institution to determine project objectives, scope, potential risks and to define the roles and responsibilities of the project team. The deliverable from this task will be a detailed project implementation work plan and a consulting engagement letter.

System Architecture Review: Review and document hardware, OS, RDBMS, and network configuration, user and transaction volumes, and database sizing requirements. Identify potential application performance issues based on field experience.

Install System Architecture: Create test, development and production databases, and install database and client application software. Execute initial user acceptance testing.

Project Team Orientation and Training: Deliver appropriate application, tools, and technical training to all project team members and familiarize them with their role on the project, key milestones and deliverables, and potential risk areas.

QA Review and Management Approval: Perform overall resource, task, and schedule management, including preparation of regular status reports. Conduct quality assurance reviews by Practice Managers to provide objective oversight upon completion of key milestones.

GCMS System Implementation Methodology: Phase 2—Design & Simulation

The second phase is called Design and Simulation 9200, this phase is executed to create a preliminary design of the business systems solution, and to run this preliminary design through a conference room pilot where the design can be preconfigured and tested with real transactions flowing in the new system. This phase includes a series of stages, segments and tasks that can be summarized as follows:

Preliminary Design: Identify and document all key business practices currently utilized by the Educational Institution. Discern key aspects of the business that directly affect the training and implementation of the new system. Discover key business practices to help the project team anticipate business needs. Identify system requirements for each application. Document overall information flow, reporting, data input, interface, and data conversion requirements.

Conference Room Pilot: Based on Preliminary Design, configure and test a 'model' GCMS (Community CMS site, Personal CMS site and Project CMS site) using a sampling of typical transactions for the Educational Institution. Analyze results to determine fit and likely modifications. This confirmation is often used as a key tool to obtain user acceptance of the new system. Identify and document all changes and enhancements to the standard system, including screen modifications (e.g.: Front-End Design and Look and Feel Templates), customized reporting requirements, user and user roles security, GCMS Group Communication, system interfaces and data conversions, etc.

GCMS System Implementation Methodology: Phase 3—Implementation

The third phase is called Implementation 9300, this phase is executed to prepare for the implementation, prepare the production environment, prepare user procedures and train the users and finally, conduct a systems and integration test. This phase includes a series of stages, segments and tasks that can be summarized as follows:

Implementation Preparation: Configure all system parameters and tables with Educational Institution's unique values. This tailors the system to the Educational Institution's requirements. Develop all customized characteristics according to the specifications documented during Conference Room Pilot, including screens, reports, data conversions, and interfaces. Thoroughly test and document these objects during this task.

Prepare Production Environment: Establish the actual production databases, and transfer live data to this environment. Apply any necessary modifications and establish live user security. Validate the entire system configuration as a final task, pending management approval, before going live on the new system.

User Procedures and Training: Document user and system administration procedures at the level of detail and format that is desired. Assemble procedure based end-user training materials to perform user training.

System and Integration Testing: Thoroughly test the entire system to ensure the results of processing are as expected, including integration testing of conversions and interfaces. Perform stress or volume testing to ensure that performance issues do not exist.

GCMS System Implementation Methodology: Phase 4—Production Cutover

The forth phase is called Production Cutover 9400, this phase is executed to migrate the data into the new production environment and start operating the new system in production mode. This phase also assist the users with their operations in production and identify and plan additional requirements. This phase includes a series of stages, segments and tasks that can be summarized as follows:

System Migration: Perform the migration to the new Production Environment. All transactions are now processed in the new system resulted from the design created by the project team.

Production Assistance: The project team is available to support the users during the first weeks of production operation to document, prioritize and resolve issues. Fine-tune the system to improve performance and provide initial maintenance of any minor issues previously deferred. Review the implementation and usage of the system during the last formal Q/A checkpoints to determine additional improvements. This summarizes the project and serves as an objective evaluation of the benefits gained through the implementation of the system.

Identify and Plan Additional Requirements: Following a 'break-in' period, identify and prioritize system enhancement requests. Allocate resources to high priority items, and plan for their implementation.

While the present invention has been described in terms of specific embodiments, it is to be understood that the invention is not limited to these disclosed embodiments. This invention may be embodied in many different forms and should not be construed as limited to the embodiments set forth herein; rather, these embodiments are provided by way of illustration only and so that this disclosure will be thorough, complete and will fully convey the full scope of the invention to those skilled in the art. Indeed, many modifications and other embodiments of the invention will come to mind of those skilled in the art to which this invention pertains, and which are intended to be and are covered by both this disclosure, the drawings and the claims.

What is claimed is:

1. A method for providing access to cloud management system sites in a group-based cloud management system, comprising the steps of:
    defining a plurality of roles, with different roles providing a user with associated respective levels of access to at least one cloud management system site, at least one of the associated respective levels of access having a set of configurable parameters to manage at least one group comprised of at least two cloud management system sites connected on at least one of a separate layer from the system hosting environment, and a system hosting environment;
    for each cloud management system site for which the user is to have a level of access, assigning the user one of a plurality of roles;
    wherein the set of configurable parameters further comprises the steps of:
    the administrator user of the group, connecting at least one cloud management system site to the cloud management system site controlling the group;
    the administrator user of the group, disconnecting at least one cloud management system site from the cloud management system site controlling the group;
    for each cloud management system site for which the user is to have a level of access, assigning the user one of the roles with levels of access to allow the user to connect the cloud management system site to at least one additional group simultaneously; and
    for each cloud management system site for which the user is to have a level of access, assigning the user one of the roles with levels of access to allow the user to disconnect the cloud management system site from at least one group and to continue operating the cloud management system site as stand-alone.

2. The method of claim 1, wherein connecting and disconnecting the cloud management system to and from the group, further comprising the steps of:
    altering the settings of the cloud management system site associated to the front-end look and feel template;
    altering the settings of the cloud management system site associated to the methods of communication and sharing content and data files with at least one other cloud management system site in the group; and
    altering the settings of the cloud management system site associated to access to content and data files available in the group.

3. A system for providing to users, access to a plurality of cloud management system sites, comprising:
    a server computer in communication with at least one of a user internet-browser device, a user e-mail device, and a user text-messaging device over a network, the server computer comprising:
    means for storing a plurality of content and data files associated with at least one generation process of at least one cloud management system site, means for assigning a level of access to and control of each content and data files based on a user of the system's predetermined role in a generation process;
    means for determining whether access to the content and data files associated with at least one generation process of at least one cloud management system site is authorized;
    means for allowing access to and control of the content and data files associated with at least one generation process of at least one cloud management system site, if authorization is granted based on the access level of the user of the system;
    means for generating and storing a plurality of content and data files associated with at least one cloud management system site, means for customizing the generation process with the use of customizable templates with predefined content and data files, to create at least one category of cloud management system sites, included within are at least one of a template for community cloud management system sites, a template for personal cloud management system sites, and a template for project cloud management system sites, and respectively associating each of the cloud management system sites created with a user and a user role of the system; and means for managing at least one group comprised of at least two cloud management system sites connected on at least one of a separate layer from the system hosting environment, and a system hosting environment;

wherein managing at least one group further comprises:

means for storing a plurality of content and data files associated with at least one group management of at least one group of cloud management system sites, means for assigning a level of access to and control of the content and data files based on a user of the system's predetermined role in a group management;

means for determining whether access to the content and data files associated with the group management of at least one group of cloud management system sites is authorized;

means for allowing access to and control of the content and data files associated with at least one group management of at least one group of cloud management system sites if authorization is granted based on the access level of the user of the system;

means for allowing access to at least one cloud management system site to be connected to at least one additional group simultaneously, each group controlled by at least one cloud management system site, which grants to another cloud management system site, with the proper authorization to connect;

means for denying access to at least one cloud management system site to connect to a group, the group controlled by at least one cloud management system site and the cloud management system site with denied access, to continue operating as stand-alone;

for each cloud management system site for which the user is to have a level of access, means for assigning the user one of the roles with levels of access to allow the user to connect the cloud management system site to at least one additional group simultaneously;

for each cloud management system site for which the user is to have a level of access, means for assigning the user one of the roles with levels of access to allow the user to disconnect the cloud management system site from at least one group and to continue operating the cloud management system site as stand-alone; and means for allowing at least one cloud management system site to communicate and share content and data files with at least one other cloud management system site.

4. The system of claim 3 wherein at least one of the generated community cloud management system sites comprise predefined content and data files related to the generation of, and control of, at least one group, further comprising:

means for enrolling users in the community cloud management system site, wherein the users are associated with at least one user role defined in the community cloud management system site;

means for generating at least one cloud management system site based on the user attributes captured when enrolling the user in the community cloud management system site, within the means for selecting the appropriate template and respective electronic subscription payment associated with a user role in the community cloud management system site, wherein this user becomes a subscriber of the cloud management system site generated, which this user will manage and control, and wherein the means of manage and control, there is at least the means of administration of the users and user roles in the site; and means for communicating and share content and data files with at least one other cloud management system site.

\* \* \* \* \*